(12) United States Patent
Boul et al.

(10) Patent No.: US 10,421,891 B2
(45) Date of Patent: *Sep. 24, 2019

(54) REVERSIBLE AMINAL GEL COMPOSITIONS, METHODS, AND USE

(71) Applicant: Saudi Arabian Oil Company, Dhahran (SA)

(72) Inventors: Peter J. Boul, Houston, TX (US); B. Raghava Reddy, Pearland, TX (US); Matt Hilfiger, Houston, TX (US); Carl Thaemlitz, Cypress, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/864,694

(22) Filed: Jan. 8, 2018

(65) Prior Publication Data

US 2018/0127634 A1    May 10, 2018

Related U.S. Application Data

(63) Continuation of application No. 15/423,765, filed on Feb. 3, 2017, now Pat. No. 9,879,170.

(60) Provisional application No. 62/290,713, filed on Feb. 3, 2016.

(51) Int. Cl.
| | | |
|---|---|---|
| *C09K 8/035* | (2006.01) | |
| *C09K 8/52* | (2006.01) | |
| *E21B 43/22* | (2006.01) | |
| *C09K 8/03* | (2006.01) | |
| *C09K 8/467* | (2006.01) | |
| *C09K 8/504* | (2006.01) | |
| *C09K 8/506* | (2006.01) | |
| *C09K 8/57* | (2006.01) | |
| *C09K 8/575* | (2006.01) | |
| *C08G 73/02* | (2006.01) | |
| *C08G 73/06* | (2006.01) | |
| *C08L 79/02* | (2006.01) | |
| *C08L 79/04* | (2006.01) | |
| *C09K 8/42* | (2006.01) | |
| *C09K 8/56* | (2006.01) | |
| *E21B 33/138* | (2006.01) | |

(52) U.S. Cl.
CPC ............ *C09K 8/035* (2013.01); *C08G 73/024* (2013.01); *C08G 73/065* (2013.01); *C08G 73/0644* (2013.01); *C08L 79/02* (2013.01); *C08L 79/04* (2013.01); *C09K 8/03* (2013.01); *C09K 8/42* (2013.01); *C09K 8/467* (2013.01); *C09K 8/506* (2013.01); *C09K 8/5045* (2013.01); *C09K 8/56* (2013.01); *C09K 8/572* (2013.01); *C09K 8/575* (2013.01); *E21B 33/138* (2013.01); *C08G 2220/00* (2013.01); *C08L 2201/56* (2013.01); *C09K 2208/12* (2013.01); *C09K 2208/20* (2013.01)

(58) Field of Classification Search
CPC ...... C09K 8/52; C09K 2208/26; C09K 8/035; C09K 8/467; E21B 21/003
See application file for complete search history.

(56) References Cited

U.S. PATENT DOCUMENTS

| | | |
|---|---|---|
| 3,915,232 A | 10/1975 | Gruesbeck et al. |
| 4,498,994 A | 2/1985 | Heilweil |
| 4,963,597 A | 10/1990 | Shu |
| 5,260,268 A | 11/1993 | Forsberg et al. |
| 6,831,043 B2 | 12/2004 | Patel et al. |
| 7,140,433 B2 | 11/2006 | Gatlin et al. |
| 7,250,390 B2 | 7/2007 | Patel et al. |
| 2007/0029087 A1 | 2/2007 | Nguyen et al. |
| 2015/0321924 A1 | 11/2015 | Wrubel |
| 2016/0122613 A1 | 5/2016 | Zhou et al. |

FOREIGN PATENT DOCUMENTS

| | | |
|---|---|---|
| CA | 1272477 | 8/2009 |
| WO | 2015034466 A1 | 3/2015 |

OTHER PUBLICATIONS

International Search Report and Written Opinion for related PCT application PCT/US2017/016356 dated Mar. 24, 2017.
Fox et al., "Supramolecular motifs in dynamic covalent PEG—hemiaminal organogels", Nature Communications, 2015, pp. 1-8, vol. 6, Macmillan Publishers Limited.
You et al., "Dynamic Multicomponent Hemiaminal Assembly", Chemistry A European Journal, 2011, pp. 11017-11023, vol. 17, No. 39, Wiley-VCH.

*Primary Examiner* — Zakiya W Bates
(74) *Attorney, Agent, or Firm* — Bracewell LLP; Constance G. Rhebergen; Kevin R. Tamm

(57) ABSTRACT

A well treatment composition for use in a hydrocarbon-bearing reservoir comprising a reversible aminal gel composition is disclosed. The reversible aminal gel composition includes a liquid precursor composition. The liquid precursor composition is operable to remain in a liquid state at about room temperature. The liquid precursor composition comprises an organic amine composition; an aldehyde composition; a polar aprotic organic solvent; and a metal salt composition with valence 3, 4, or 5. The liquid precursor composition transitions from the liquid state to a gel state responsive to an increase in temperature in the hydrocarbon-bearing reservoir. The gel state is stable in the hydrocarbon-bearing reservoir at a temperature similar to a temperature of the hydrocarbon-bearing reservoir, and the gel state is operable to return to the liquid state responsive to a change in the hydrocarbon-bearing reservoir selected from the group consisting of: a decrease in pH in the hydrocarbon-bearing reservoir and an addition of excess metal salt composition in the hydrocarbon-bearing reservoir.

22 Claims, 38 Drawing Sheets

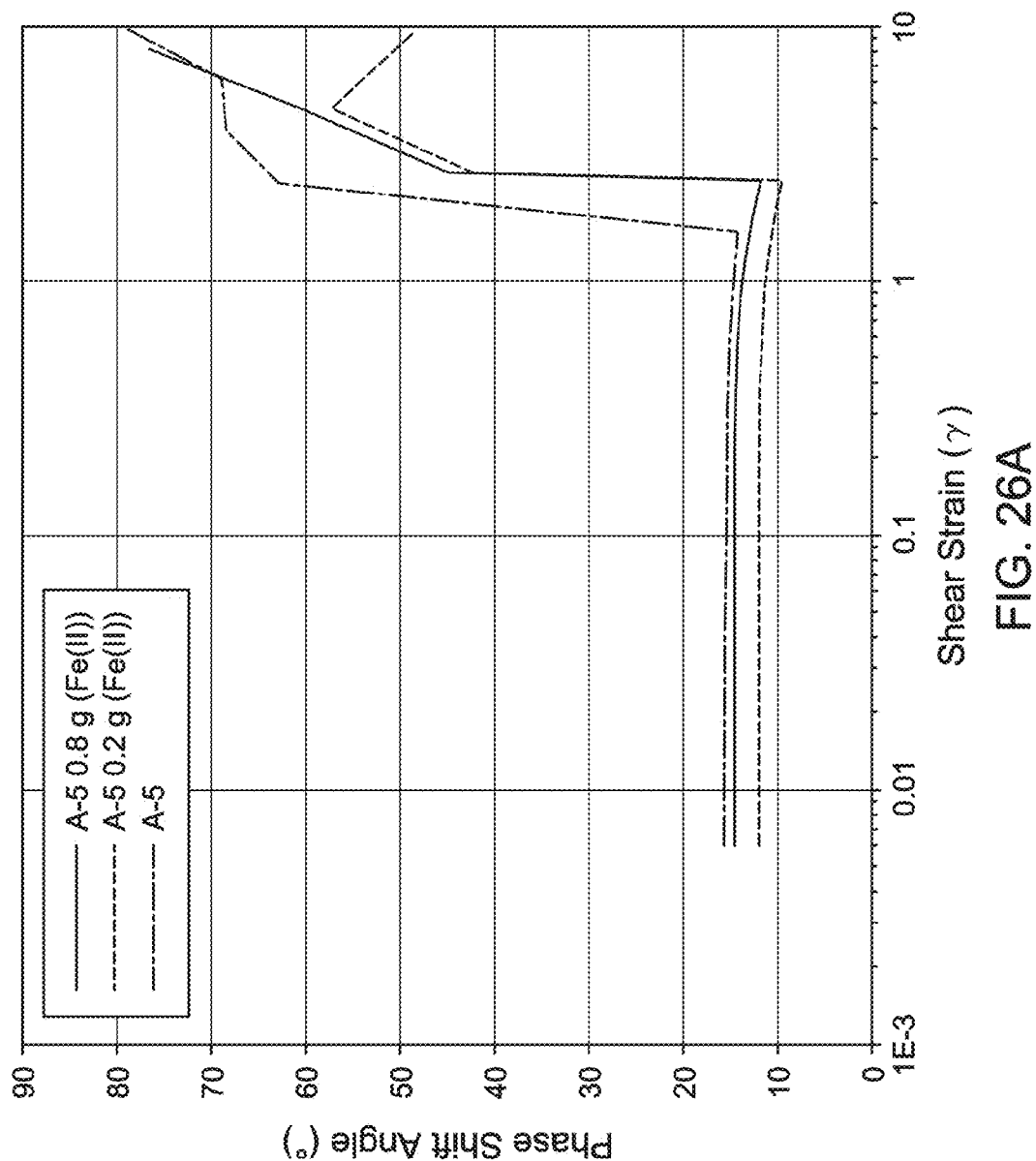

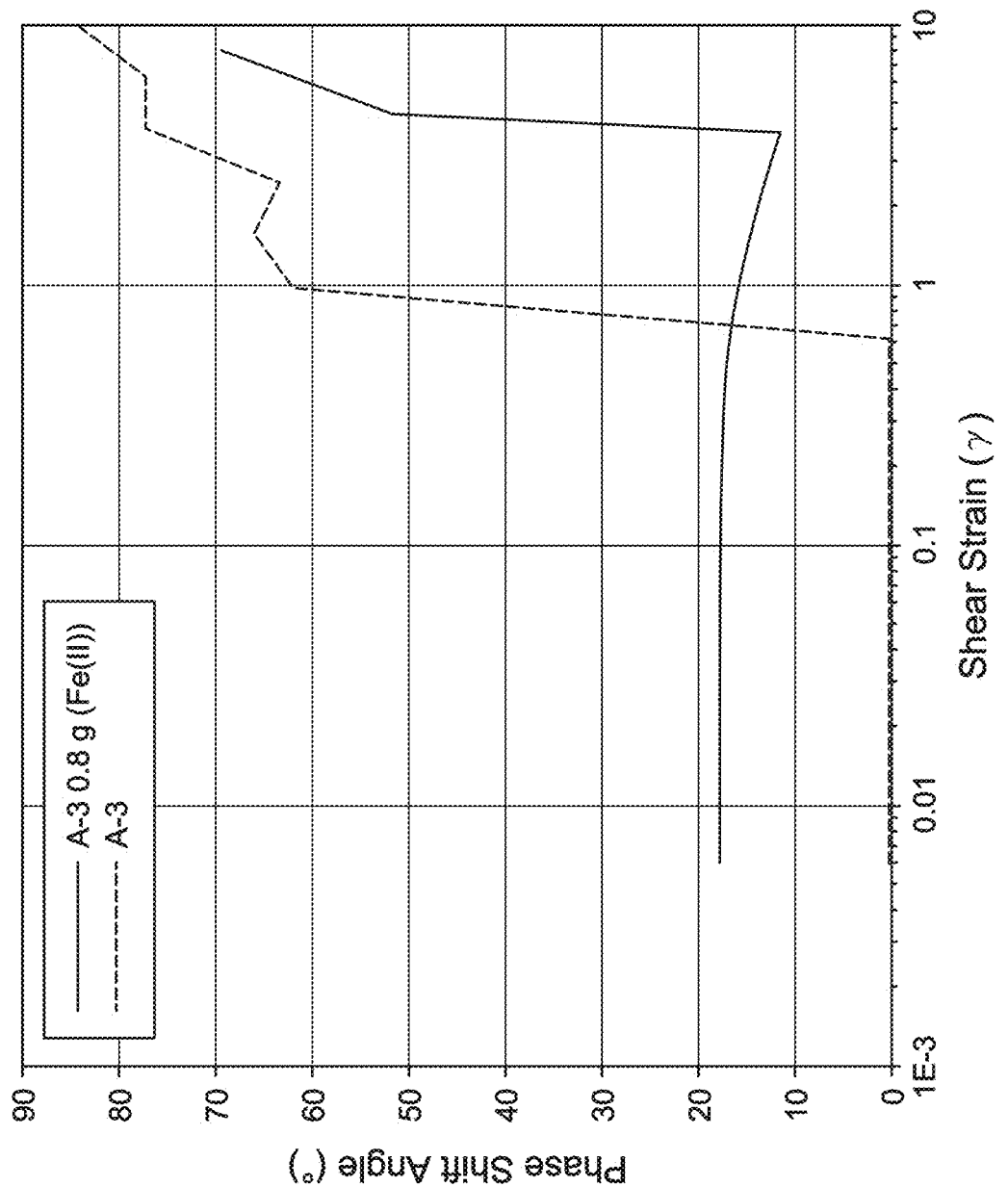

REVERSIBLE AMINAL GEL COMPOSITIONS, METHODS, AND USE

PRIORITY

The present application is a continuation of and claims priority to and the benefit of U.S. Non-provisional patent application Ser. No. 15/423,765, filed on Feb. 3, 2017, which claims priority to and the benefit of U.S. Prov. Pat. App. Ser. No. 62/290,713, filed Feb. 3, 2016, the entire disclosure of which is expressly incorporated herein by reference.

BACKGROUND

Field

Embodiments of the disclosure relate to oil and gas recovery. In particular, embodiments of the disclosure relate to gel compositions useful in downhole applications.

Description of the Related Art

Hemiaminal and aminal polymers have been reported to undergo pH responsive phase change and network rearrangements giving them promise as recyclable plastics, self-healing polymers, and stimulus-responsive materials. In addition to pH responsiveness, hemiaminal gels also show dynamics through aminal/thiol-exchange.

Constitutionally dynamic materials (CDMs) are classified by their utilization of reversible covalent and/or non-covalent bonding such that they are able to undergo modifications to their constitutions through the dissociation and re-association of their constituent building blocks. This attribute helps allow for accessing triggered release, reversible gels, and self-healing composites. The monomeric units of CDMs are brought together through reversible molecular bonding or supramolecular bonding (which is inherently reversible).

CDMs generated by the reversible covalent association of organic and organometallic building blocks are marked by stronger bonding than their supramolecular counterparts and have the additional flexibility of access to a greater variety of dynamic chemical reactions. An assortment of different reversible reactions has been investigated in this class of materials. These include reversible hydrazone formation, reversible Schiff base formation, reversible aminal formation, Diels-Alder condensations, disulfide exchange, dithioacetal exchange, dynamic boronic ester formation, olefin metathesis, and metal-ligand association.

Both constitutional and motional covalent dynamic chemistries have been demonstrated through reversible imine formation and the transformation of imines into aminals. Experiments have demonstrated that the complexation of certain transition metals to condensation products of polyamines and aldehydes can result in a switch from the aminal condensation product to the Schiff base. The transformative potential of certain metals in the presence of aminals could permit for networked polymers endowed with uniquely dynamic rheological and dielectric properties. These properties are of certain utility in the drilling, construction, and remediation of oil and gas producing wells.

In oil field services, completion fluids can be defined as those fluids used to flush potentially formation damaging materials from the wellbore after drilling and before casing perforation. Damaging materials include drilling fluid additives, such as fluid loss agents, on the formation face, solid cuttings and clays from formations entrained in the drilling fluid and deposited on the face of a formation, and filter cake on the formation left from the drilling fluid. The filter cake typically contains solid materials from drilling fluid additive residue from the drilling fluid along with the filter base (depending on the oil or water base of the fluid). Completion fluids control well pressure, prevent the collapse of tubing from overpressure, and provide fluid loss control. Fluid loss control agents can be added to the bulk completion fluid or supplied as a pill. Typical fluid loss pills are oil-soluble resins, calcium carbonate, and ground salt. These material are known to cause formation damage, which can significantly reduce production levels by decreasing the permeability of formations.

Gravel packing is used to control sand migration from the formation into the wellbore in both open hole and perforated casing situations. In the case of casing gravel pack completion, it is inserted at a specified location within a perforated wellbore. Conventional gravel packing uses a fine sand or gravel in a fluid viscosified or gelled with a polymer such as uncrosslinked hydroxyethyl cellulose, hydroxypropyl guar, xanthan gum, or similar. The thickener thickens or gels the fluid to allow the sand to pack the perforations before it compacts. After packing, the fluids or gels are then thinned or broken and recovered in order to allow the settlement of the sand to properly pack the annulus. The gels are converted to fluids by breakers, which are often chemical agents.

The gravel pack that remains is designed to be highly permeable but also blocks any formation sand from passing into the wellbore and only allows for the passage of fluids. If a thickening agent is not used or if it thins too early the result can be premature "sand-out" which is caused by bridging of the settled particles across the tubing. A viscosified fluid or gel with an infinite gravel settling rate is required in highly deviated wells. This assures that the gravel carried to the production zone in a highly deviated wellbore would not settle out. Cellulose derivatives are preferred viscosifiers as they render only a limited amount of water insoluble particles or residues when they degrade. These polymers are known to degrade at temperatures exceeding 200° F. Therefore, effective reversible thickeners and gelling agents are of certain utility in well sections exceeding 200° F.

Workover fluids are typically used in cleaning and repairing old wells to increase production. Completion, workover, and kill fluids are typically designed to prevent fluid from the formation intrusion into the wellbore while preventing wellbore fluid leakoff. Leakoff is the loss of fluid form the wellbore into the formation. Fluid leakoff is known to cause formation damage which can potentially reduce hydrocarbon recovery. Formation damage can be manifested as reduced permeability of the formation or the reaction of an aqueous fluid with minerals, such as clays, in the formation.

During perforation, it is necessary to inhibit fluids from entering and damaging the formation. Fluid loss agents typically used to meet these ends are water insoluble, oil soluble waxes, soaps, gels, and various other types of polymers. Another type of treatment fluid is comprised of finely ground solids dispersed in a fluid. The solids can be guar-coated silica flour, crushed oyster shells, crushed limestone, or rock salt.

To prevent fluid leakoff, lost circulation materials, are often added to wellbore construction fluids. These additives are designed with the purpose of preventing the communication of wellbore fluids with the formation. Conventional lost circulation materials may be inapplicable to water sensitive formations or formations with low fracture gradients. Cross-linked polymer gels have shown certain advantages over conventional completion, kill fluid, and workover fluid additives because of their enhanced fluid loss control in high permeability formations. The difficulty with many gels is that formation damage can be caused by the gels as they are often difficult to remove. If the gels are made fully reversible with an effective gel breaker, this formation damage issue may no longer be problematic in the use of gels in these kinds of fluids.

Problems in drilling and completion practices include well blowouts caused by the escape of hydrogen sulfide ($H_2S$), other gases, and light hydrocarbons. These events lead to serious costs and safety hazards to field personnel and well operators. The conventional method to mitigate $H_2S$-related events is to disperse solid particles such as iron oxide or zinc carbonate in aqueous brine weighted fluids to react with $H_2S$. The difficulty with this practice is that the brines are no longer free of solids as their intended purpose would be so as to avoid potential formation damage. Non-aqueous fluids, such as N-methyl pyrrolidone (NMP), are known to have a high capacity for $H_2S$ absorption. Fluids based with NMP have been previously proposed for use in wells with $H_2S$ to minimize well blowouts for this property.

SUMMARY

The disclosure presents reversible aminal gels produced from the condensation of aldehydes and amines, which in some embodiments have application to hydrocarbon-producing reservoirs where smart, stimulus responsive materials are sought. In example embodiments, compositions described here exhibit dynamic responsivity to certain divalent and trivalent metal salts. Examples show the utility of metals in the modification of the kinetics and thermodynamics of hemiaminal and aminal inclusive constitutionally dynamic materials (CDMs). The introduction of metal salts to certain systems provides a handle to exploit phase change dynamics and mechanical properties of these dynamic materials.

Constitutionally dynamic hemiaminal gels produced from the condensation of aldehydes and amines to aminals can be well suited to the harsh environments of hydrocarbon-producing reservoirs. In some embodiments, the gels break down when exposed to low pH conditions, for example with Lewis or Bronsted acids. In some embodiments, at neutral pH and greater, they are strong, highly resilient gels with a greater melting point, in some embodiments greater than about 200° C. When a low value pH fluid or appropriate metal salt composition (having a metal ion with a valence 3, 4, or 5 (described throughout alternatively as M(+III), M(+IV), or M(+V)), optionally a transition metal complex, is in contact with certain embodiments of the gels, a condensation reaction is reversed and a complex, optionally involving the metal ion, and optionally a transition metal ion, forms where the gel is transformed into a liquid. Aminal gels can have applications as work-over and completion pills (e.g. kill pills), sand control agents, conformance gels, cement additives, and shale inhibitors in water-based drilling muds.

Precise control of fluid rheologies and liquid-solid phase transitions underlie the chemical foundation for safe and effective oil well construction, production, and remediation. Constitutionally dynamic materials (CDMs) in wellbore operations offer the possibility to broaden the performance window of many upstream chemical processes in the oil and gas industry. Materials that are constitutionally dynamic utilize reversible covalent bonding in addition to or alternative to non-covalent bonding, such that the dynamic material undergoes continuous changes to its constitution through the dissociation and re-association of its constituent building blocks. These attributes, in part, open up a wide variety of possibilities for accessing triggered additive release, reversible gels, and self-healing composites.

CDMs are a class of dynamic materials that comprise both molecular and supramolecular polymers. The monomeric units of these kinds of polymers are brought together with reversible molecular (covalent) bonding or supramolecular bonding (which is inherently reversible). CDMs generated by the reversible covalent association of organic and organometallic building blocks are marked by stronger bonding than their supramolecular counterparts and have the additional flexibility of access to a greater variety of dynamic chemical reactions.

Presently, chemicals used to perform wellbore operations are based upon constitutionally static structures (non-reversible), which in the case of a sealant limit the ability of the material to self-heal. The inclusion of self-healing sealants or dynamic, stimulus responsive additives in cements could provide unique advantages in oil well cements or resin sealants where static materials cannot deliver.

Furthermore, processes used to clean a wellbore during completion processes can require reversibly gelled liquids. This reversible phase transformation is of particular utility in the process of perforating; for example, if the losses of completion brine are greater, gels are deployed to serve as a secondary fluid system, placed across the perforated interval to seal perforations against fluid loss to the formation. Dynamic chemical systems offer new methods for "breaking gels" and the possibility for widening the performance window of reversible gels deployed in completions.

The compositions described here have been developed in the interest of instructing the dynamics of aminals with metals, a hemiaminal polymer gel, produced through the condensation of a multifunctional amine and formaldehyde. The hemiaminal gel described converts into a liquid through the addition of a trivalent metal. Surprisingly, the resulting organometallic liquid can then be thermally transformed with a controlled and modifiable gelation time into a different kind of gel with enhanced physical properties. This gel can then be transformed back into a liquid through the addition of a reactive compound such as a thiol or phosphine.

The fluid and gel compositions described here may be used in the oil field through methodologies described for completions fluids, workover fluids, packer fluids, primary oil well cementing, and remedial oil well cementing. The gels described are chemically reversible and demonstrate high thermal stability (up to about 200° C.), which exceeds many currently used gels in wellbore construction fluids. The reversibility of the gels limits formation damage.

The gels can be formed with a controllable, tunable gel-time. They can be converted into gels in-situ, downhole or made into gels prior to pumping into the well. When made into gels prior to placement, they can be rendered into gel particles which can serve as reversible fluid loss additive gels. They can be used directly in a drilling fluid, a completion fluid, workover fluid, or gravel packer or administrated as a fluid loss pill.

The gels described are produced, in some embodiments, from triazine compounds which serve as a second layer of protection to $H_2S$ in the case of a well blowout. Triazines are organic ringed molecules which have also been used for $H_2S$ mitigation. $H_2S$ incorporates into the ring structure of triazines. The base of the gels, in some embodiments, is NMP which provides a primary layer of protection to $H_2S$ by absorbing the gas.

The gels can also be used in a method of remedial cementing where high thermal stability is sought to repair damaged cement seals and micro-annuli. The controllable gel-time of the materials can enable the use of these materials in conformance gels and as primary sealants in wellbore construction.

Therefore as disclosed, embodiments include a well treatment composition for use in a hydrocarbon-bearing reservoir comprising a reversible aminal gel composition. The reversible aminal gel composition includes a liquid precursor composition, the liquid precursor composition operable to remain in a liquid state at about room temperature, where the liquid precursor composition comprises: an organic amine composition; an aldehyde composition; a polar aprotic organic solvent; and a metal salt composition with valence 3, 4, or 5. The liquid precursor composition transitions from the liquid state to a gel state responsive to an increase in temperature from the hydrocarbon-bearing reservoir. The gel state is stable in the hydrocarbon-bearing reservoir at a temperature similar to a temperature of the hydrocarbon-bearing reservoir, and the gel state is operable to return to the liquid state responsive to a change in the hydrocarbon-bearing reservoir selected from the group consisting of: a decrease in pH in the hydrocarbon-bearing reservoir, an addition of excess metal salt composition in the hydrocarbon-bearing reservoir, and combinations thereof.

In some embodiments, the organic amine composition comprises a primary amine of polypropylene glycol with an approximate molecular weight of from about 280 to about 100,000 Daltons (Da). In other embodiments, the organic amine composition comprises a primary amine of polyethylene glycol with an approximate molecular weight of about 200 to about 100,000 Da. Still in other embodiments, the organic amine composition comprises a primary amine of an aromatic system.

In certain embodiments, the organic amine composition comprises an aminated polyethylene glycol with an approximate molecular weight of about 200 to about 100,000 Da, a primary amine of polypropylene glycol with an approximate molecular weight of about 280 to about 100,000 Da, and oxydianiline. Still other embodiments further comprise a hemiaminal or aminal gel formed at least in part by exchange of an initially-condensed amine, the initially-condensed amine selected from the group consisting of: alkylethylenediamine, benzylethylenediamine, phenylethylene diamine, and mixtures thereof, and the initially-condensed amine exchanged with a composition selected from the group consisting of polyethylene glycol, polypropylene glycol, oxydianiline, and mixtures thereof.

In certain embodiments, the aldehyde composition comprises a compound selected from the group consisting of: formaldehyde, paraformaldehyde, phenol formaldehyde, resorcinol-formaldehyde, and phenyl acetate-HMTA. In some embodiments, the polar aprotic organic solvent comprises a compound selected from the group consisting of: N-alkylpyrrolidone, N,N'-dialkylformamide, and dialkylsulfoxide. Still in other embodiments, the metal salt composition with valence 3, 4, or 5 comprises a metal selected from the group consisting of: iron(III) and aluminum(III). In other embodiments, the addition of a metal salt is operable to modify the mechanical properties of the gel to render a self-healing material. Still yet other embodiments further comprise a gel time accelerating additive comprising sodium sulfite. Still in other embodiments, the gel state comprises triazine-based molecules.

In certain embodiments, the polar aprotic organic solvent comprises N-vinyl pyrrolidone and is operable to be polymerized through a radical initialized reaction. In other embodiments of the composition, N-vinyl pyrrolidone is copolymerized with a second monomer thereby modifying hydrophilicity of a gel matrix and altering a release profile of cargo upon time delayed or triggered release. In some other embodiments, the second monomer comprises N-butyl acrylate. Still in yet other embodiments, N-vinyl pyrrolidone is polymerized as either a homopolymer or a copolymer through radical initiation with potassium persulfate. While in other embodiments, N-vinyl pyrrolidone is polymerized as either a homopolymer or a copolymer through radical initiation with UV light.

In some embodiments of the composition, N-vinyl pyrrolidone is polymerized as either a homopolymer or a copolymer in a photosensitized gel through radical initiation with light of a wavelength greater than about 350 nm. In some embodiments, the gel state is stable between about 110° C. and about 250° C. In other embodiments, a molar ratio of the organic amine composition to the aldehyde composition to the polar aprotic organic solvent is between about 1:2:1 and about 1:200:500. Still other embodiments further comprise delayed release capsules comprising a compound selected from the group consisting of: acidic solution and a metal salt composition.

Additionally disclosed is a method for introducing a reversible aminal gel composition into a wellbore in a hydrocarbon-bearing reservoir. The method includes the steps of: injecting a reversible aminal gel composition into the hydrocarbon-bearing reservoir, the reversible aminal gel composition comprising: a liquid precursor composition, the liquid precursor composition operable to remain in a liquid state at about room temperature, where the liquid precursor composition comprises: an organic amine composition; an aldehyde composition; a polar aprotic organic solvent; and a metal salt composition with valence 3, 4, or 5; and allowing the liquid precursor composition to transition from the liquid state to a gel state responsive to an increase in temperature from the hydrocarbon-bearing reservoir. The method further includes the step of returning the gel state to the liquid state by changing a property in the hydrocarbon-bearing reservoir selected from the group consisting of: pH in the hydrocarbon-bearing reservoir, an amount of metal salt composition in the hydrocarbon-bearing reservoir, and combinations thereof.

In some embodiments, the method further comprises the step of adding a gel time accelerating additive comprising sodium sulfite. In some embodiments, the polar aprotic organic solvent comprises N-vinyl pyrrolidone and is operable to be polymerized through a radical initialized reaction. In some embodiments, N-vinyl pyrrolidone is copolymerized with a second polymer thereby modifying hydrophilicity of a gel matrix and altering a release profile of cargo upon time delayed or triggered release. In certain embodiments, the second polymer comprises N-butyl acrylate. Still in other embodiments, the method further comprises the step of polymerizing N-vinyl pyrrolidone as either a homopolymer or a copolymer through radical initiation with potassium persulfate.

In certain embodiments, the method further comprises the step of polymerizing N-vinyl pyrrolidone as either a homopolymer or a copolymer through radical initiation with UV light. In some embodiments, the method further comprises the step of polymerizing N-vinyl pyrrolidone as either a homopolymer or a copolymer in a photosensitized gel through radical initiation with light of a wavelength greater than 350 nm. In other embodiments, the method further comprises the step of maintaining a stable gel state between about 100° C. and about 250° C. Still in other embodiments, the method further comprises the step of adjusting a rate of cargo release from the reversible aminal gel composition, where the reversible aminal gel composition comprises a cargo to carry out a wellbore function selected from the group consisting of: modifying viscosity of a wellbore fluid; initiating a cement set; and modifying yield point of a wellbore fluid.

In some embodiments, a molar ratio of the organic amine composition to the aldehyde composition to the polar aprotic organic solvent is between about 1:2:1 and about 1:200:500. Still in other embodiments, the method further comprises the step of adding delayed release capsules comprising a compound selected from the group consisting of: acidic solution and a metal salt composition with valence 3, 4, or 5. Some embodiments include the step of adjusting a ratio of components in the liquid precursor composition to tune a temperature at which the reversible aminal gel composition reverses to the liquid state. Other embodiments include the step of adjusting a ratio of components in the liquid precursor composition to tune a pH at which the reversible aminal gel composition reverses to the liquid state. Still other embodiments include the step of adjusting a ratio of components in the liquid precursor composition to modify the concentration of excess metal salt required to transform the reversible aminal gel composition into the liquid state.

In some embodiments of the method, the method includes the step of adjusting a ratio of components in the liquid precursor composition to alter the amount of time required for a liquid hemiaminal gel form to transform into a greater melting point gel form. Some embodiments includes the step of adjusting a ratio of components in the liquid precursor composition to tune physical properties of the gel state by exchange and reduction in an amount of polar aprotic organic solvent required for producing a homogenous gel. Still in other embodiments, the organic amine composition comprises a tris primary amine of polypropylene glycol with an approximate molecular weight of between about 280 and about 100,000 Da. In some embodiments, the organic amine composition comprises a bis primary amine of polyethylene glycol with an approximate molecular weight of between about 200 and about 100,000 Da.

In some embodiments of the method, the aldehyde composition comprises a compound selected from the group consisting of: formaldehyde, paraformaldehyde, phenol formaldehyde, resorcinol-formaldehyde, and phenyl acetate-HMTA. Still in other embodiments, the polar aprotic organic solvent comprises a compound selected from the group consisting of: N-alkylpyrrolidone, N,N'-dialkylformamide, and dialkylsulfoxide. In some embodiments, the metal salt composition comprises a metal selected from the group consisting of: iron(III) and aluminum(III). Other embodiments of the method include the step of adding a gel time accelerating additive comprising sodium sulfite to the hydrocarbon-bearing reservoir. In some embodiments, the gel state comprises triazine-based molecules.

Still other embodiments further comprise the step of maintaining a stable gel state between about 110° C. and about 250° C. In certain embodiments, a molar ratio of the organic amine composition to the aldehyde composition to the polar aprotic organic solvent is between about 1:2:1 and about 1:200:500. Still in other embodiments, the step of adding delayed release capsules to the hydrocarbon-bearing reservoir comprising a compound selected from the group consisting of: acidic solution and a metal salt composition is included in the method.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

FIG. 26A is a graph showing phase shift angle versus shear strain for sample A-5 alone, sample A-5 with 0.2 grams of Mohr's salt, and sample A-5 with 0.8 grams of Mohr's salt.

FIG. 26B is a graph showing phase shift angle versus shear strain for sample A-3 alone and sample A-3 with iron(II).

DETAILED DESCRIPTION

Figure 1A:
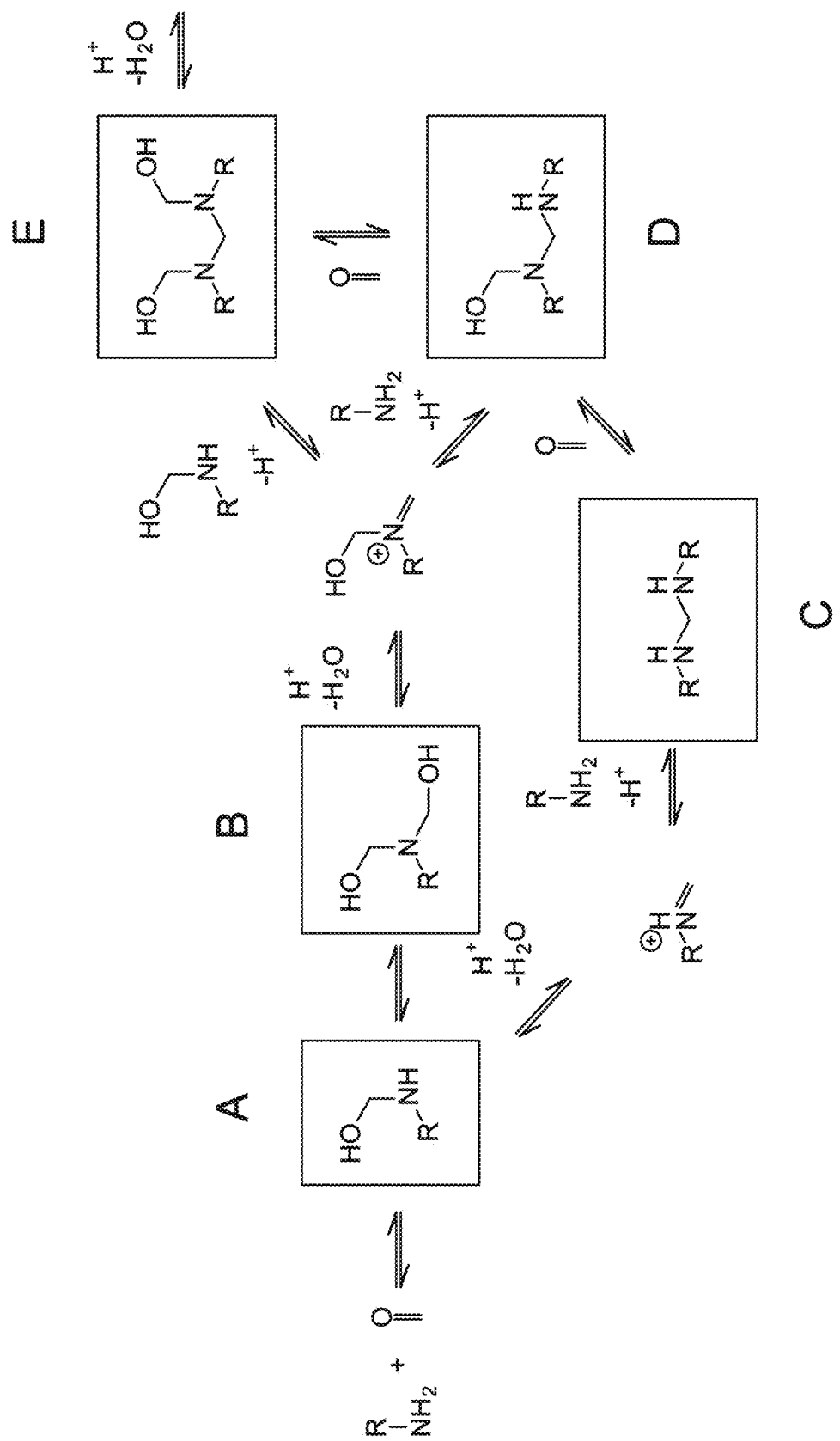
FIG. 1A shows a partial reaction scheme of the mechanism for the condensation of formaldehyde with organic amines to produce a series of aminals and hemiaminals.

So that the manner in which the features and advantages of the embodiments of compositions, systems, and methods of reversible aminal gels, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

Some embodiments include varying the relative quantity of a polar aprotic organic solvent component (such as, for example, N-methyl pyrrolidone ("NMP"), N-vinyl pyrrolidone ("NVP"), dimethylformamide ("DMF"), dimethylsulfoxide ("DMSO"), or similar polar aprotic organic solvents or mixtures of solvents) to adjust the melting point of a gel. Other embodiments include modifying the structure of an amine precursor to the aminal or hemiaminal gel to tune the melting point of the gel. The melting point of a greater temperature melting point gel of the present disclosure can be between about 50° C. and about 100° C., between about 75° C. and about 150° C., between about 100° C. and about 175° C., between about 125° C. and about 200° C., and between about 150° C. and about 250° C.

In certain embodiments, heating of organometallic fluids results in the formation of a second type of gel with a greater melting point and different mechanical properties. In the disclosure, an organometallic fluid is defined as any fluid in which the organic components bind with a metallic component. Gel formation times can be regulated by changes in temperature and through the addition of reducing agents such as, for example, sodium sulfite. Organometallic gels can be transformed back into a fluid by further addition of an M(+III), in addition to or alternative to a decrease in pH.

Chemistries have been developed and are disclosed that enable dynamic, stimulus responsive gels. In some embodiments, a hemiaminal gel, produced through the condensation of a polyamine and an aldehyde, such as, for example formaldehyde or paraformaldehyde (containing some percentage of formaldehyde), can be converted into a liquid through the addition of a trivalent metal. The resulting organometallic liquid can then be thermally transformed with a controlled and modifiable gel time into a different kind of gel with enhanced physical properties. This gel can then be transformed back into a liquid through the addition of excess solvent used to produce the gel along with heat. Certain chemistries described in this disclosure may have application to completion fluids where breakable gels are required; to self-healing composites for zonal isolation; and to oil well cements where delayed and controlled release of additives is sought.

Hemiaminal gels can be transformed into liquids through the addition of trivalent metals, such as, for example, aluminum or iron. The resulting organometallic liquid can be referred to as a metaloaminal gel and can be transformed into a different gel with unique physical properties through heating. The gel time for this transformation can be controlled and modified as needed by adjusting the amount of trivalent metal in the liquid or through the addition of an accelerator such as sodium sulfite. Aluminum chloride, in some embodiments, acts as both an accelerator to gel formation, catalyzing formation of a triazine complex, and as a retarder by stabilizing reactants prior to the triazine product.

Without being bound by any theory or principle, the action of aluminum chloride is believed to occur because a trivalent metal (or "M(+III)") stabilizes the transition state and lessens the activation energy for the ring closure of product G to product H in FIG. 1B (discussed further with regard to FIG. 1B as follows). An M(+III) also stabilizes a liquid precursor by binding to any one of the structures from A to F in FIGS. 1A and 1B, and thereby lessens the energy of the precursor materials relative to the ring-closed triazine. This stabilization retards the formation of product H because the relative activation energy required is increased by the lessening of the free energies of the structures responsible for the liquid state.

In some embodiments, ferric ammonium sulfate does not accelerate the formation of a triazine (product H in FIG. 1B, also referred to as a trisubstituted hexahydrotriazine) as effectively as aluminum chloride, and the addition of increasing amounts of ferric ammonium sulfate to solution leads to a decrease in the rate of formation of triazine. This may occur through the same mechanism as the retardation of the product formation in the case of aluminum.

In some embodiments, a hemiaminal gel can be made with a melting point exceeding about 78° C. The hemiaminal gel is easily broken down to a liquid with the addition of aluminum chloride either as a solid or as a solution in water or NMP. The liquid then gives reliable gel times to the formation of a triazine-based gel. At about 110° C., this triazine-based gel has a greater melting point than the hemiaminal gel. In some embodiments, a triazine-containing gel has a melting point greater than about 110° C., and in other embodiments, a triazine-containing gel has a melting point greater than about 200° C. Stirring a reaction product with heat and excess solvent (NMP) eventually transforms a triazine-containing gel back to a liquid. Addition of an acid, such as, for example, hydrochloric acid, can also transform a greater melting point triazine-based gel back to a liquid by a reduction in pH.

In some embodiments, metals introduced to the hemiaminal/aminal system alter the dynamics of gel formation. The use of a metal salt composition, in addition to or alternative to transition metals, in certain systems enables the rendering of greater melting point gels for the use of the disclosed chemistry in a wide variety of well conditions. Some embodiments include the use of JEFFAMINE®'s as aminated polyethers in the hemiaminal/aminal gel systems described. Other embodiments include the use of aromatic amines such as oxydianiline ("ODA"). In some embodiments, aldehyde alternatives can be used in addition to or alternative to formaldehyde and paraformaldehyde, such as, for example, phenol formaldehyde, resorcinol-formaldehyde, and phenyl acetate-HMTA. In some embodiments, the reversible gels of the present disclosure are used as diversion materials in fracturing applications in hydrocarbon-bearing reservoirs.

In embodiments of the disclosure, useful aminated polyethers (including aminated polyethylene glycols and aminated polypropylene glycols) can be branched or straight chained. Some embodiments include polyalkylene ethers such as polypropylenes, polypropylene oxides, polybutylenes, polybutylene oxides, polyethyleneimines, and polyethylene oxides. Alternatives to aminated polyalkylene ethers include aromatic polyamines such as oxydianiline, diaminobenzene, diaminonapthalene, and aminated pyrene. Other alternatives to aminated polyalkylene ethers include aminated graphene, aminated carbon fibers, and amine functionalized nanoparticles (such as $ZrO_2$, $SiO_2$, $TiO_2$, superparamagnetic iron oxide nanoparticles, single wall carbon nanotubes, multiwall carbon nanotubes, carbon nanohorns, and single wall carbon nanotubes).

Gels of the present disclosure may be reinforced with carbon fibers, glass fibers, carbon nanofibers, carbon nanotubes, silica fume, silica particles, or other particulates or nanoparticulates.

In certain embodiments, the addition of a divalent metal, such as, for example, iron(II), results in the modification of the mechanical properties of the gels. These modifications can include imparting self-healing properties into the gel such that when the gel is broken or cut, the gel can re-mend itself when the two broken gel components are brought into physical contact with one another.

In other embodiments, the gels serve as stimulus responsive containers that when laden with cargo and in the presence of an appropriate stimulus can release their contents to the surrounding environment over a pre-determined or specified time. This environment could be a solid, liquid, or gas environment. In this way, the timed release of chemical additives may be achieved through the controlled break down of cargo-laden gels of hemiaminal or aminal composition at controllable melting points.

In certain embodiments, a solvent or solvent mixture can be modified to alter the release profile of the cargo. For instance, NVP can be used as a solvent and co-polymerized with N-butylacrylate in the production of a gel. In this way, while the organoamines are condensing with formaldehyde, NVP polymerizes with N-butylacrylate. This cross-linked web of what would otherwise be the solvent in the gel serves to reduce the permeability and responsiveness of the gel to cargo release. In some embodiments, the radical polymerization of the pyrrolidone copolymer may be actuated with radical initiators such as potassium persulfate. In other embodiments, the radical polymerization reaction may be initiated with UV light. In other embodiments, the radical polymerization reaction may be initiated with visible or near-infrared ("NIR") light through photosensitization of the gel to the appropriate wavelength of the light.

As disclosed, embodiments include a gel produced through the condensation of an aldehyde and an organic amine where the addition of a trivalent metal results in the transition of the material to a liquid. Other embodiments include the conversion of this liquid into a gel through heating. Other embodiments include the reconversion of this second/thermodynamic gel to a liquid through combination with a polar aprotic solvent.

In other embodiments, the hemiaminal or aminal gel is formed at least in part by exchange of the amine from a previously formed hemiaminal or aminal gel composition. The initially-condensed amine can be selected from the group consisting of: alkylethylenediamine, benzylethylenediamine, phenylethylene diamine, and mixtures thereof. This initial amine is exchanged with an aminated polyethylene glycol, polypropylene glycol, or other polyalkylene glycol.

Certain dynamic gels disclosed here are produced through a condensation of an aldehyde, such as, for example, formaldehyde or paraformaldehyde, with an organic amine.

Organic amines include aliphatic and aromatic aminated polymers. Certain mechanisms for this reaction are illustrated in FIGS. 1A, 1B, and 2. In the exemplified condensation reaction, product H is the thermodynamic product. The other reaction products A-G are kinetic products and are present in the pre-equilibrium reaction product in varying degrees. The concentration distribution of kinetic products can be shifted by a change in pH or through the addition of a molecule that can act as a receptor for any of the reaction products, A through H depicted in FIGS. 1A and 1B.

When a molecule binds to any one of the reaction products, it affects the free energy of the complex and changes the equilibria and activation energies of the formaldehyde/amine condensations. The presence of a different component can then be amplified relative to the others. For example, product A could be amplified over product G. One outcome of reaction schemes shown in FIGS. 1A, 1B, and 2 is that the physical properties (such as, for example, mechanical strength and melting point) of a gel or resin produced from these dynamic building blocks can be altered when in the presence of a chemical stimulus.

Experimental Methods and Results

Figure 1B:
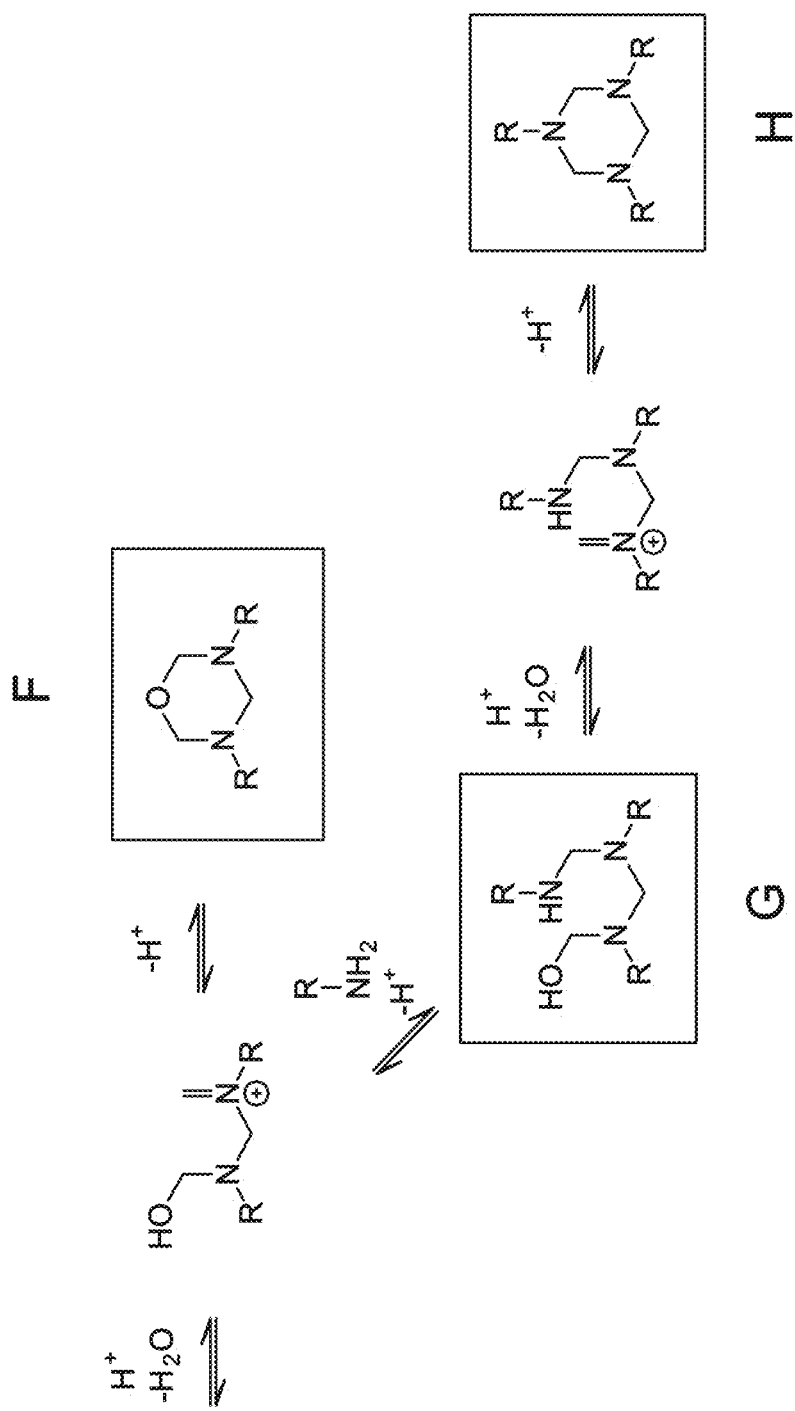
FIG. 1B shows a partial reaction scheme of the mechanism for the condensation of formaldehyde with organic amines to produce a series of aminals and hemiaminals, along with a greater melting point triazine-based gel (H).
Figure 2:
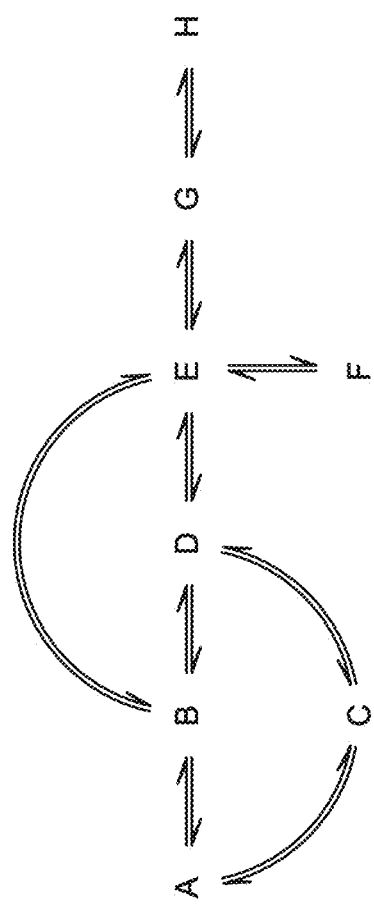
FIG. 2 shows a reaction scheme mechanism for the transformation of the transitory products from FIGS. 1A and 1B.

In FIGS. 1A and 1B, a reaction scheme is provided of the mechanism for the condensation of formaldehyde with organic amines to produce a series of aminals and hemiaminals. FIG. 2 shows a reaction scheme mechanism of how the transitory products from FIGS. 1A and 1B transform into and from one another. Certain example solvents that have been tested for the chemistries described throughout the disclosure are N-methylpyrrolidone ("NMP"), N,N'-dimethylformamide ("DMF"), and dimethylsulfoxide ("DMSO"). In other embodiments, other polar aprotic organic solvents or combinations of solvents could be selected by one of ordinary skill in the art. N-methyl pyrrolidone, paraformaldehyde, sodium sulfite, aluminum chloride hexahydrate, and ferric ammonium sulfate dodecahydrate were purchased from Fisher Scientific Co. LLC. JEFFAMINE® T-5000 was obtained from Huntsman International LLC.

Figure 3:
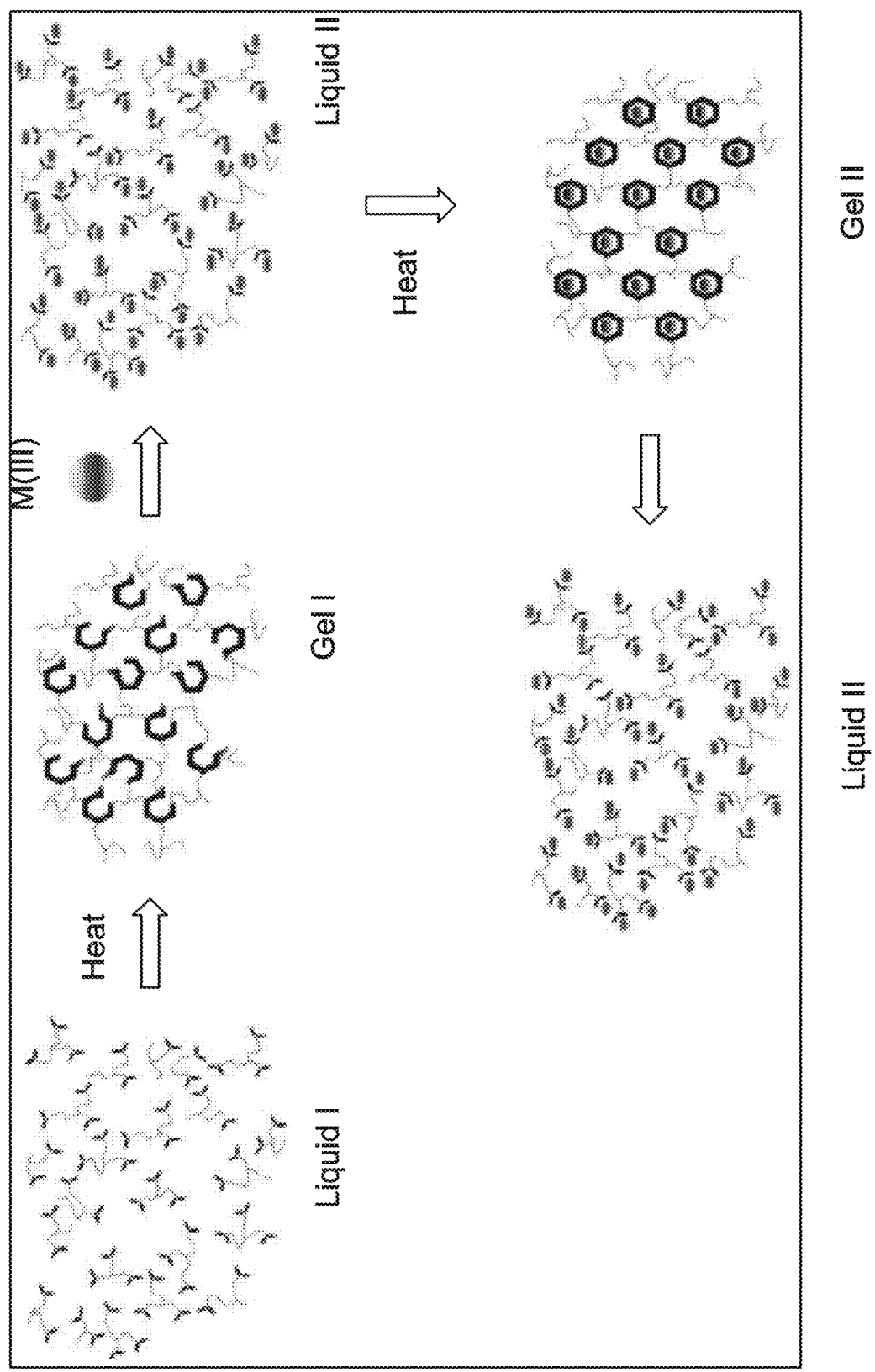
FIG. 3 shows a graphic representation for certain possible phase changes during the formation of gels of the present disclosure.

Referring now to FIG. 3, a graphic representation is shown for certain possible phase changes during the formation of gels of the present disclosure. As related to FIGS. 1A and 1B, in FIG. 3 Gel I corresponds to a gel, such as reaction product G in FIG. 1B, produced by the reaction of an organic amine and an aldehyde, such as, for example paraformaldehyde or formaldehyde. As is shown generally in FIG. 3, Gel I, or the reaction product G in FIG. 1B, can be further modified by a metal salt composition M(+III) and heat to produce Gel II, or reaction product H in FIG. 1B, which itself can be returned to a liquid form, shown as Liquid II (see also FIG. 10).

In some embodiments, the gels represented by Gel II in FIG. 3 are solids at mildly acidic pH, neutral pH, and greater pH (in basic solution), and the gels can become a liquid at low pH (in acidic solution), or when excess iron, metal salt composition, or transition metal complexes, are added to them. For example, solid gels could be removed from a well by adding acid or excess transition metal complexes or metal salt compositions with valence 3, 4, or 5. The gels represented by Gel II in FIG. 3 and reaction product H in FIG. 1B can be greater melting point triazine-based gels, optionally complexed with a trivalent metal from a metal salt composition with valence 3, 4, or 5.

Figure 4:
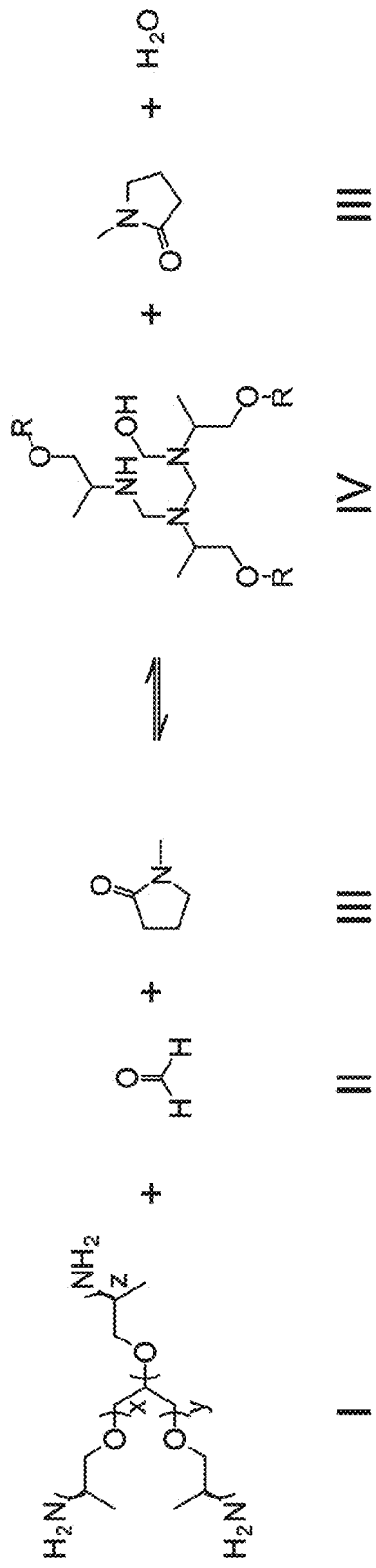
FIG. 4 shows a reaction scheme for the formation of a stimulus responsive low melting point aminal gel based on aminal chemistry.

FIG. 4 shows a reaction scheme for the formation of a stimulus responsive aminal gel based on aminal chemistry. In FIG. 4, I represents JEFFAMINE®, II represents formaldehyde, III represents NMP, IV represents an initial aminal gel (without any substantial triazine ring formation), and $H_2O$ represents excess water. NMP is a solvent. In the reaction scheme of FIG. 4, a low melting point gel IV is formed, which becomes a liquid when heated to about 50° C.

In applications, such as conformance gels, where long-term solutions are sought to shut off water and gas zones of hydrocarbon-producing reservoirs, gels may be obtained by mixing of JEFFAMINE® (I) with formaldehyde (II) and N-methylpyrrolidone (III) (see FIG. 4) to produce a gel with strong resilient properties. In order to meet the requirements of greater-temperature, hydrocarbon-producing well and reservoir conditions (greater than about 100° C.), the melting point of aminal gels can be increased by heating the material in the presence of metal salt compositions with metal ions having a valence 3, 4, or 5 (also referred to as M(+III), M(+IV), or M(+V), respectively), optionally transition metal compounds, such as, for example, an iron(III) compound.

Figure 5:
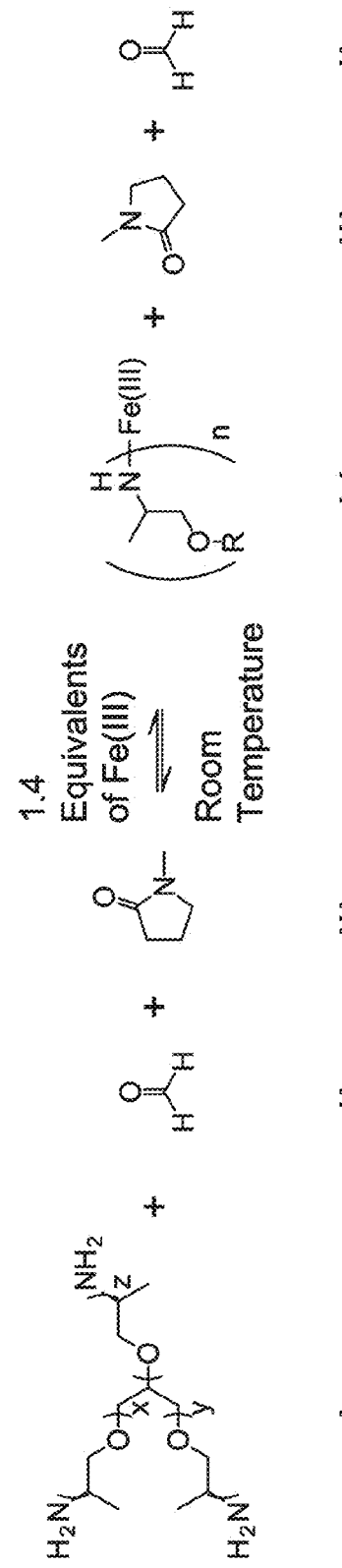
FIG. 5 shows a reaction scheme intermediate step for the formation of a greater melting point gel in the presence of iron(III).

In some embodiments, 1.1 molar equivalents of iron(III) to JEFFAMINE® is sufficient to convert aminal gels to free flowing liquids at room temperature. In some embodiments, an optimal molar ratio for the formation of the greater melting point temperature triazine-based gels is 1:5.4:250 of JEFFAMINE® T5000:Paraformaldehyde:NMP. JEFFAMINE® T-5000 polyetheramine is a trifunctional primary amine of approximately 5,000 Da molecular weight. It is a clear, almost colorless, viscous, liquid product, and is produced by Huntsman International LLC. Unless specified otherwise in context, molecular weight values in this disclosure refer to weight average molecular weights. In FIGS. 4 and 5 in JEFFAMINE® (I), x+y+z is about equal to 85, in some embodiments.

Referring now to FIG. 5, a reaction scheme intermediate step is shown for the formation of a greater melting point gel in the presence of iron(III). In FIG. 5, I represents JEFFAMINE®, II represents formaldehyde, III represents NMP, and V represents an organometallic intermediary compound. When iron(III) is added to the hemiaminal gel scheme in FIG. 4 (shown by FIG. 5), the gel transitions to a solution at room temperature shown by organometallic intermediary compound V in FIG. 5. If a small amount of iron(III) is used to break the initial low melting point gel (IV), then when the solution is later heated to 150° C., a greater melting point gel reforms (VI) (as shown in FIG. 6).

Figure 6:
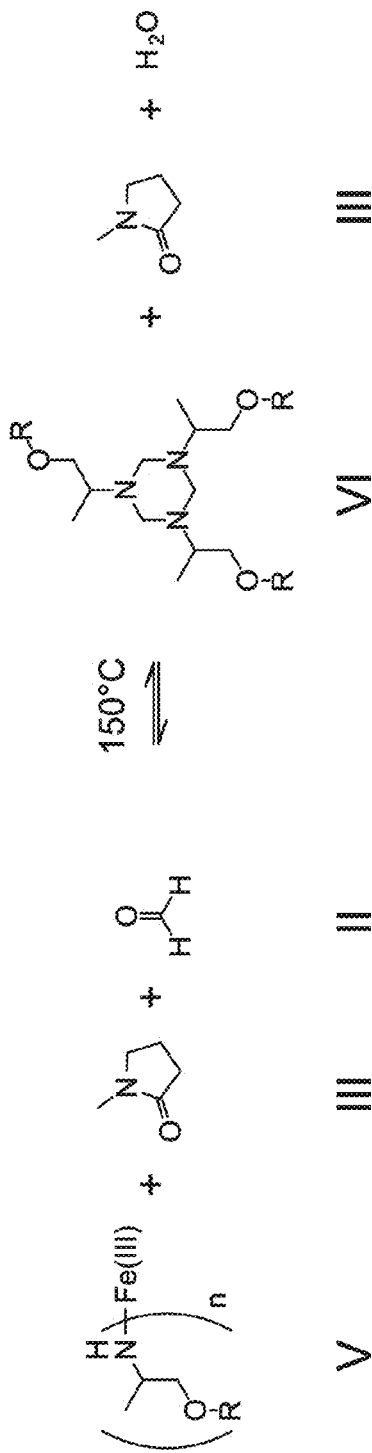
FIG. 6 shows a reaction scheme for one proposed formation of a greater temperature melting point triazine-based gel in the presence of iron(III) after exposure to 150° C. heating.

Referring now to FIG. 6, a reaction scheme is shown for one proposed formation of a greater temperature melting point gel in the presence of iron(III) after exposure to 150° C. heating. In FIG. 6, V represents the organometallic intermediary compound from FIG. 5, II represents formaldehyde, III represents NMP, and VI represents a greater melting point triazine-based gel. This gel, represented by VI, has a substantially greater melting point than the initial hemiaminal gel, represented by IV in FIG. 4. Without being bound by any theory or principle, it is believed that some other species are formed on heating (for some of the material in the gel, a triazine-based structure). A greater melting point is observed in the gel VI, greater than about 200° C.

When 1.4 equivalents (to JEFFAMINE®) of $FeCl_3$ are added to the neat gel IV represented in FIG. 4, and the solution is heated to 150° C. for 20 minutes as shown in FIG. 6, a color change is observed from bright red to a deep, dark red. One result of the heating step is that the gel reforms as a greater melting point gel. While the melting point of the hemiaminal gel (initial gel IV) was about 50° C., the melting point of the greater melting point gel VI exceeds the boiling point of the NMP solvent, where the boiling point of NMP solvent is greater than about 200° C. In some embodiments of the greater melting point gel VI, the melting point exceeds about 200° C., and in other embodiments, the melting point exceeds about 100° C. It is believed one contributing factor to the physical property change of the gel could correspond to the formation of a triazine core in some of the species comprising the gel, optionally complexed with the metal of the metal salt (see also FIG. 10).

Gels derived from the chemistries of the present disclosure are constitutionally dynamic and based on reversible covalent chemistry. While present in environments at mildly acidic pH, neutral pH, and greater pH (alkaline or basic environments), they are strong gels. If a Bronsted or Lewis acid such as concentrated hydrochloric acid or iron trichloride in excess is added to the greater melting point triazine-based gels, they transform themselves into thin fluids. This property can be useful when applying this technology as workover or kill pills. When in the process of perforating a wellbore in a hydrocarbon-bearing reservoir, if the losses of the completion brine are greater, these gels could serve as a secondary fluid system (for temporary fluid loss control) placed across the perforated interval to seal perforations against fluid loss to the formation. The gels can then be removed through treatment with an acid once the completion process is finished. Experiments have also shown that when excess iron(III) is added to greater melting point gel networks, the network breaks down. The proposed reaction scheme is shown in FIG. 7.

Figure 7:
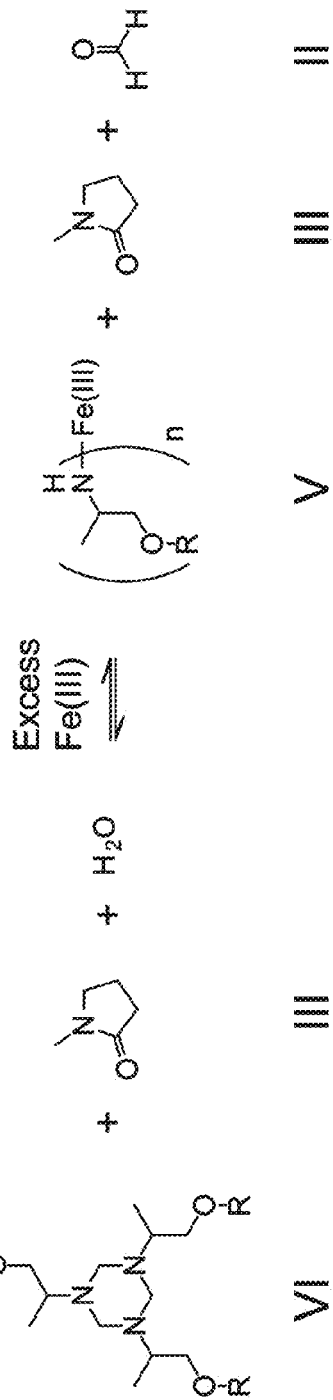
FIG. 7 shows a reaction scheme for one proposed method to reverse the formation of a greater temperature melting point triazine-based gel in the presence of excess iron(III).

Referring now to FIG. 7, a reaction scheme is shown for one proposed method to reverse the formation of a greater temperature melting point gel in the presence of excess iron(III). When excess iron(III) is added to the greater melting point gel VI in the presence of NMP and water, the structure breaks down to a solution. Similarly, concentrated hydrochloric acid also breaks the greater melting point gel VI and a liquid fluid is formed. In embodiments of the present disclosure therefore, reversible greater melting point gels are obtainable to meet the temperature requirements for gels in downhole environments of hydrocarbon-bearing formations.

When placed in 28% HCl for 1 hour at 90° C., the greater melting point gel disappeared, as the products likely return to their starting materials in solution. Similarly, when 50% by mass of $FeCl_3$ was added to the dark red gel and heated to 90° C., the gel became a thin liquid. This indicates that the addition of excess iron(III) can shift the equilibrium to favor structure V in FIGS. 5-7.

Gel Concentration Experiment I

The experiment described in this section is referred to as Gel Concentration Experiment I throughout the disclosure. To investigate the influence of the concentration of paraformaldehyde and JEFFAMINE® condensation product in NMP on the melting point and rheology of gels, oscillatory shear experiments were performed in an Anton Paar rheometer. The gels that were studied all had the same molar ratio of JEFFAMINE® to paraformaldehyde (1:5.4) but all differed in the molar ratio of NMP to JEFFAMINE®. The molar ratio of JEFFAMINE® to NMP varied from 1:63 to 1:315. For all of the gels, NMP and paraformaldehyde were mixed at 60° C. for 40 minutes. JEFFAMINE® T-5000 was then added to the solution and stirred for 30 minutes. The formulations of the gels are shown in Table 1.

TABLE 1

Gel formulations for Gel Concentration Experiment I.

| Material | Molar Ratio | Mass (grams (g)) | Moles |
|---|---|---|---|
| Paraformaldehyde | 5.4 | 0.13 | 0.00433 |
| JEFFAMINE ® T-5000 | 1 | 4.0 | 0.0008 |
| N-Methyl pyrrolidone | 63, 189, 315 | 5, 15, 25 | 0.050, 0.15, 0.25 |

The gels formulated from Table 1 were heated to 90° C. past their melting points. Then, as free flowing liquids, the solutions were poured into the rheometer cell of the Anton Paar device, and the temperature of the cell was ramped up while monitoring G' and G" at 1 Hertz (Hz) and 1% amplitude. This enables the determination of the gel melting points. The ramp rates were 5.9, 1.5, 0.38° Centigrade/minute (° C./min) for samples with a 63, 189, and 315 molar ratio of NMP to JEFFAMINE® T-5000, respectively.

Experiment II

Gel Time Experiments for the Transformation of Gels from Hemiaminal to Triazine-based Gels with Tri-aminated Polypropylene Glycols The formulations that follow in Tables 2 through 6 (Experiments II-A, B, C, D, and E) were prepared following a general method which is described as follows. The gels were synthesized through the addition JEFFAMINE® T-5000 to paraformaldehyde in NMP. JEFFAMINE® T-5000 is a tris primary amine of polypropylene glycol with an approximate molecular weight of 5000 Da. The gel formed from the condensation of paraformaldehyde and JEFFAMINE® T-5000 in NMP is broken down through the addition of an iron(III) or aluminum(III) complex. In these experiments, the organometallic liquid is then heated. The heating leads to the formation of gels with different physical properties than the initial gels formed prior to the addition of M(+III).

For all of the gels tested in Experiments II-A, B, C, and D, NMP and paraformaldehyde were mixed at 60° C. for 40 minutes. JEFFAMINE® T-5000 was then added to the solution and stirred for 30 minutes. The liquid was then removed from the heating bath and allowed to cool to room temperature. After the hemiaminal gel had formed, the metal salt (also referred to as "M(+III)") was added. The gel was then sliced up with a spatula to increase the surface area available for metal complexation. The gel was digested into a liquid over a period of a few days at room temperature through the addition of an M(+III) salt to the gel.

Gel times were determined for the formulations described in Tables 2 through 5 with a Brookfield DV2T rheometer with an LV-04 spindle. The rheometer was set to measure viscosity at 12 rotations per minute (rpm) as a function of time. The samples were heated to various temperatures in oil baths, and the temperatures were specified with Fann temperature controllers.

Figure 12:
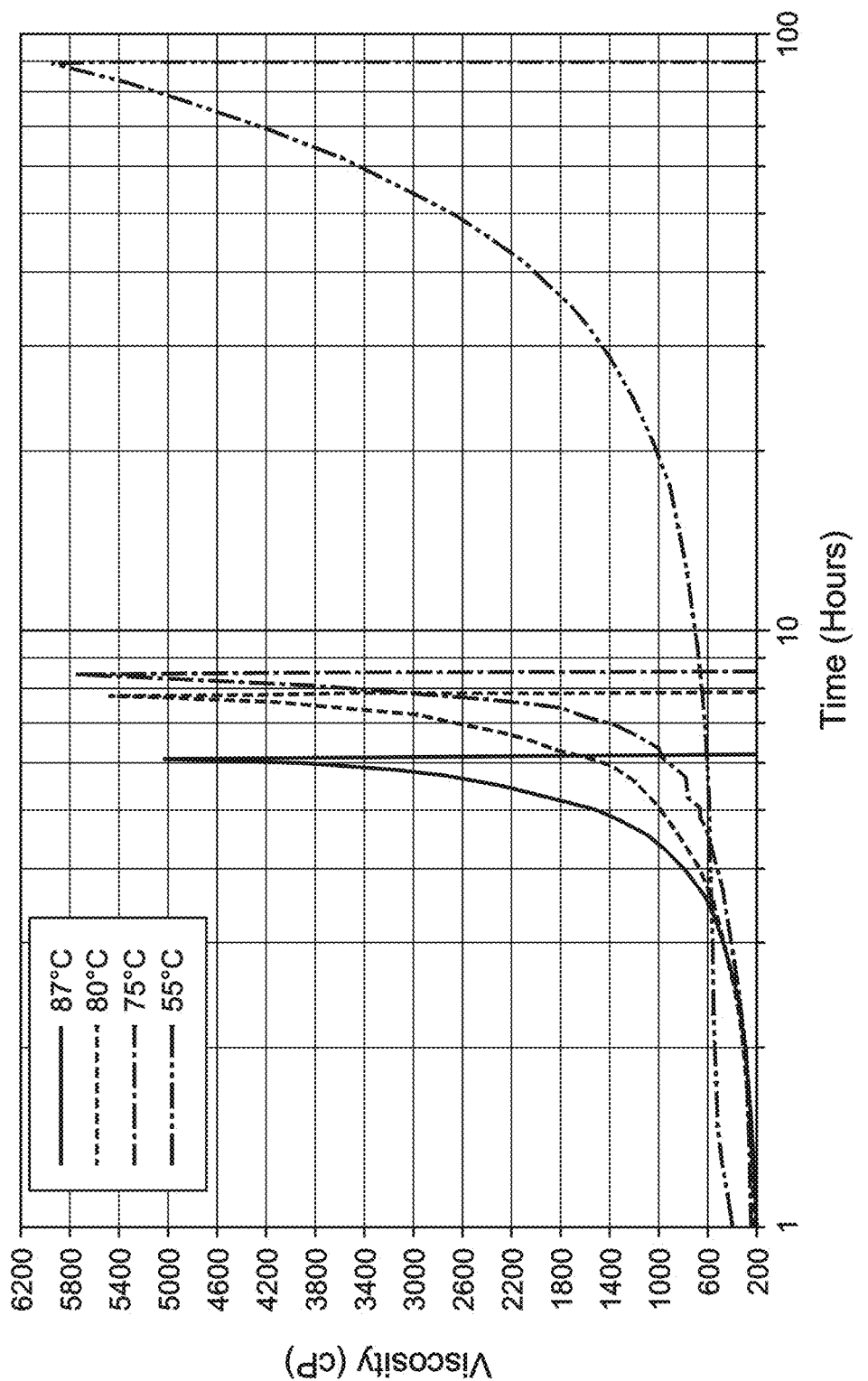
FIG. 12 is a graph showing the time dependence of rheology for the gel formulation described in Table 2 at various temperatures.

In Experiment II-A, hemiaminal gel samples were treated with iron(III) to become liquids and were then separately heated to 55° C., 75° C., 80° C., and 87° C. The gel times were measured, or in other words the time periods to re-form a greater melting point gel were measured. The formulation for the gel samples studied in Experiment II-A is presented in Table 2. FIG. 12 is a graph showing the time dependence of rheology for the gel formulation described in Table 2 at various temperatures. As shown by FIG. 12, with greater heating applied, greater melting point gels formed more quickly.

TABLE 2

Formulation for gel samples in Experiment II-A.

| Material | Mass (grams) | Moles | Molecular Equivalents |
|---|---|---|---|
| Ammonium iron(III) sulfate | 7.5 | 0.0156 | 1.2 |
| Paraformaldehyde | 2.08 | 0.0693 | 5.4 |
| JEFFAMINE ® T-5000 | 64.0 | 0.0128 | 1 |
| N-Methylpyrrolidone | 82.4 (80 milliliters (mL)) | 0.831 | 64.9 |

In Experiment II-B, a gel time accelerating additive, sodium sulfite, was tested. Tests were performed to assess the possibility of accelerating the gel formation with an additive. The gel formulation for the samples in Experiment II-B (using sodium sulfite) is presented in Table 3. The sample was heated to 70° C.

TABLE 3

Formulation for gel samples in Experiment II-B.

| Material | Mass (grams) | Moles | Molecular Equivalents |
|---|---|---|---|
| Ammonium iron(III) sulfate | 1.72 | 0.00357 | 1.1 |
| Paraformaldehyde | 0.52 | 0.0173 | 5.4 |
| JEFFAMINE ® T-5000 | 16 | 0.0032 | 1.0 |
| N-Methylpyrrolidone | 82.4 (80 mL) | 0.831 | 260 |
| Sodium Sulfite | 9.8 | 0.07808 | 24.4 |

In Experiment II-C, a demonstration of the effect of aluminum chloride on gel time was carried out. As shown in the formulation in Table 4, increasing amounts of aluminum chloride were added to the 65:5 NMP:paraformaldehyde hemiaminal gel. The resulting liquid was then heated to 68° C. and the gel time was measured. As used throughout the disclosure, "65:5" refers to a molar ratio of about 65 NMP to about 5 paraformaldehyde.

TABLE 4

Formulations for gel samples in Experiment II-C.

| Material | Molar Ratio | Mass (grams) | Moles |
|---|---|---|---|
| Paraformaldehyde | 5.4 | 2.08 | 0.0692 |
| JEFFAMINE ® T-5000 | 1 | 64.0 | 0.0128 |
| N-Methylpyrrolidone | 64.9 | 82.4 | 0.831 |
| Aluminum Chloride Hexahydrate | 1.2, 4.0, 6.8 | 3.8, 12.7, 21.6 | 0.0145 |

In Experiment II-D, the effect of ferric ammonium sulfate as a catalyst and a retarder for triazine ring closure was tested. The effect of iron(III) on gel time is observed in this experiment. Similar to experiment where the effect of aluminum(III) was observed, increasing amounts of iron(III) are added to the hemiaminal gel as shown in Table 5.

TABLE 5

Formulations for gel samples in Experiment II-D.

| Material | Molar Ratio | Mass (grams) | Moles |
|---|---|---|---|
| Paraformaldehyde | 5.4 | 2.08 | 0.0692 |
| JEFFAMINE ® T-5000 | 1 | 64.0 | 0.0128 |
| N-Methylpyrrolidone | 64.9 | 82.4 | 0.831 |
| Ferric Ammonium Sulfate | 1.1, 1.5, 1.9, 5.2 | 6.8, 9.25, 11.7, 32.1 | 0.0192 |

Experiment II-E compared the effect of aluminum(III) on the relative gel conversion rate of the hemiaminal structure to the triazine structure. Rheologies in Experiment II-E were measured with a Grace Instrument M5600 HPHT rheometer in oscillatory shear mode (at 1 Hz and 10% strain). The formulations that were prepared were based upon the hemiaminal gel described in Table 6. The gel was prepared according to the standard procedure described for experiment II-A. Two samples were prepared for this gel. The first gel sample was heated in the M5600 rheometer to 115° C., and the gel time was determined. Then, 1.2 equivalents (to JEFFAMINE®) of aluminum chloride were added to the second sample in order to produce a room temperature liquid from the sample. It was then heated to 78° C., and the gel time was recorded in the M5600 rheometer.

TABLE 6

Formulations for gel in Experiment II-E.

| Material | Molar Ratio | Mass (grams) | Moles |
|---|---|---|---|
| Paraformaldehyde | 5.4 | 2.08 | 0.0693 |
| JEFFAMINE ® T-5000 | 1 | 64 | 0.0128 |
| N-Methylpyrrolidone | 64.9 | 82.4 | 0.831 |

In Experiment II-F, disintegration of aluminum triazine greater temperature melting point gel was tested. The aluminum triazine gel formed from experiment II-C (Table 4) with 1.2 equivalents of aluminum chloride was tested for reversibility. In this case, 2.45 grams of the aluminum triazine greater temperature melting point gel was added to 40 mL of NMP. The material was heated to 50° C. and stirred. The sample was stirred at 90° C. over the weekend for about 4 days.

Figure 8:
FIG. 8A shows a pictorial representation of Experiment II-F, in which disintegration of aluminum triazine greater temperature melting point gel was tested.
FIG. 8B shows a pictorial representation of Experiment II-F, in which disintegration of aluminum triazine greater temperature melting point gel was tested.
FIG. 8C shows a pictorial representation of Experiment II-F, in which disintegration of aluminum triazine greater temperature melting point gel was tested.

Referring now to FIGS. 8A-C, a pictorial representation is provided of Experiment II-F, in which disintegration of aluminum triazine greater temperature melting point gel was tested. The aluminum triazine gel was placed into a glass vial equipped with a magnetic stir bar, shown in FIG. 8A. 38 mL of NMP was added to the vial, shown in FIG. 8B. The solution was stirred for 4 days at 90° C. After about 4 days' time, the gel was no longer present and the liquid solution turned a dark brown/red color, shown in FIG. 8C.

The experiments described help explain the nature of the gel formation dynamics. In the experiments described, a water insoluble tris-amino polypropylene glycol was used as the condensing amine, paraformaldehyde was used as the electrophile, and NMP was used as the solvent. When the hemiaminal gel (see structure G in FIG. 1B) produced from the condensation is heated to greater than its melting point for an extended period of time, the gel converts into a different kind of gel with a greater melting point and lesser storage modulus than the previous gel. Without being bound to any theory or principle, it is believed that the triazine core of the modified gel can be responsible, in part, for the greater melting point gels (see structure H in FIG. 1B).

For the initial low melting point gels prepared in Gel Concentration Experiment I, the gel melting points varied from between about 55° C. to about 79° C. When the ramp rate for the gel is decreased, a different profile is observed, and it appears that the gel (JEFFAMINE® T-5000:NMP:1:189) does not lose mechanical properties as anticipated for a melting gel. This is one indication of a chemical transformation occurring. The gel prior to heating is a kinetic gel (likely to be predominately structure G in FIG. 1B). If it is heated for long enough and at greater enough temperature, it can transform itself into the thermodynamic greater melting point triazine-based gel (structure H in FIG. 1B).

Figure 9:
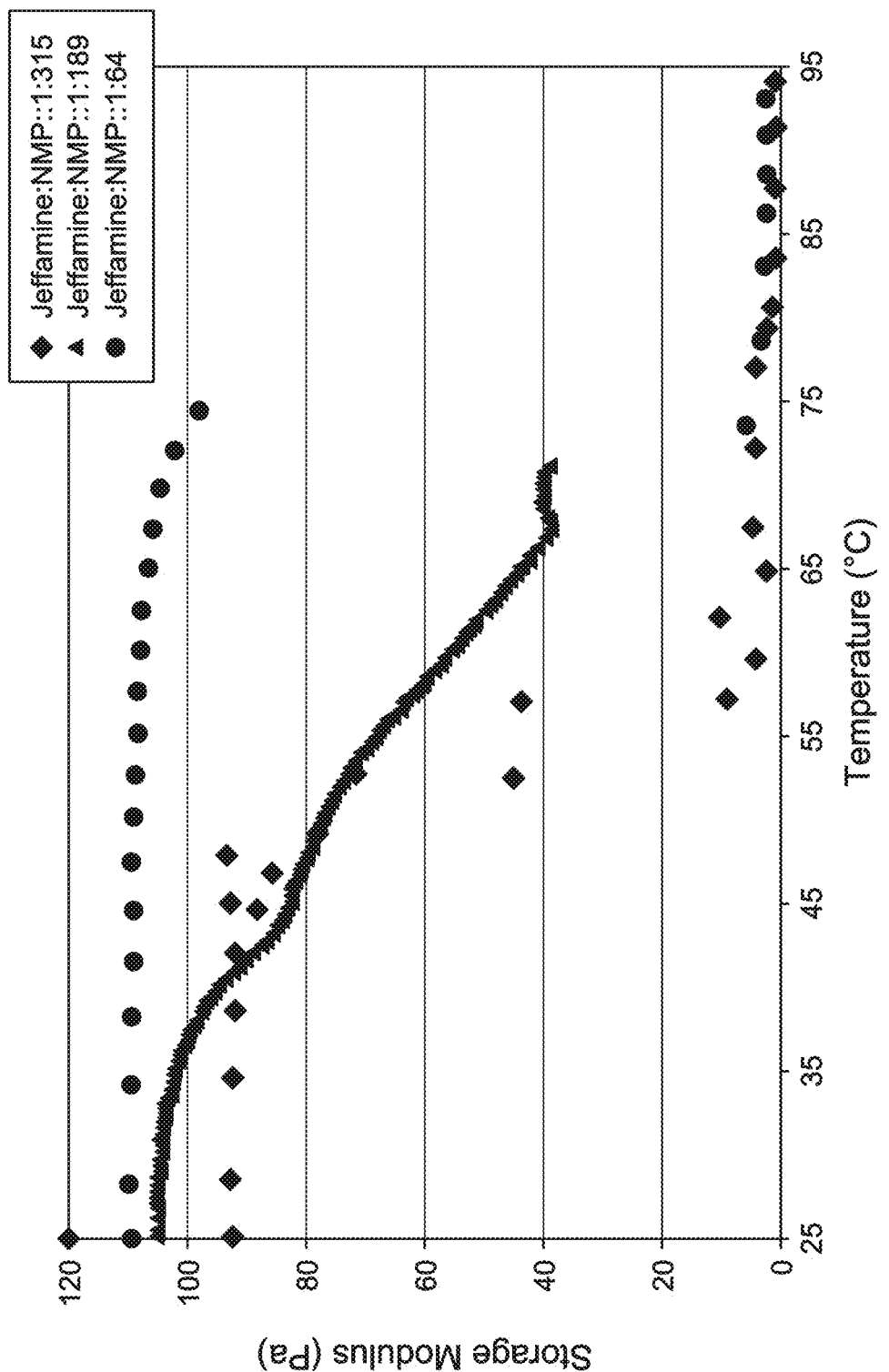
FIG. 9 is a graph showing the storage modulus versus temperature for gels formed with differing molar ratios of JEFFAMINE® to N-methyl pyrrolidone ("NMP"), according to experiments using embodiments of the present disclosure.

The rheological profile of the gels tested in Gel Concentration Experiment I reveal that decreasing the amount of NMP in a given hemiaminal gel increases the melting point of the gel (see FIG. 9 and Table 7). The storage modulus of the gel also changes with the amount of NMP. The loss modulus decreases with a decrease in the relative quantity of NMP while the storage modulus of the hemiaminal gel increases. This indicates that the stiffness of the gel is greater at higher concentrations of organic amine and aldehyde in the polar aprotic solvent.

TABLE 7

Certain physical properties of the gels described in Table 1.

| NMP:JEFFAMINE ® Ratio | Melting Point | Storage Modulus/Loss Modulus (Pa) at 25° C. |
|---|---|---|
| 63:1 | 77-79° C. | 1077 |
| 189:1 | 66-67° C. | 104.9/0.108 |
| 315:1 | 55-57° C. | 92.4/0.274 |

Referring now to FIG. 9, a graph is provided showing the storage modulus versus temperature for gels with differing molar ratios of JEFFAMINE® to NMP, according to experiments of embodiments in the present disclosure. The molar ratio of JEFFAMINE® to paraformaldehyde in all the gels presented is 1:5.4. The amount of NMP is variable. The ratio of JEFFAMINE® to NMP varies from 1:63 to 1:315.

In some embodiments of the present disclosure, it is believed, without being bound by any theory or principle, that the triazine structure can be arrived at by other pathways. For example, when an M(+III) compound, such as ferric chloride or aluminum chloride, with an M(+III) ion is added to a hemiaminal gel, the gel is transformed into a liquid. After heating the liquid for a certain period of time, a gel is also formed. The formed gel is believed to be comprised of the triazine (aminal) core structure with complexation to the metal (see Gel II from Liquid II in FIG. 10).

Figure 10:
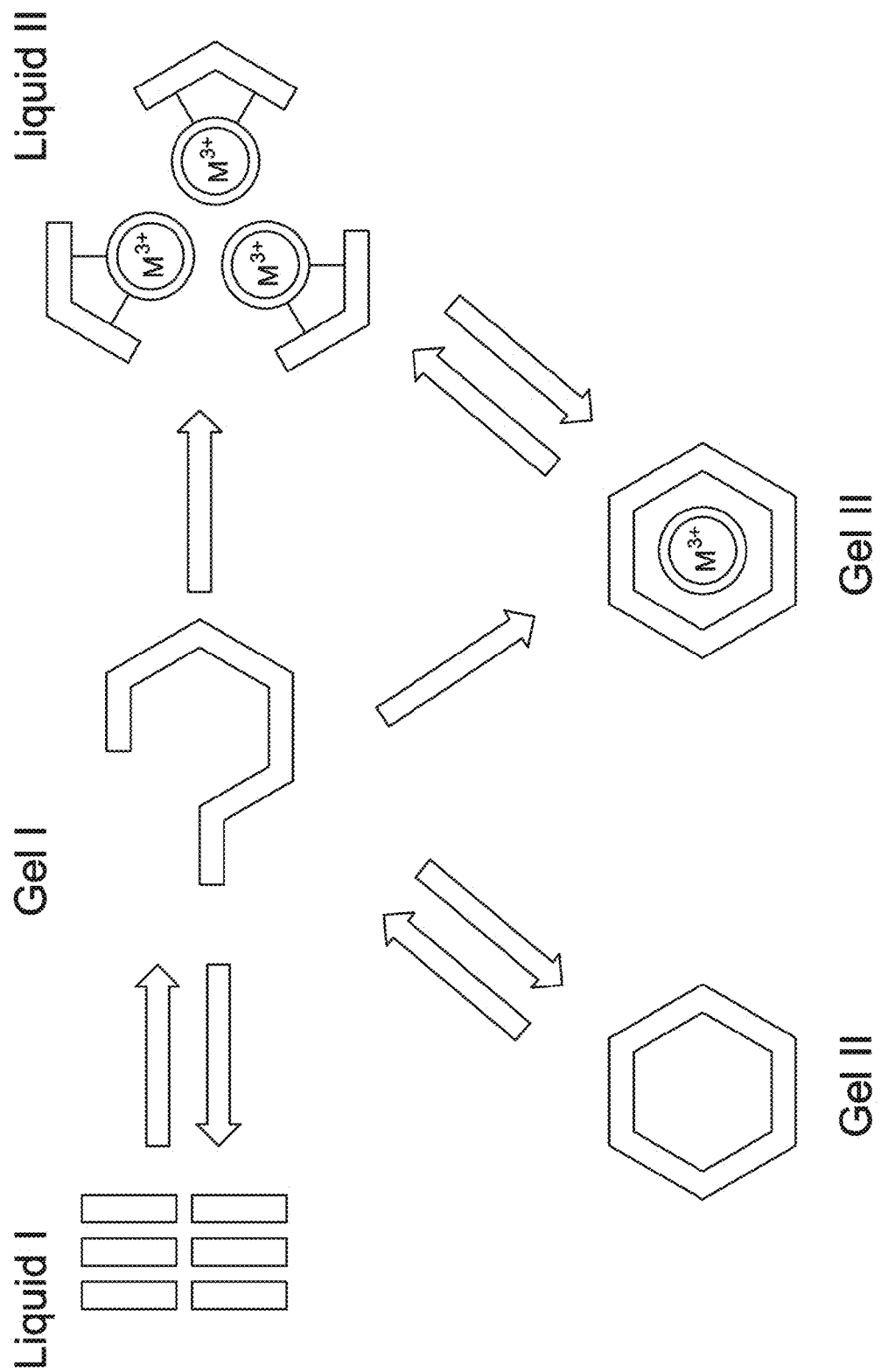
FIG. 10 is a reaction schematic diagram showing equilibrium dynamics of certain metalloaminal gels.

Referring now to FIG. 10, a reaction schematic diagram is provided showing equilibrium dynamics of certain metalloaminal gels. A description of the effect of M(+III) is presented in FIG. 10. The breaking of Gel I occurs, in part, because of the coordination of the CDM and M(+III) to form Liquid II. The coordination occurs because a component from the equilibrium shown in FIGS. 1A and 1B that is not covalently networked as a gel is amplified. Without being bound by any theory or principle, it is believed the coordination of the CDM and M(+III) is one way in which Gel I is transformed from a solid to Liquid II.

The melting point of a 65:5 gel with the addition of 1.1 equivalents of AlCl$_3$ is about 110° C., while the melting point in the absence of the aluminum chloride is about 74° C. Interestingly, when a metal (II) compound, such as ferrous ammonium sulfate, is added to a hemiaminal gel (low melting point gel), the gel is not transformed into a liquid. The material remains as a gel but the mechanical properties are altered. The gel becomes more self-healing. M(+III) compounds are generally better Lewis acids than metal(II) compounds. Without being bound by any theory or principle, it is believed that the greater Lewis acidity of M(+III) compounds provides a component for what is required to break the C—N bonds to make the organometallic complex drawn in FIG. 11, step C.

Figure 11:
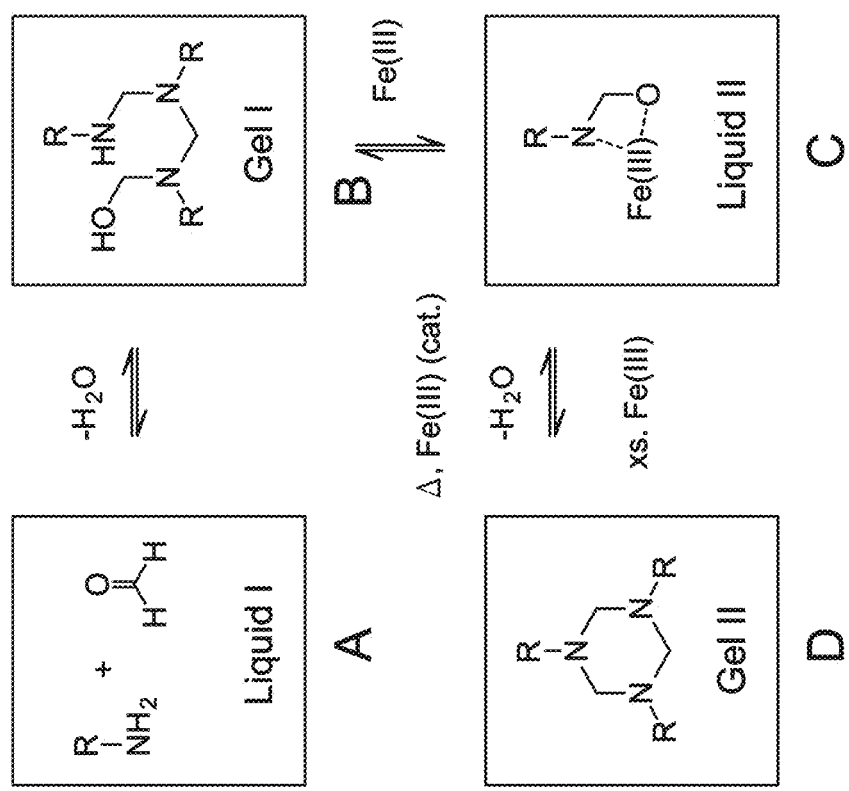
FIG. 11 is a reaction schematic diagram showing molecular structures which predominate in certain gel formation processes of the present disclosure.

Referring now to FIG. 11, a reaction schematic diagram is provided showing certain molecular structures which are believed to predominate in certain gel formation processes of the present disclosure. FIG. 11 provides a condensed view of FIGS. 4-7. At step A, an organic amine and an aldehyde, such as, for example, formaldehyde or paraformaldehyde, are combined (Liquid I). At step B, a hemiaminal low melting point gel is formed (Gel I). At step C, the hemiaminal low melting point gel is changed to a liquid solution by the addition of an M(+III) complex (Liquid II). Iron(III) is shown for example. Using iron(III) as a catalyst and heating allows formation of a greater melting point gel at step D (Gel II). The greater melting point gel at step D, comprising a triazine core, can be returned to a liquid solution by the addition of excess iron(III), or by the addition of acid as discussed previously.

Heating the organometallic liquid described in Table 2 (Experiment II-A) reduces the gel time, or in other words the time it takes a greater melting point gel to form from a liquid solution. Referring now to FIG. 12, a graph is provided showing the time dependence of rheology for the gel formulation described in Table 2 at various temperatures. While it takes about 90 hours to achieve a gel at 55° C., a gel is obtained in about 6 hours at 87° C. (see FIG. 12). Another factor influencing the gel time is the relative concentration of NMP in the formulation. The gel time was longer when 260 equivalents of NMP were used in the formulation (see Table 3 and FIG. 13) as opposed to 65 equivalents as in the formulation presented in Table 2.

Figure 13:
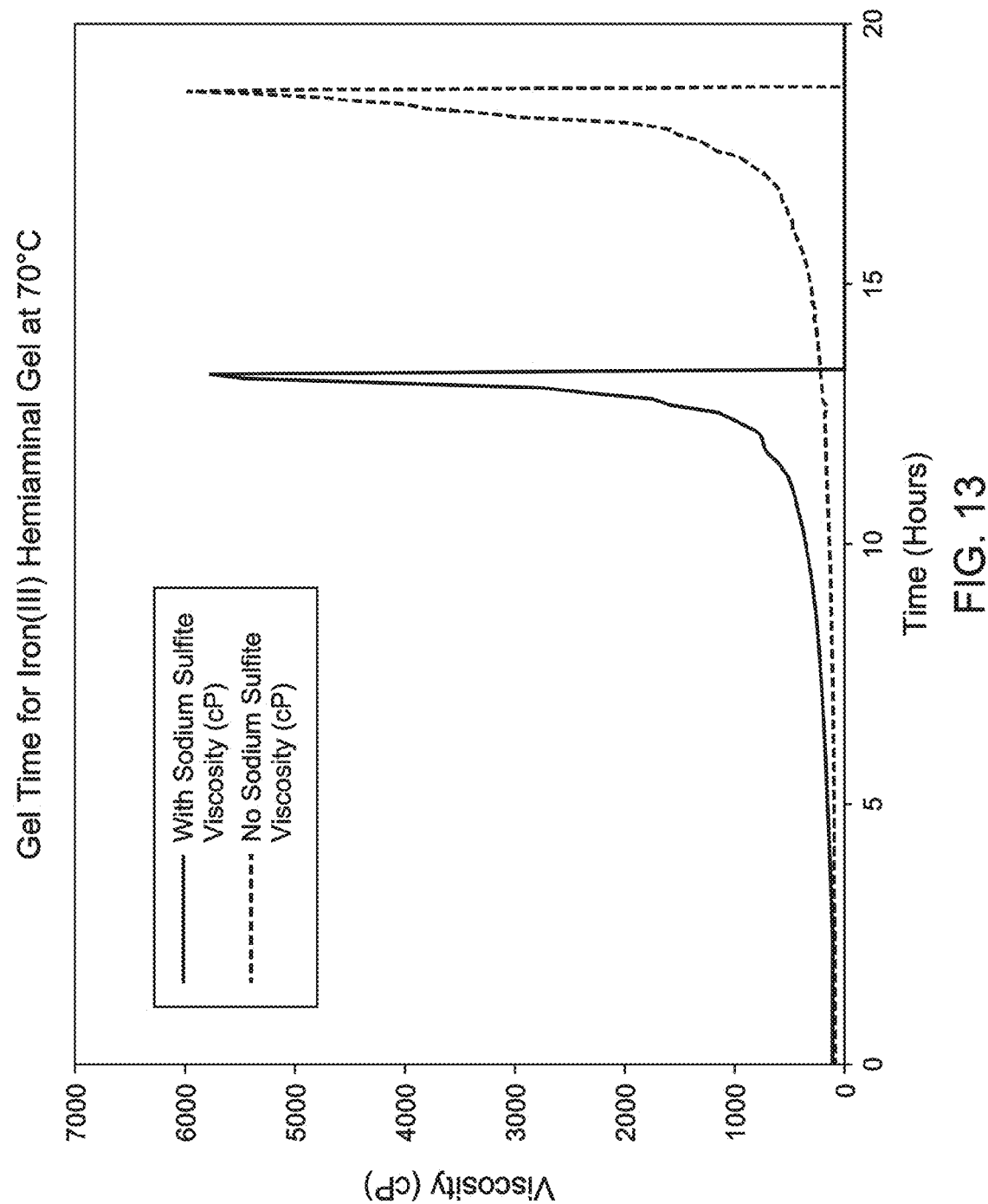
FIG. 13 is a graph showing the viscosity versus time for a sample gel with 24.4 molecular equivalents of sodium sulfite (to JEFFAMINE®) and for a sample gel without sodium sulfite.

Referring now to FIG. 13, a graph is provided showing the viscosity versus time for a sample gel with 24.4 molecular equivalents of sodium sulfite to JEFFAMINE® and showing a sample gel without sodium sulfite. The addition of sodium sulfite to the ferric hemiaminal liquids accelerates the formation of greater melting point triazine-based gels. When the liquid described in Table 3 was heated to 60° C., the liquid transitioned to a gel in about 17.5 hours. From experiment II-B it has been determined that the addition of 9.2 molecular equivalents (relative to JEFFAMINE® T-5000) of sodium sulfite results in a significant shortening of the gel time to 12.5 hours. FIG. 13 depicts this transition. Sodium sulfite therefore can be used as an accelerator to tune the gel time of gel chemical system for producing greater melting point gels.

Figure 14:
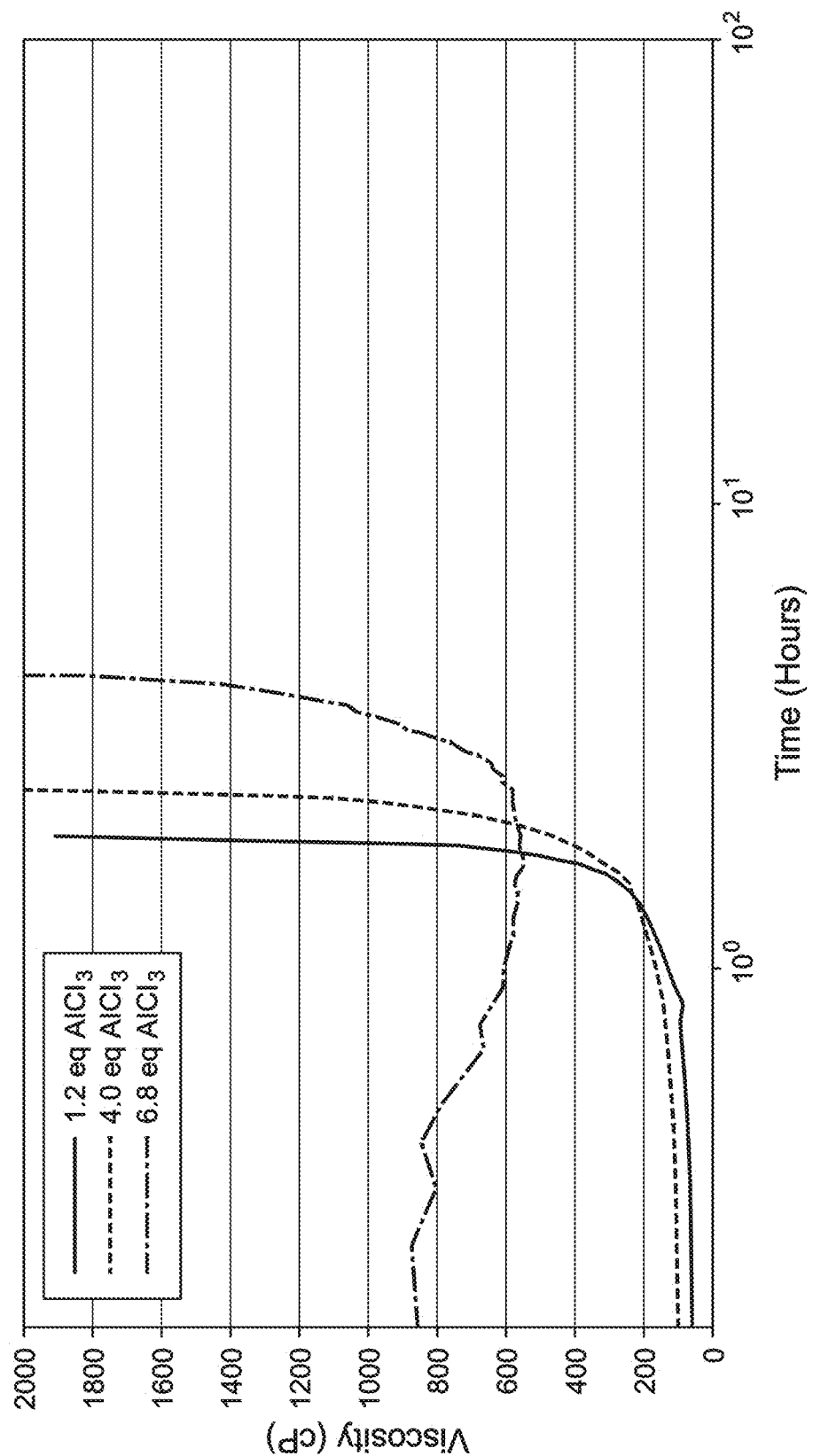
FIG. 14 is a graph showing the effect of increasing aluminum chloride content on gel time at 68° C.

Referring now to FIG. 14, a graph is provided showing the effect of increasing aluminum chloride content on gel time at 68° C. The data from Experiment II-C is presented in FIG. 14. When the precursor hemiaminal liquid is heated to 69° C., the liquid transitions to a gel in about 2.0 hours. The addition of 6.8 molecular equivalents (relative to JEFFAMINE® T-5000) of aluminum chloride hexahydrate results in a significant lengthening of the gel time to 3.5 hours. Therefore, on one hand aluminum(III) acts as a catalyst for the formation of the triazine gel but on the other hand it acts as a retarder. The more aluminum that is added, the slower the transformation to the triazine, after a certain point.

Aluminum chloride acts as both an accelerator to gel formation, catalyzing formation of a triazine complex, and as a retarder by stabilizing reactants prior to the triazine product. Without being bound by any theory or principle, the action of aluminum chloride is believed to occur because a trivalent metal (or "M(+III)") lessens the activation energy for the ring closing of product G to product H (discussed with regard to FIG. 1B). An M(+III) also stabilizes liquid by binding to anyone of the structures from A to F in FIGS. 1A and 1B. This stabilization retards the formation of product H because the relative activation energy is increased by the lessening of the free energies of the structures (A-F) responsible for the liquid state.

In some embodiments, ferric ammonium sulfate accelerates the formation of the triazine, but the addition of increasing amounts of ferric ammonium sulfate to the solution also leads to a decrease in the rate of formation of triazine. This may occur through the same mechanism as the retardation of the product formation in the case of aluminum.

Figure 15:
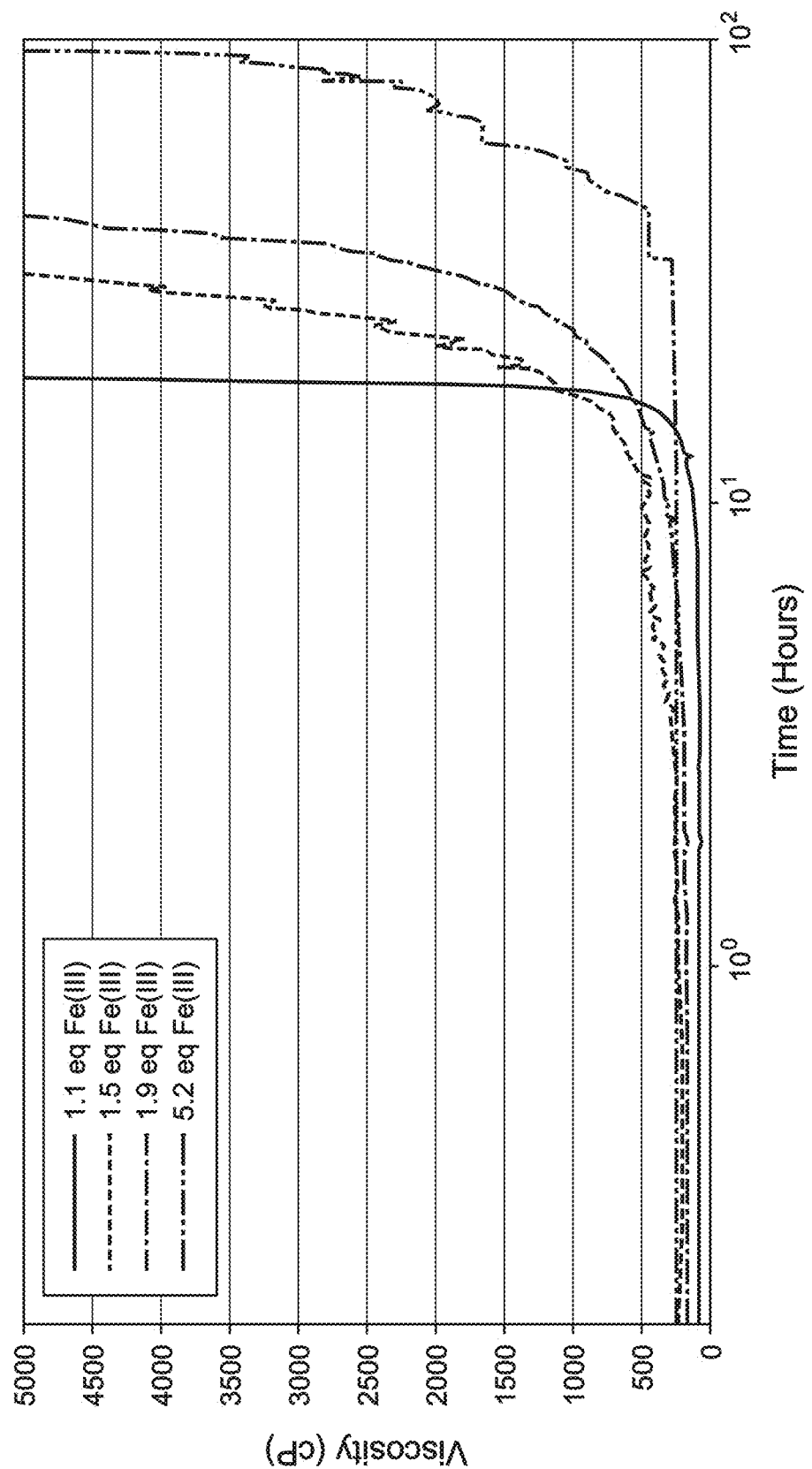
FIG. 15 is a graph showing the effect of increasing ferric ammonium sulfate concentration on gel time at 69° C.

Referring now to FIG. 15, a graph is provided showing the effect of increasing ferric ammonium sulfate concentration on gel time at 69° C. Experiment II-D is the iron(III) analogue to Experiment II-C. In Experiment II-D, increasing the amount of iron(III) relative to the 65:5 hemiaminal organometallic liquid also increases the gel time. The results for Experiment II-D are graphed in FIG. 15.

Figure 16:
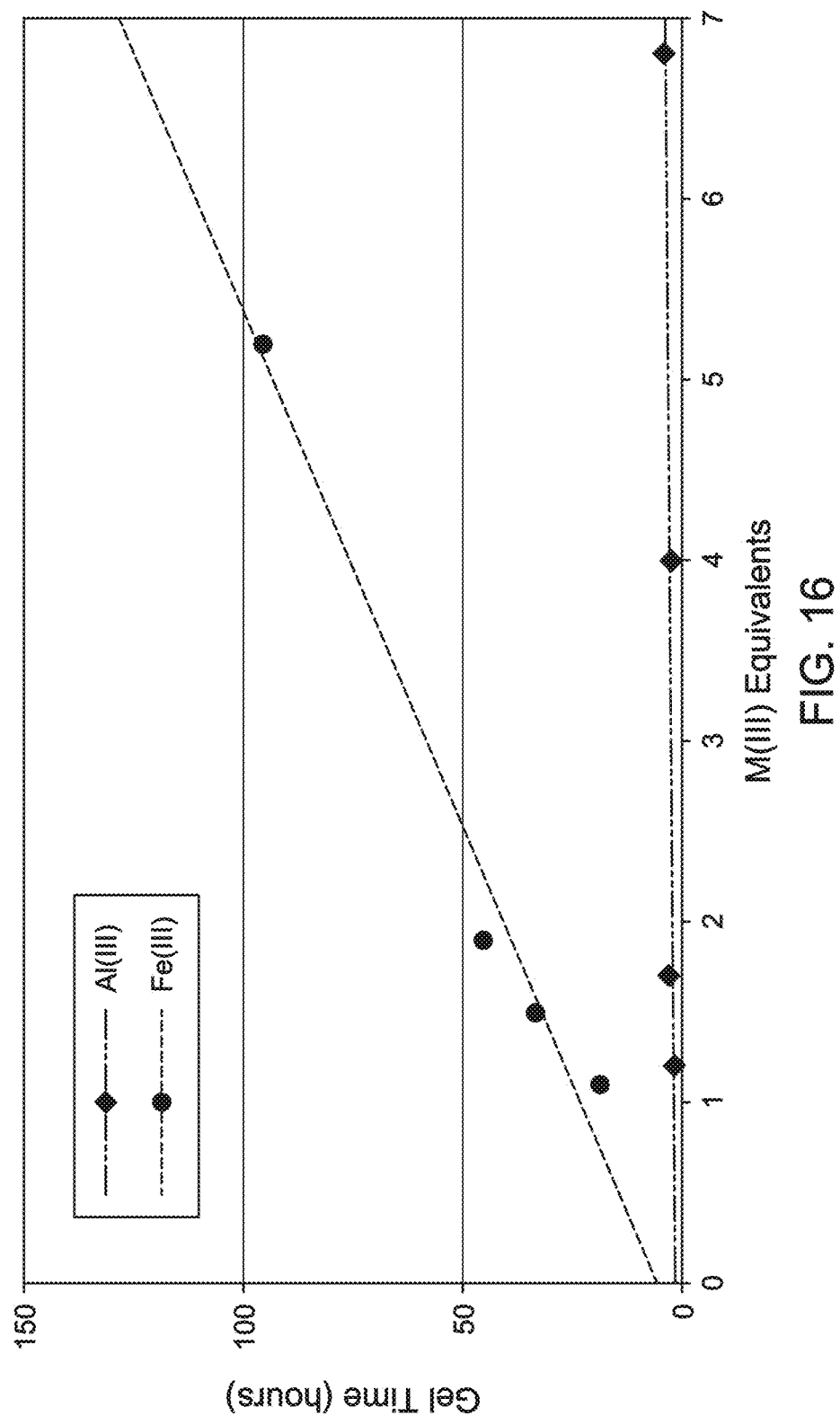
FIG. 16 is a graph plotting the relative gel times for hemiaminal gels complexed with aluminum(III) and iron(III).

Referring now to FIG. 16, a graph is provided plotting the relative gel times for hemiaminal gels complexed with aluminum(III) and iron(III). Comparing the gel times of the iron(III) and aluminum(III) gels shows a substantial increase in the gel time for gels prepared with iron(III). Iron(III) is a more strongly retarding additive to triazine greater melting point gel formation. FIG. 16 shows the difference graphically in a linear plot of gel time to M(+III) concentration. Regardless of their relative differences in terms of retarding effectiveness, they both display this propensity to retard gel formation with increasing concentration.

Aluminum(III) acts as a catalyst for triazine gel formation. Triazine gel formation is faster with 1.1 equivalents of Al(III) than in the absence of a trivalent metal additive. Results from Experiment II-E show that a 65:5 hemiaminal gel was heated to 120° C. (past the melting point of the gel) and analyzed with a Grace Instruments rheometer in oscillatory shear mode (1 Hz and 10% strain).

Figure 17:
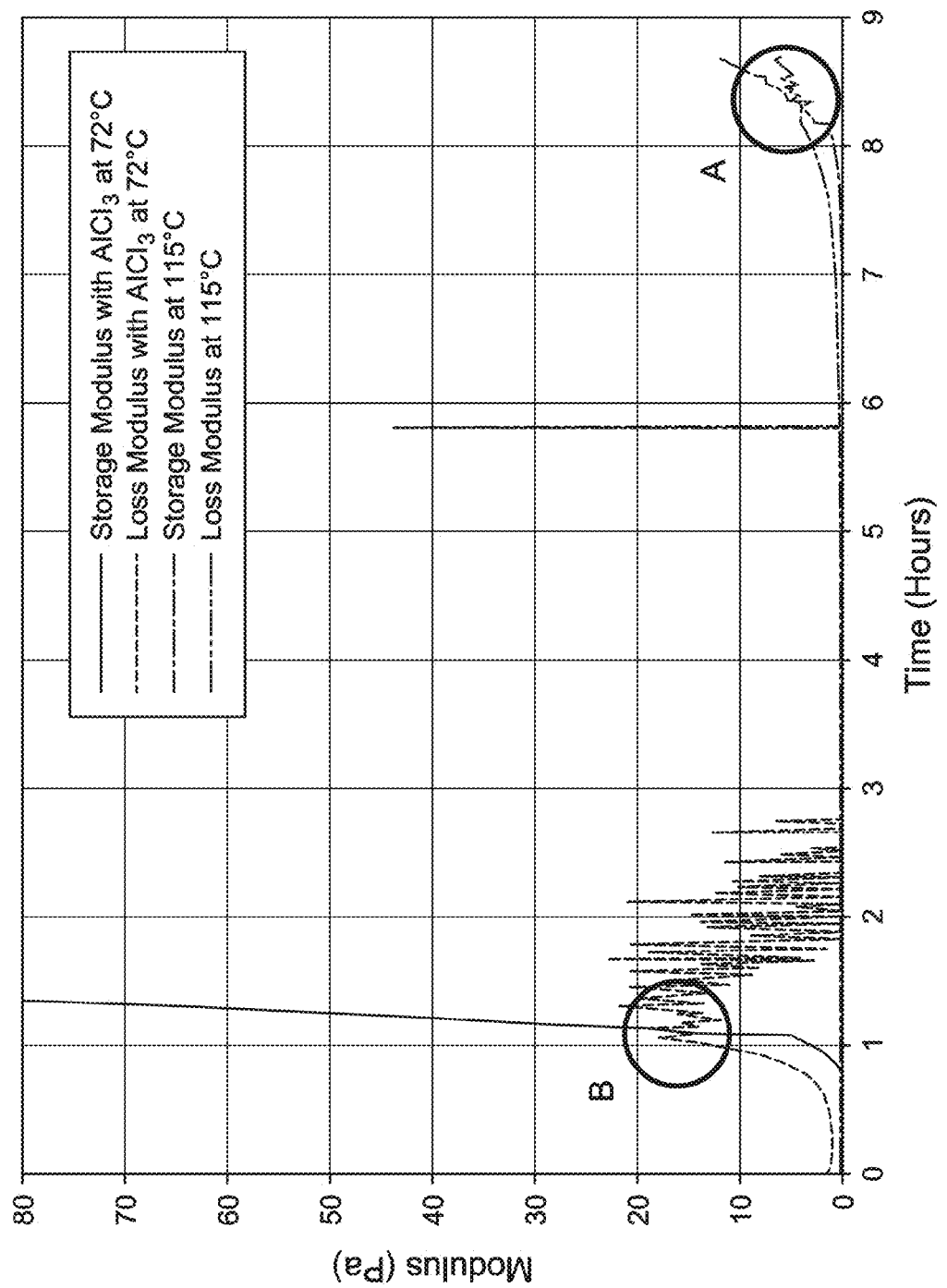
FIG. 17 is a graph showing storage modulus and loss modulus results at 72° C. and 115° C. for the results of Experiment II-E.

Referring now to FIG. 17, a graph is provided showing storage modulus and loss modulus results at 72° C. and 115° C. for the results of Experiment II-E. The cross-over point for the storage and loss moduli for the hemiaminal liquid in the absence of M(+III) at 115° C. occurs at about 8.25 hours (point A), whereas the cross-over point for the storage and loss moduli for the same gel digested with 1.1 equivalents of aluminum(III) occurs at just over an hour at 72° C. (see point B). This cross-over point can be considered as the point where the liquid transforms into a gel. The storage and loss moduli at 25.6° C. are 632 and 0 Pa, respectively. The storage and loss moduli at 77.8° C. are 685 and 0 Pa, respectively. The storage and all modulus values were obtained at 1 Hz with 10% strain. The triazine gelation time of a 65:5 hemiaminal fluid at 115° C. is about 8.3 hours. The storage and loss moduli at 25.0° C. are 1.020 kPa and 0, respectively. The triazine gelation time of a 65:5 hemiaminal fluid with 1.1 equivalents of $AlCl_3$ at 72° C. is about 1.1 hours.

While Gel II, depicted in FIG. 10, can be accessed through complexation with M(+III), Gel II is also accessed in the absence of M(+III). Al(III) hastens the formation of Gel II, but the more Al(III) that is added past a certain point, the slower the conversion becomes.

Figure 18:
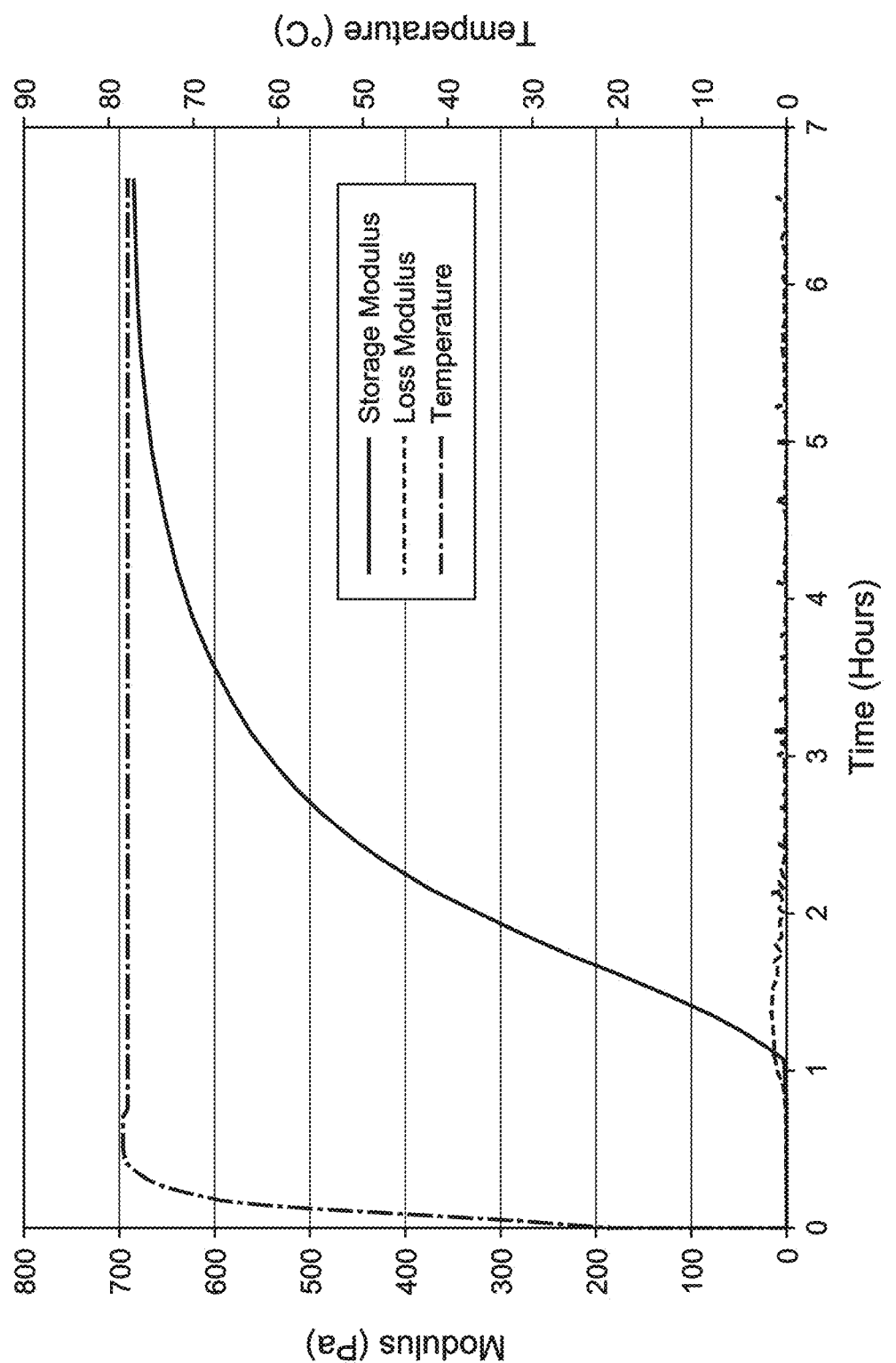
FIG. 18 is a graph showing gelation time of a 65:5 gel with 1.2 eq. of $AlCl_3$ by showing increase in modulus over time.
Figure 19:
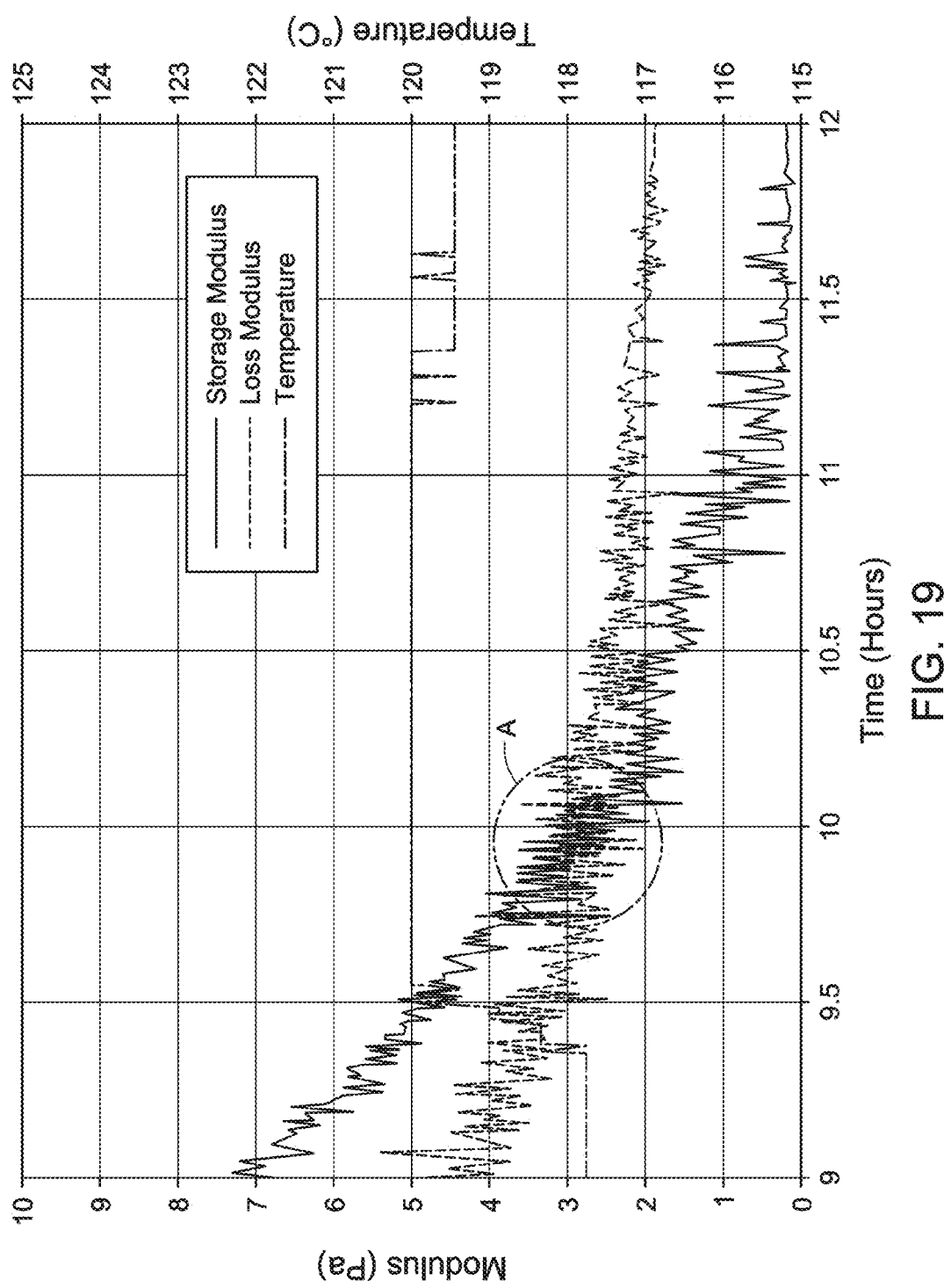
FIG. 19 is a graph showing the cross-over point A of the storage modulus and the loss modulus at about 120° C. for the sample of FIG. 18.

Referring now to FIGS. 18 and 19, FIG. 18 provides a graph showing gelation time of a 65:5 gel with 1.2 equivalents of $AlCl_3$ by showing increase in modulus over time. FIG. 19 is a graph showing the cross-over point A of the storage modulus and the loss modulus at about 120° C. for the sample of FIG. 18.

Additive Release from Hemiaminal Gels

Referring now to FIGS. 20-23, in a first experiment for Additive Release from Hemiaminal Gels, the gel formulation described in Table 8 was tested for timed release activity. JEFFAMINE® ED900 is a polyethylene glycol diamine with a molecular weight of about 900 Da, and was obtained from Huntsman International LLC. LOMAR® D, produced by GEO Specialty Chemicals, is used as an oil well cement disperant and has a signature in the UV range (with a broad absorption peak at about 300 nm) that is useful in the determination of the disintegration of gels and the release of a gel's contents. The gel was produced by heating the formaldehyde with NMP at 60° C. for 40 minutes and then adding the remaining contents and stirring for 30 minutes. The gel appeared to be homogenous. The ultraviolet-visible (UV/VIS) spectrum study of the release of LOMAR® D from the gels was studied by taking a 1.5 gram sample of the gel and placing it in 90 grams of solvent.

In a first test, the solvent was water. In a second test, the solvent was NMP. In a third test, the solvent was 10 grams of $AlCl_3$ dissolved in 90 grams of NMP. In each of these tests for the Additive Release from Hemiaminal Gels Experiment, the baseline was set as the solvent prior to the addition of the gel. Then, the breakdown of the gel was measured by a change in the spectra as a function of time.

TABLE 8

Formulation of a polyethylene glycol based hemiaminal gel for the first Additive Release from Hemiaminal Gels Experiment.

| Material | Molecular Weight | Mass (g) | Moles | Molar Ratio | Ratio |
| --- | --- | --- | --- | --- | --- |
| Formaldehyde | 30.03 | 1.04 | 0.034632 | 2.308802309 | 1 |
| JEFFAMINE ® ED900 | 900 | 13.5 | 0.015 | 1 | 0.433125 |
| NMP | 99.13 | 21.1 | 0.212852 | 14.19012072 | 14.19012 |
| LOMAR ® D | | 0.5 | | | |

Figure 20:
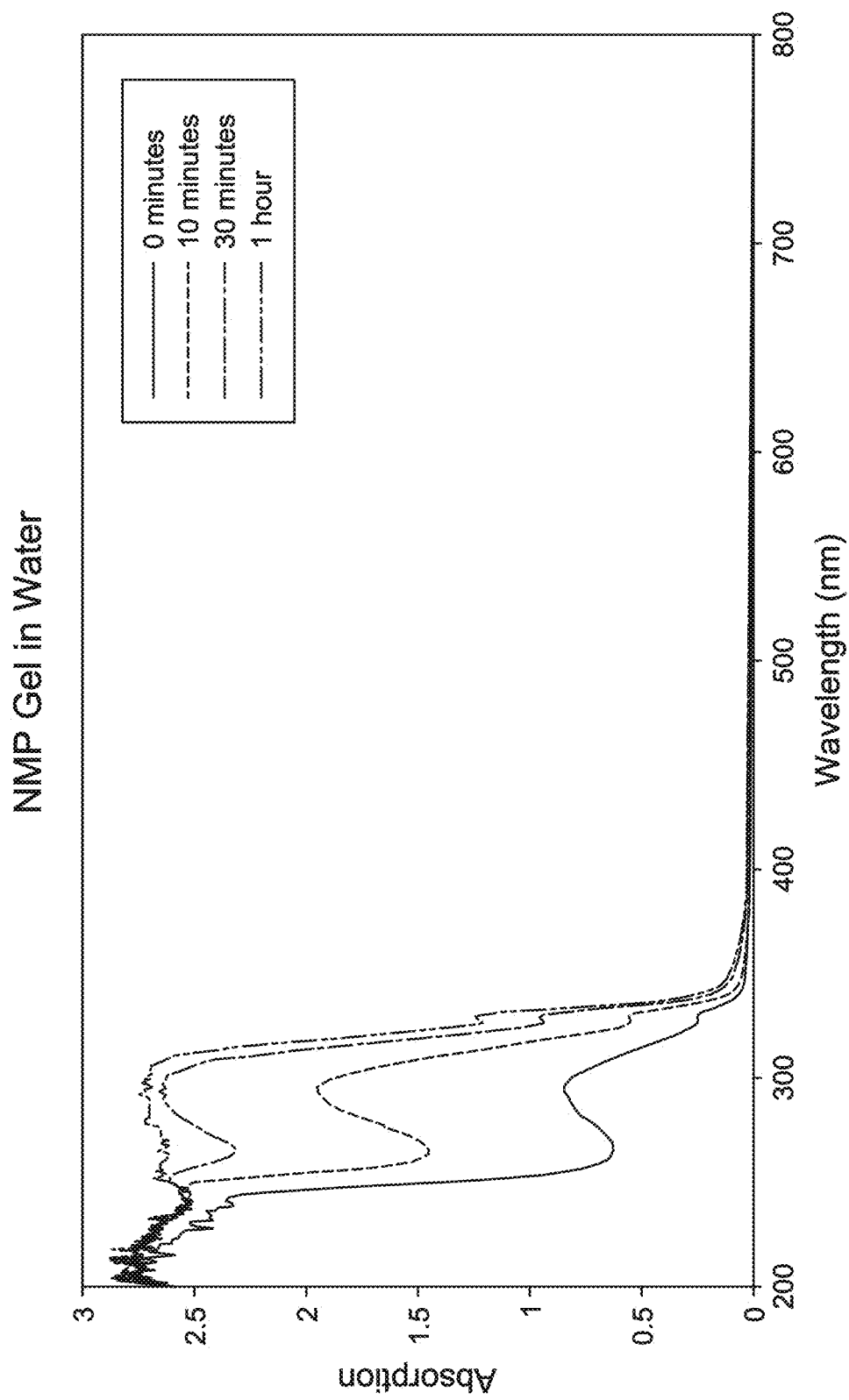
FIG. 20 is a graph showing time resolved ultraviolet-visible ("UV/VIS") spectra for the release of LOMAR® D and the disintegration of a hemiaminal gel in water. After 2 hours, the gel had completely disintegrated and was no longer visible in the liquid.

FIG. 20 is a graph showing time resolved UV/VIS spectra for the release of LOMAR® D and the disintegration of the hemiaminal gel in water. After 2 hours, the gel had completely disintegrated and was no longer visible in the liquid.

Figure 21:
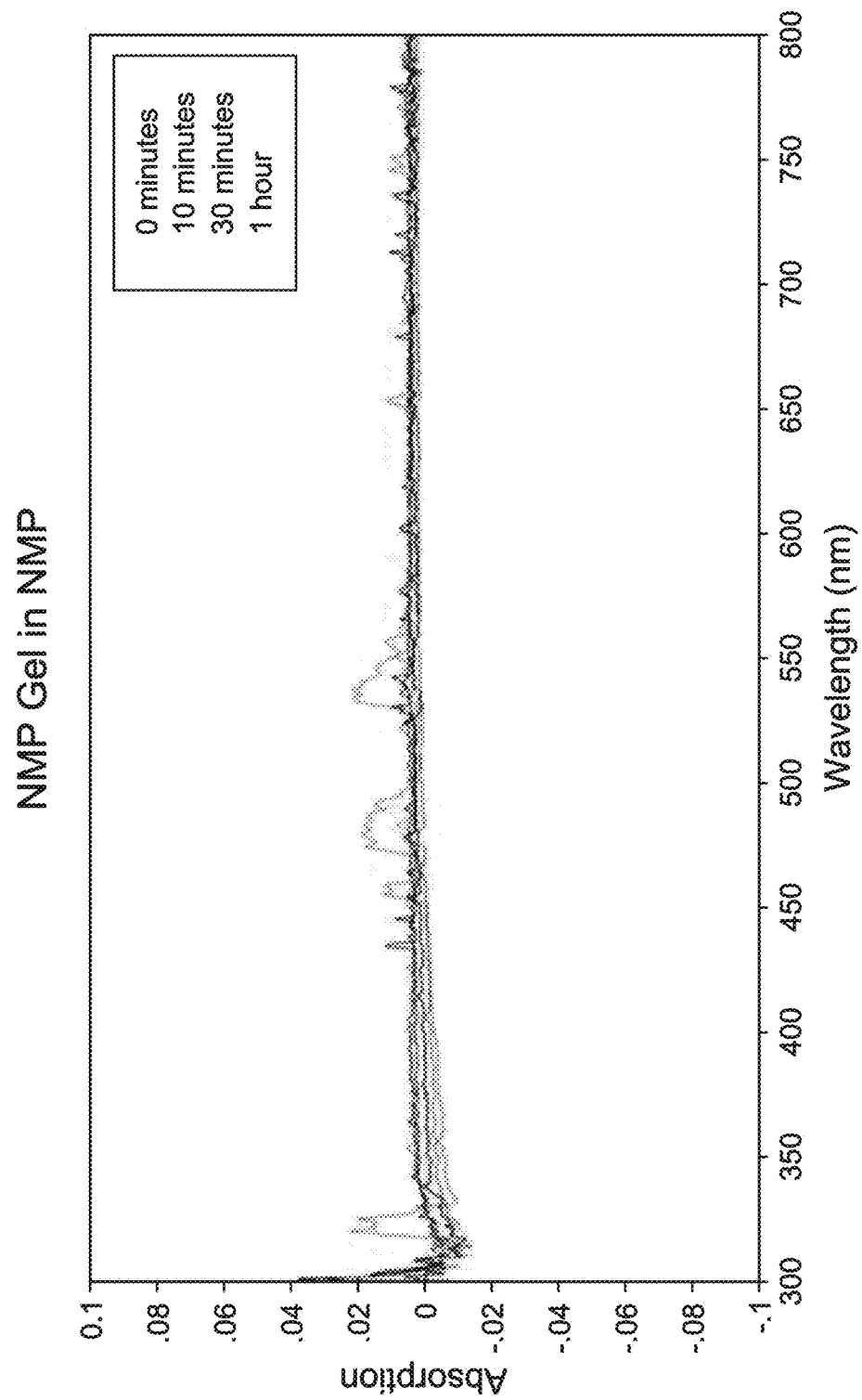
FIG. 21 is a graph showing time resolved UV/VIS spectra for the release of LOMAR® D and the disintegration of a hemiaminal gel in NMP.
Figure 22:
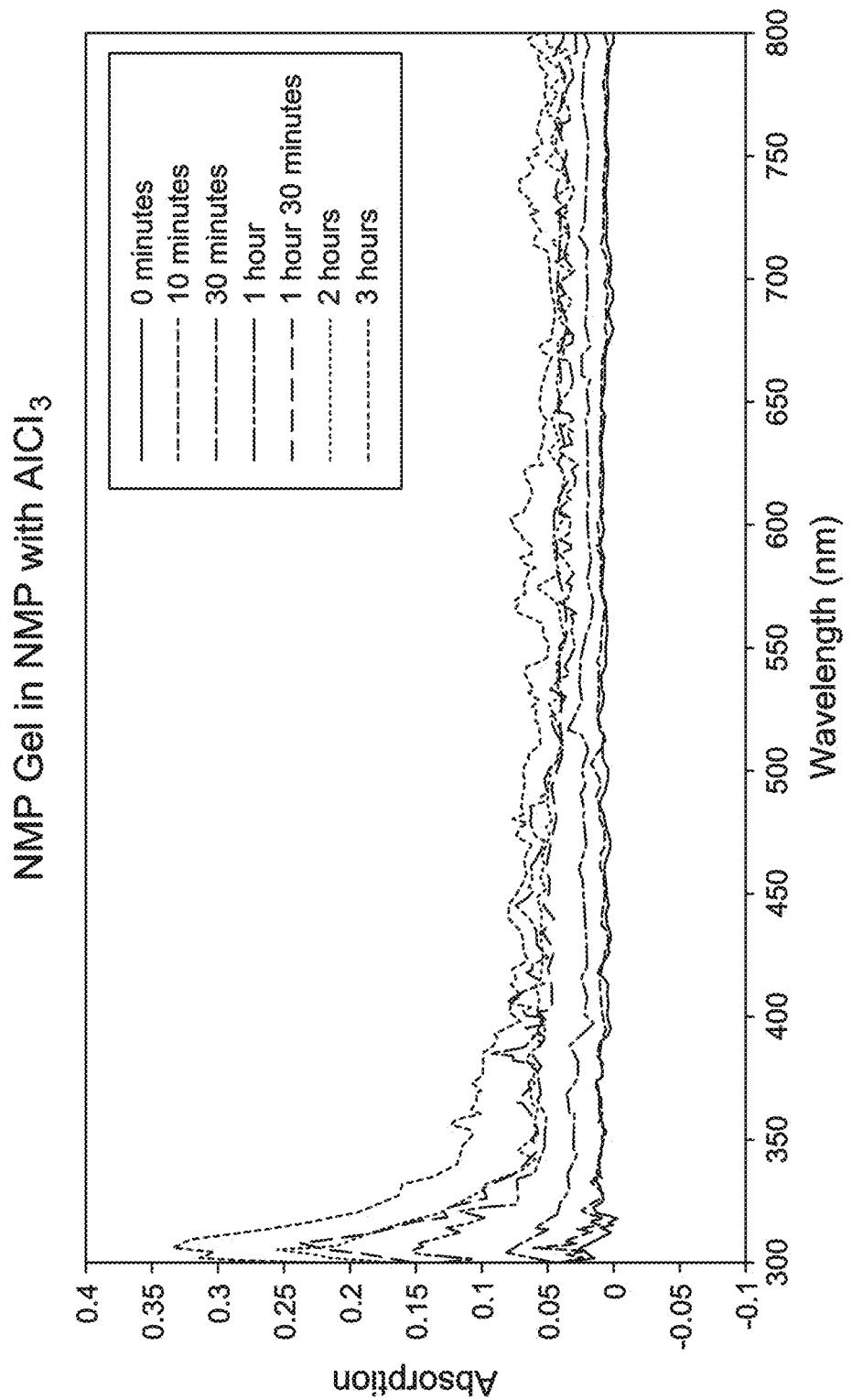
FIG. 22 is a graph showing time resolved UV/VIS spectra for the release of LOMAR® D and the disintegration of a hemiaminal gel in NMP with $AlCl_3$.

FIG. 21 is a graph showing time resolved UV/VIS spectra for the release of LOMAR® D and the disintegration of the hemiaminal gel in NMP. After 24 hours, the gel appeared to be still intact within the liquid. FIG. 22 is a graph showing time resolved UV/VIS spectra for the release of LOMAR® D and the disintegration of the hemiaminal gel in NMP with $AlCl_3$. As can be noted from FIGS. 20-22, the gel responds differently to different solvent environments.

The polyethylene-glycol based gel is sensitive to the presence of water and disintegrated quickly in water (within 2 hours all the gel had disappeared). (This was not the case when the gel was a polypropylene glycol based hemiaminal gel, such as with JEFFAMINE® T-5000). When the tested gel was placed in NMP (FIG. 21), there was no appreciable disintegration of the gel over periods of hours to days at room temperature. FIG. 22 shows the effect of $AlCl_3$ dissolved in the NMP. This caused the gel to disintegrate rapidly. The particulates caused by the disintegration result in increased light scattering. This can be seen in the plot in FIG. 22, as the background from 800 nm to 300 nm increases with time. Observation of the sample also indicated that particulates would be produced in the solvent as the gel was disintegrating. After about 5 hours, the gel in NMP with $AlCl_3$ had completely disintegrated and was no longer visible in the liquid.

In a second experiment for Additive Release from Hemiaminal Gels with N-vinyl pyrrolidone ("NVP") copolymerized with N-butyl acrylate, the gel formulation described in Table 9 was tested for timed release activity. JEFFAMINE® ED900 is a polyethylene glycol diamine with a molecular weight of about 900 Da, and was obtained from Huntsman International LLC. The gel was produced by heating the formaldehyde with NVP at 60° C. for 40 minutes and then adding N-butylacrylate, potassium persulfate, LOMAR® D and stirring for 30 minutes. The solid rendered from this experiment appeared to be homogenous. The UV/VIS study of the release of LOMAR® D from the gels was studied by taking a 1.5 gram sample of the gel and placing it in 90 grams of water.

Figure 23:
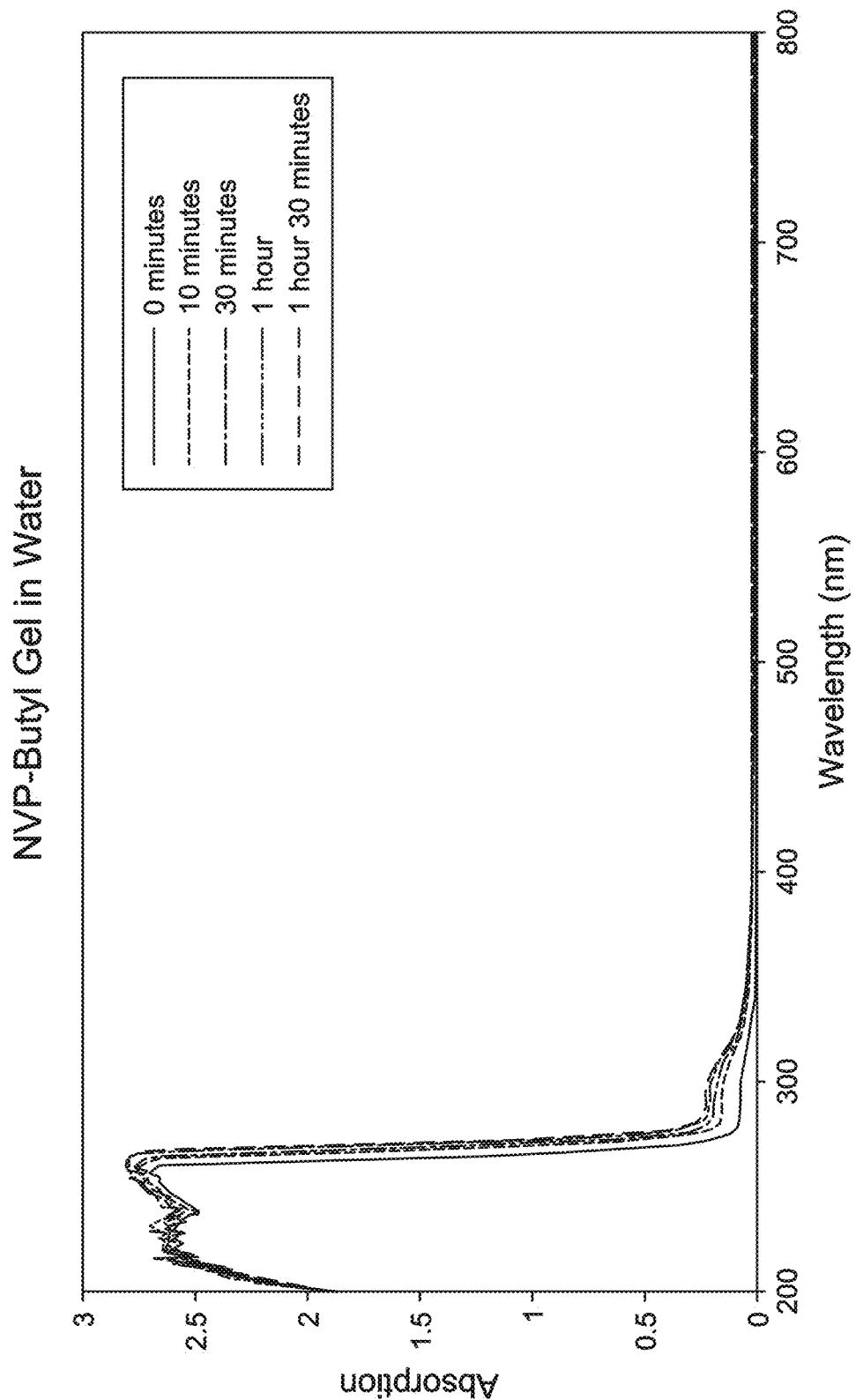
FIG. 23 is a graph showing time resolved UV/VIS spectra for the release profile for an NVP ("N-vinyl pyrrolidone")/N-butyl acrylate polymer-hemiaminal system in water.

As may be noted from FIG. 23, the release profile for NVP/N-butyl acrylate polymer-hemiaminal system in water is substantially different from that of the NMP hemiaminal gel in water, shown in FIG. 22. The NVP/N-butyl acrylate polymer (FIG. 23) clearly inhibits the release of LOMAR® D. More than ten times the amount of polymer is released from the NMP gel (FIG. 22) than from the copolymer system after an hour at room temperature in de-ionized water.

Gel Time Experiments for the Transformation of Gels from Hemiaminal to Triazine-based Gels with Tri-aminated Polypropylene Glycols Tested with Small Amplitude Oscillatory Shear Rheological measurements were performed on an Anton Paar MCR 302 Rheometer equipped with a Peltier heater and an overhead hood for convective temperature regulation. The measuring system was a titanium 25 mm parallel plate measuring system (PP-25 Ti). For all of the melting point determinations, the gels were placed on the stage and melted at a temperature slightly higher than the measured melting point so that they conformed to the geometry of the parallel plates once the plates are 1 mm apart from one another.

Melting points determined with the Anton Paar MCR 302 were observed with a temperature ramp rate of 2° C. per minute. This rate was determined to be the optimum ramp rate for the gels, balancing the thermal conductivity of the compositions with the observed propensity for the fluids to transform into the thermodynamically favored closed-ring triazine.

Certain gels that are kinetic (see for example FIGS. 1A-1B, A-G) and not thermodynamic products (see for example FIG. 1B, H), so a slower ramp rate could affect the results and artificially raise the measured melting point as the gel slowly converts into the thermodynamic ring closed triazine product (see for example FIG. 1B, H). Two degrees Celsius per minute is the fastest ramp rate that ensures that the sample is at the temperature of the base plate of the parallel plates, providing the heating. Gelation times were measured in the Anton Paar MCR 302 operating in oscilla-

TABLE 9

Formulation of a polyethylene glycol based hemiaminal gel for a second Additive Release from Hemiaminal Gels Experiment.

| Material | Molecular Weight | Mass (g) | Moles | Molar Ratio | Ratio |
| --- | --- | --- | --- | --- | --- |
| Formaldehyde | 30.03 | 1.04 | 0.034632 | 2.308802309 | 1 |
| JEFFAMINE ® ED900 | 900 | 13.5 | 0.015 | 1 | 0.433125 |
| NVP | 111.14 | 23.65637 | 0.212852 | 14.19013333 | 6.146102 |
| N-butyl acrylate | 128.17 | 27.28124 | 0.212852 | 14.19013333 | 6.146102 |
| Potassium Persulfate | 270.322 | 0.25 | 0.000925 | 0.061654866 | 0.026704 |
| LOMAR ® D | | 0.5 | | | |

While downhole pH values can vary, water-based drilling fluids typically range from about pH 8 to about pH 12. Oil well cement is typically of a pH between about pH 10 and about pH 11.5. In the case where the gels of the present disclosure are introduced to water-based drilling fluids, the stability of the gel can be tested in the presence of the drilling fluid for compatibility by one of ordinary skill in the art.

In embodiments of the present disclosure, the reversible aminal gels disclosed can be used in compositions, systems, and methods for extracting hydrocarbons from hydrocarbon-producing reservoirs. In some embodiments, delayed acid precursors such as polyester, polylactic acid ("PLA"), and polyglutamic acid ("PGA"), for example, can be considered to reverse the gel when it is required to remove the gel as a liquid, for example in the application of temporarily plugging a well.

tory mode at a frequency of 1 Hz and a strain amplitude of 1%. All gel times measured through this method where measured at 70° C.

The method for synthesizing the hemiaminal gels was as follows: JEFFAMINE® T-5000 was added to formaldehyde in NMP. JEFFAMINE® T-5000 is a tris primary amine of polypropylene glycol with an approximate molecular weight of 5000 Da. To prepare the hemiaminal gels, paraformaldehyde was added to NMP and stirred for 30 minutes at 60° C. Then an amount of JEFFAMINE® T-5000 was added to the NMP solution and stirred for 20 minutes at 60° C.

In experiments where $NH_4(Fe(II))SO_4$ was added, 0.2 grams of Fe(II) was added directly to the newly formed hemiaminal molten gel prior to removing from heat. After the addition of the ferrous compound, the sample was removed from the heat and stirred until homogeneous while cooling to room temperature. For samples where the addition of trivalent metal salts was examined, the gel formed from the condensation of formaldehyde and JEFFAMINE®

T-5000 in NMP was broken down through the addition of an Fe(III) or Al(III) complex. In order to hasten the complexation of metal in the material, the gel was sliced into small pieces to increase the surface area for reaction with the metal salt.

The amount of JEFFAMINE® added to the solution was varied to demonstrate the effect of the change in amine to aldehyde concentration from an amine to aldehyde ratio of 0.55 to 1.7. These samples are labeled A-1 through A-5 in Table 10. Table 1 describes the proportions of the components in the tested gel. The mixing of the materials here is also referred to as General Chemical Method I.

TABLE 10

Formulations for the different samples for Gel Time Experiments for the Transformation of Gels from Hemiaminal to Triazine-based Gels with Tri-aminated Polypropylene Glycols tested with small amplitude oscillatory shear. Variable amine:aldehyde ratio with a formaldehyde concentration of 0.216M.

| Sample | Mass of JEFFAMINE® T-5000 (g) | JEFFAMINE® T-5000 (millimoles) | Amine:Aldehyde Ratio |
|---|---|---|---|
| A-1 | 4.0 | 0.8 | 0.55 |
| A-2 | 6.0 | 1.2 | 0.83 |
| A-3 | 8.0 | 1.6 | 1.1 |
| A-4 | 10 | 2.0 | 1.4 |
| A-5 | 12 | 2.4 | 1.7 |

As a comparison point, a parallel set of gels was made of A-1 to A-5 where 0.2 grams of $NH_4(Fe(II))SO_4$ was added prior to cooling the gel in the process of the hemiaminal synthesis described in General Chemical Method I.

Experiments for Gel Destruction and Reformation with Aluminum Chloride

Gels produced through the condensation of formaldehyde and polypropylene glycol amine can be transformed into liquids through the addition of a trivalent metal. In this experiment, the effect of aluminum chloride hexahydrate is studied as a function of concentration of gels of identical composition. After the gel is reverted to a liquid, it is then heated to observe the second gelation time of the material. These transitions were examined rheologically with temperature and small amplitude oscillatory shear (SAOS) experiments.

The formaldehyde concentration was 81.7 mM in NMP with an amine to aldehyde ratio of 0.55. The amount of aluminum chloride added to the solution was varied to demonstrate the effect of the change in trivalent metal concentration on the gelation of the liquid. These samples are labeled B-1 through B-4 in Table 12. After the addition of aluminum to the hemiaminal gels and following the transformation of the materials into liquids, the gel times of the materials were observed at 70° C. in a rheometer set to measure at fixed frequency (1 Hz) and amplitude (0.1% strain) in SAOS mode.

TABLE 11

Formulation for initial hemiaminal gel in Experiments for Gel Destruction and Reformation with Aluminum Chloride.

| Material | Molar Ratio | Mass (grams) | Moles |
|---|---|---|---|
| Paraformaldehyde | 5.4 | 1.04 | 0.0346 |
| JEFFAMINE® T-5000 | 1 | 32.0 | 0.0064 |
| N-Methyl pyrrolidone | 64.9 | 41.2 | 0.4155 |

TABLE 12

Varying amounts of aluminum chloride added to initial hemiaminal gels.

| Sample | Molar Ratio to JEFFAMINE® T-5000 | Mass of $AlCl_3 \cdot 6H_2O$ (g) | Moles of $AlCl_3 \cdot 6H_2O$ |
|---|---|---|---|
| B-1 | 1.13 | 1.75 | 0.00725 |
| B-2 | 1.46 | 2.25 | 0.00932 |
| B-3 | 1.94 | 3.0 | 0.0124 |
| B-4 | 2.27 | 3.5 | 0.0145 |

Experiments for Demonstration of the Effect of Aluminum Chloride Concentration on the Gelation Time.

The effect of aluminum chloride was examined in this experiment. As shown in the formulation in Table 13, increasing amounts of aluminum chloride were added to the 65:5 hemiaminal gel. This gel had a composition with amine to aldehyde molar ratio of 0.55 and a formaldehyde concentration of 0.865 M. For each of these three compositions with differing concentrations of aluminum chloride hexahydrate, the gelation time is measured at a temperature of 68° C.

TABLE 13

The formulations examined in Chemical Method II (as described further as follows). Amine to aldehyde molar ratio of 0.55 at a formaldehyde concentration of 0.865M.

| Material | Molar Ratio | Mass (grams) | Moles |
|---|---|---|---|
| Paraformaldehyde | 5.4 | 2.08 | 0.0692 |
| Jeffamine T-5000 | 1 | 64.0 | 0.0128 |
| N-Methyl pyrrolidone | 64.9 | 82.4 | 0.831 |
| Aluminum Chloride Hexahydrate | 1.2, 4.1, 7.0 | 3.8, 12.7, 21.6 | 0.0157, 0.0526, 0.0895 |

Experiments for Gel Destruction with Ferric Ammonium Sulfate

The gels, A-1 through A-5, were reacted with ferric ions in the form of ferric ammonium sulfate, whereby ferric ammonium sulfate was added in the amount of 0.51 millimoles ("mmoles") (0.246 g) to render the ferric to JEFFAMINE® T-5000 ratio to be 0.63, 0.42, 0.32, 0.25, and 0.21 for samples A-1 through A-5, respectively.

Experiments for the Demonstration of the Effect of Ferric Ammonium Sulfate as a Catalyst and a Retarder for Triazine Ring Closure As in the Experiments for Demonstration of the Effect of Aluminum Chloride Concentration on the Gelation Time, the gel examined for Experiments for the Demonstration of the Effect of Ferric Ammonium Sulfate as a Catalyst and a Retarder for Triazine Ring Closure has a composition with amine to aldehyde molar ratio of 0.55 and a formaldehyde concentration of 0.865 M. The effect of iron(III) concentration on the gelation time was observed in this experiment. Varying amounts of iron(III) were added to the hemiaminal gel as described in Table 14. The gelation times are measured at 68° C.

TABLE 14

Varying amounts of iron(III) were added to the hemiaminal gel as shown.

| Material | Molar Ratio | Mass (grams) | Moles |
|---|---|---|---|
| Paraformaldehyde | 5.4 | 2.08 | 0.0692 |
| Jeffamine T-5000 | 1 | 64.0 | 0.0128 |
| N-Methyl pyrrolidone | 64.9 | 82.4 | 0.831 |

TABLE 14-continued

Varying amounts of iron(III) were added to the hemiaminal gel as shown.

| Material | Molar Ratio | Mass (grams) | Moles |
|---|---|---|---|
| Ferric Ammonium Sulfate Dodecahydrate | 1.1, 1.5, 1.9, 5.2 | 6.8, 9.25, 11.7, 32.1 | 0.014, 0.019, 0.024, 0.067 |

General Chemical Method II. The Addition of Tris(2-carboxyethyl)Phosphine to Triazine Certain experiments tested triggered release from a triazine gel. In other words, "cracking open the ring" was tested, for example by the addition of phosphine to aluminum aminal gels. 3.01 grams of liquid, B-1, was heated to 70° C. for 2 hours. Then, 1.38 grams of tris(2-carboxyethyl)phosphine was added to the gel along with 2 grams of N-methyl pyrrolidone. The material was stirred for three days. After three days it was dissolved. The shear modulus of B-1 was compared at each of these steps.

TABLE 15

Gel formulations for the different "A" samples.

| Sample | Mass of Jeffamine T-5000 (g) | Jeffamine T-5000 (mmoles) | Amine:Aldehyde Ratio | Hemiaminal Measured Melting Points (° C.) | Hemiaminal to Aminal at 110° C. (min) |
|---|---|---|---|---|---|
| A-1 | 4.0 | 0.8 | 0.55 | 51.1 | 206 |
| A-2 | 6.0 | 1.2 | 0.83 | 73.1 | |
| A-3 | 8.0 | 1.6 | 1.1 | 105.5 | 192 |
| A-4 | 10 | 2.0 | 1.4 | 79.4 | 230 |
| A-5 | 12 | 2.4 | 1.7 | 68.0 | 276 |

Figure 24:
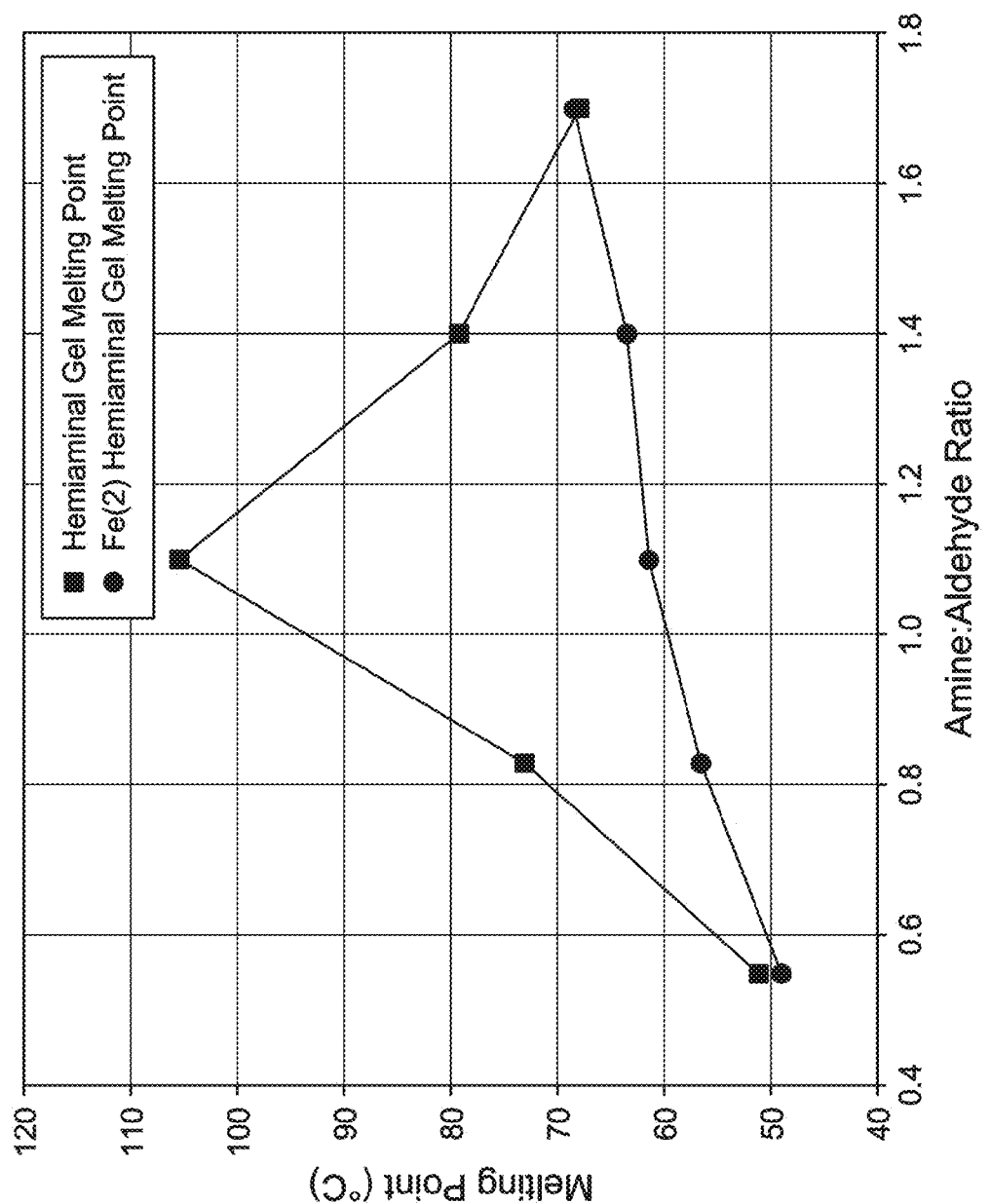
FIG. 24 is a graph showing the melting point trend as a function of amine:aldehyde ratio for hemiaminal gels of the present disclosure.

Table 15 summarizes the melting points and hemiaminal to triazine conversion rates of the formulations A-1 through A-5. Through these samples, the amine (from JEFFAMINE® T-5000) to aldehyde ratio is adjusted from 0.55 to 1.7. The melting points of the hemiaminal gels (A1 through A5) are observed to vary as a function of the amine to aldehyde ratio. FIG. 24 plots this relation. The highest melting point is observed for the amine to aldehyde ratio of about 1:1, likely, without being bound by any theory or principle, because this ratio offers the maximum number of aldehyde reacted amine to free amine while ensuring the minimum amount of reduction in the free amine ends in a polymer chain. Ultimately, in certain embodiments, the triazine (thermodynamic product) requires a 1:1 amine to aldehyde ratio to be optimized. Other ratios may reduce the branch density of the polymer network.

Referring now to FIG. 24, the melting point trend is shown as a function of amine:aldehyde ratio for gels produced through the method described in this section. For all gels tested, JEFFAMINE® T-5000 was used as the amine, and the molar concentration of formaldehyde in NMP was 0.216 M.

When Mohr's salt (ammonium iron(II) sulfate hexahydrate) was added to the gels in the synthesis of the gels, the melting points were lowered from their values in the absence of iron(II) with the exception of A-5 which increases by 0.5° C. Furthermore, the presence of iron(II) appears to catalyze the formation of the triazine structure from the open hemiaminal structure. All gels that are converted to the triazine rings structures have melting points in excess of 200° C., which is the high temperature range of the Anton Paar MCR 302.

TABLE 16

Samples A-1 through A-5 prepared with 0.2 g of Mohr's salt.

| Sample | Mass of JEFFAMINE ® T-5000 (g) | JEFFAMINE ® T-5000 (mmoles) | Amine:Aldehyde Ratio | Amine:Fe(II) ratio | Fe(2) Hemiaminal Measured Melting Points (° C.) |
|---|---|---|---|---|---|
| A-1 | 4.0 | 0.8 | 0.55 | 0.64 | 49.0 |
| A-2 | 6.0 | 1.2 | 0.83 | 0.43 | 56.5 |
| A-3 | 8.0 | 1.6 | 1.1 | 0.32 | 61.4 |
| A-4 | 10 | 2.0 | 1.4 | 0.26 | 63.4 |
| A-5 | 12 | 2.4 | 1.7 | 0.21 | 68.5 |

Figure 25A:
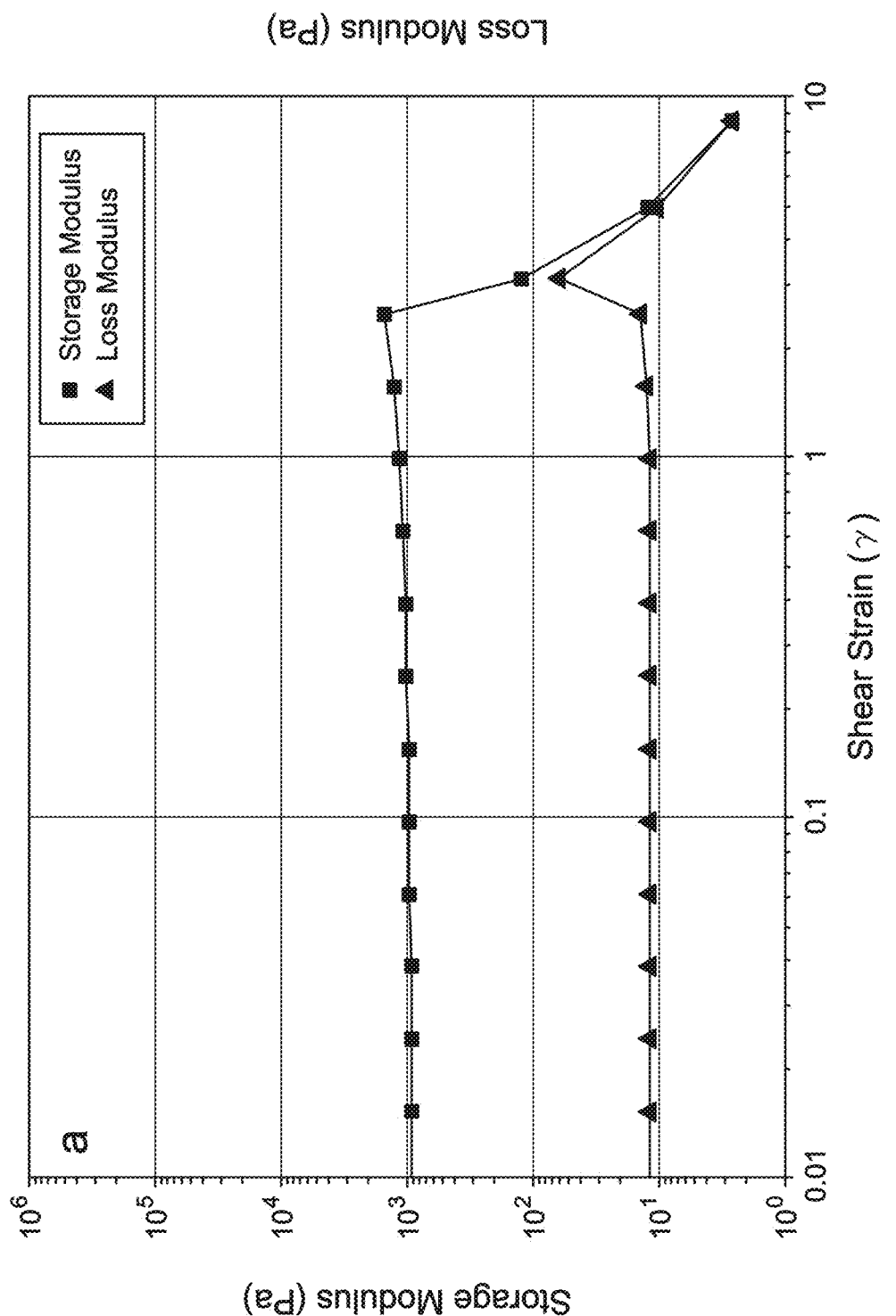
FIG. 25A is a graph showing an amplitude sweep of sample A-1 from General Chemical Method II.
Figure 25B:
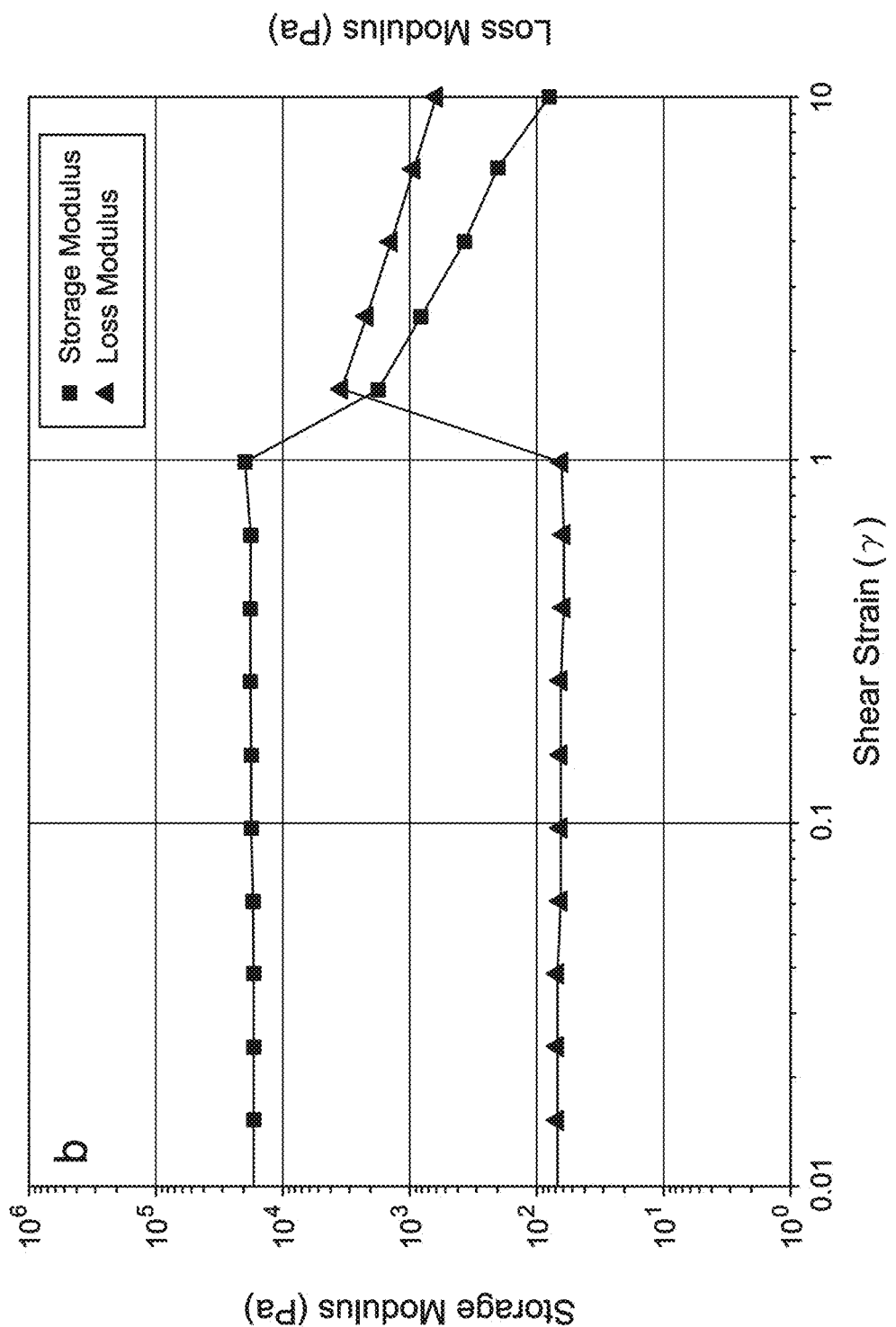
FIG. 25B is a graph showing an amplitude sweep of sample A-2 from General Chemical Method II.
Figure 25C:
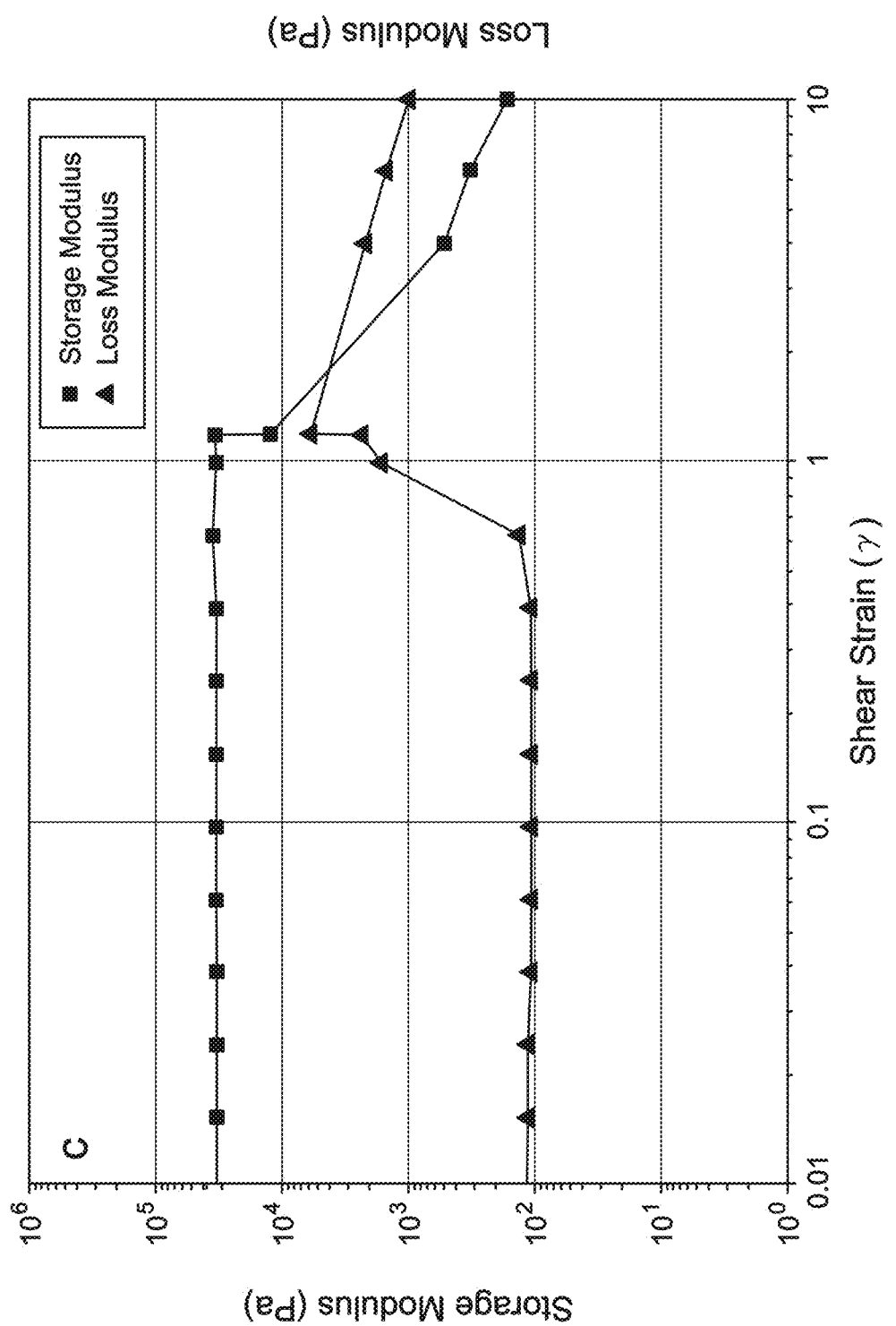
FIG. 25C is a graph showing an amplitude sweep of sample A-3 from General Chemical Method II.
Figure 25D:
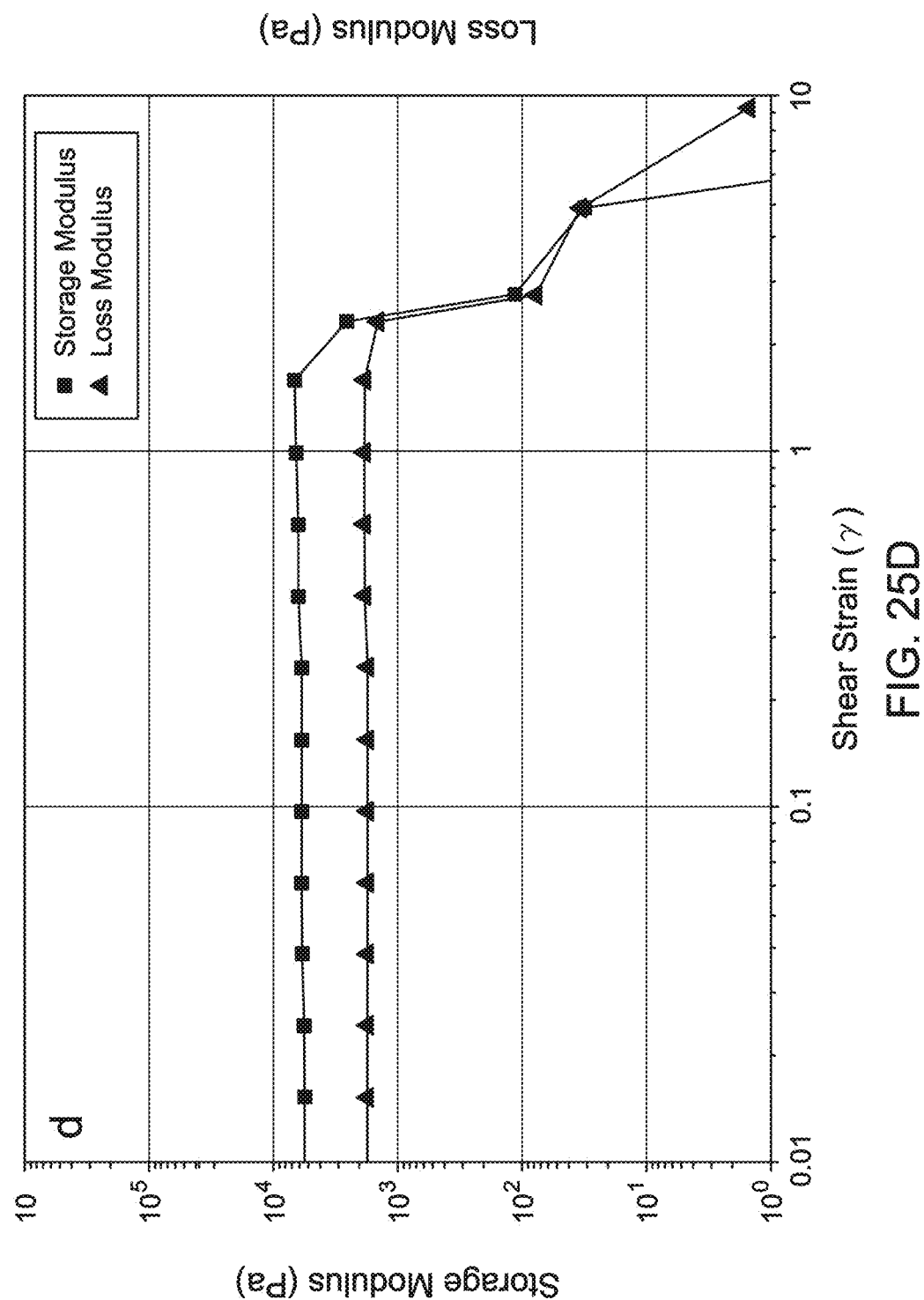
FIG. 25D is a graph showing an amplitude sweep of sample A-4 from General Chemical Method II.
Figure 25E:
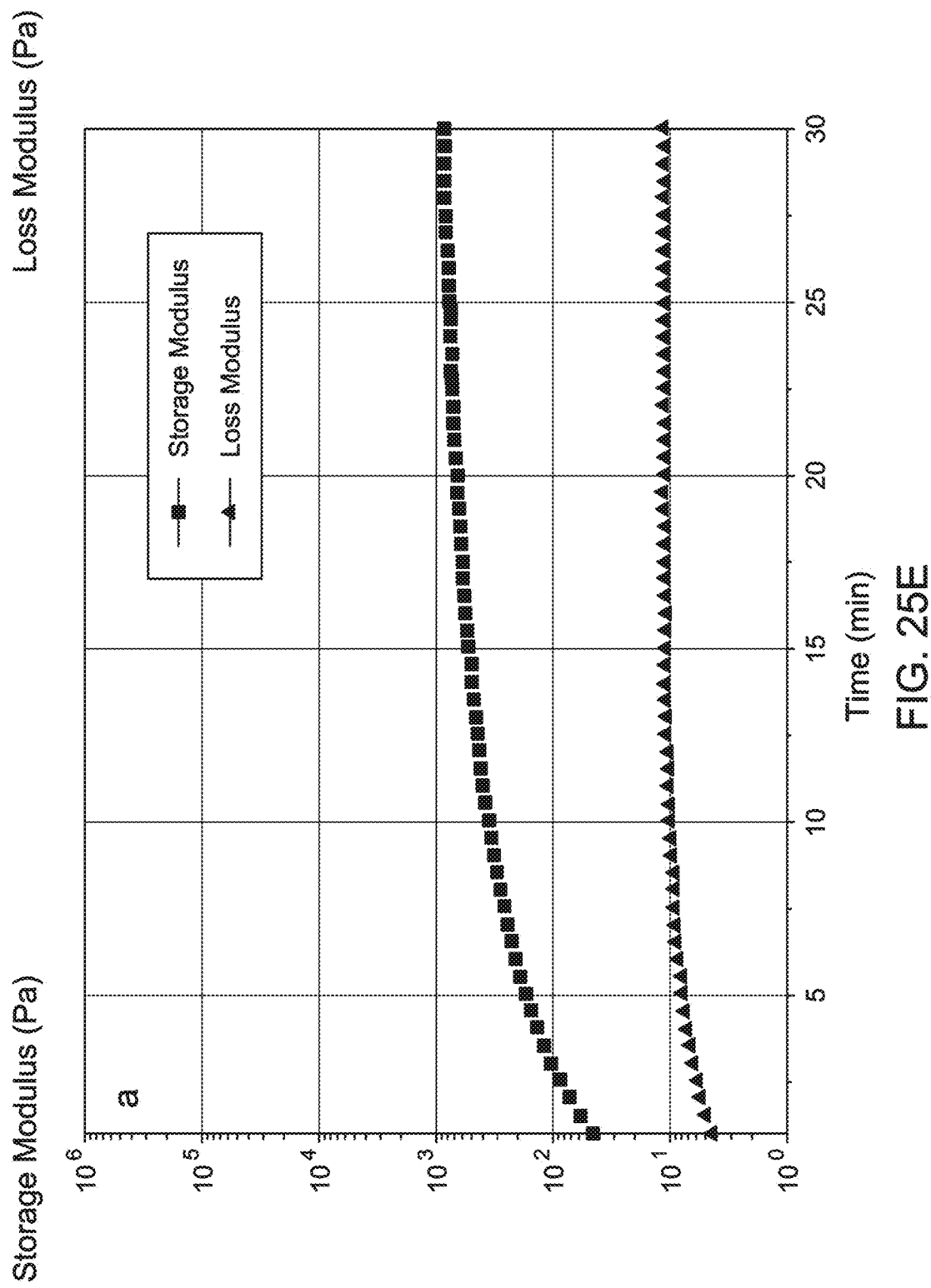
FIG. 25E is a graph showing stabilization of gel rheological properties after temperature stabilization at 25° C. for sample A-1.
Figure 25F:
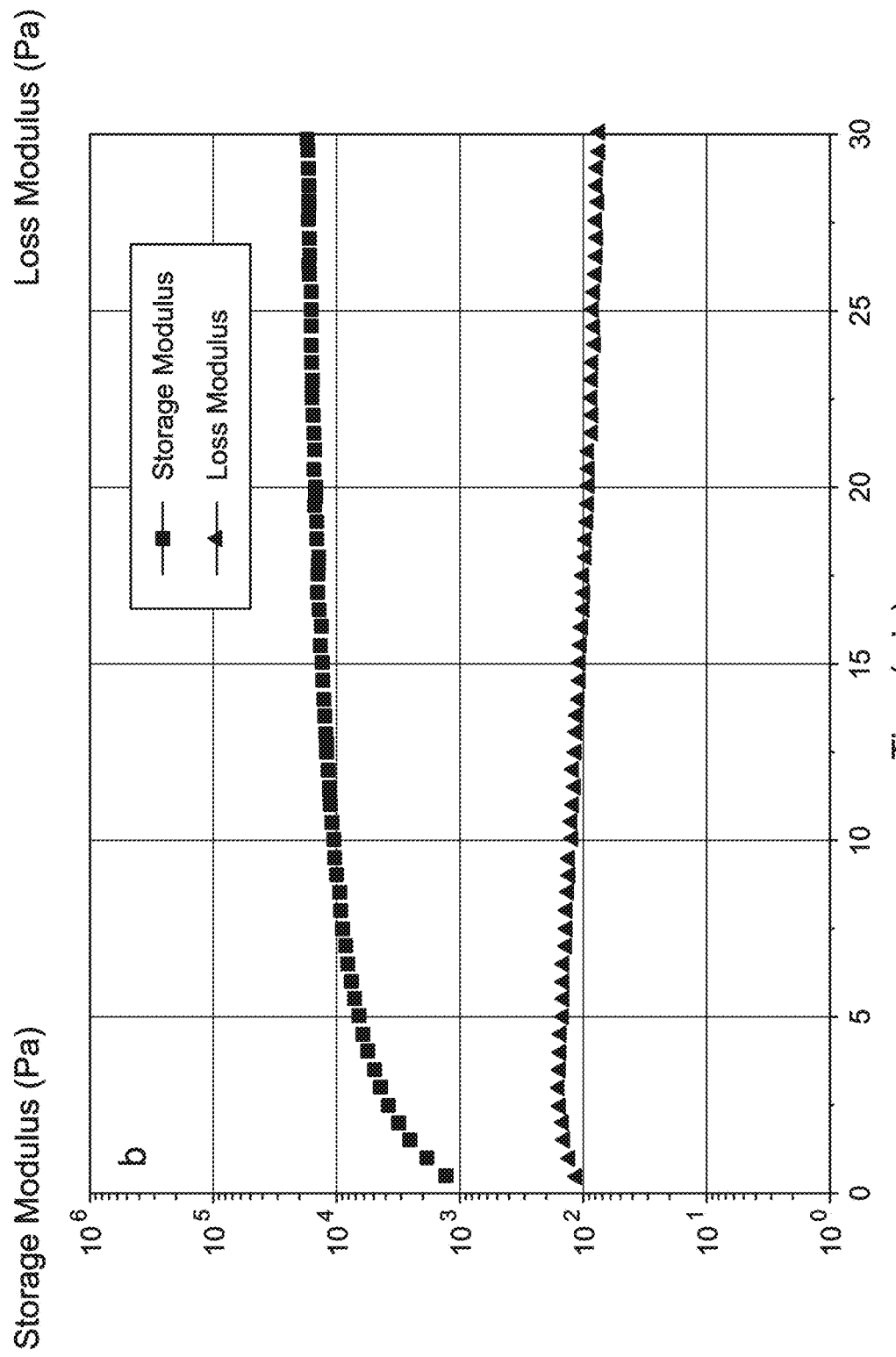
FIG. 25F is a graph showing stabilization of gel rheological properties after temperature stabilization at 25° C. for sample A-2.
Figure 25G:
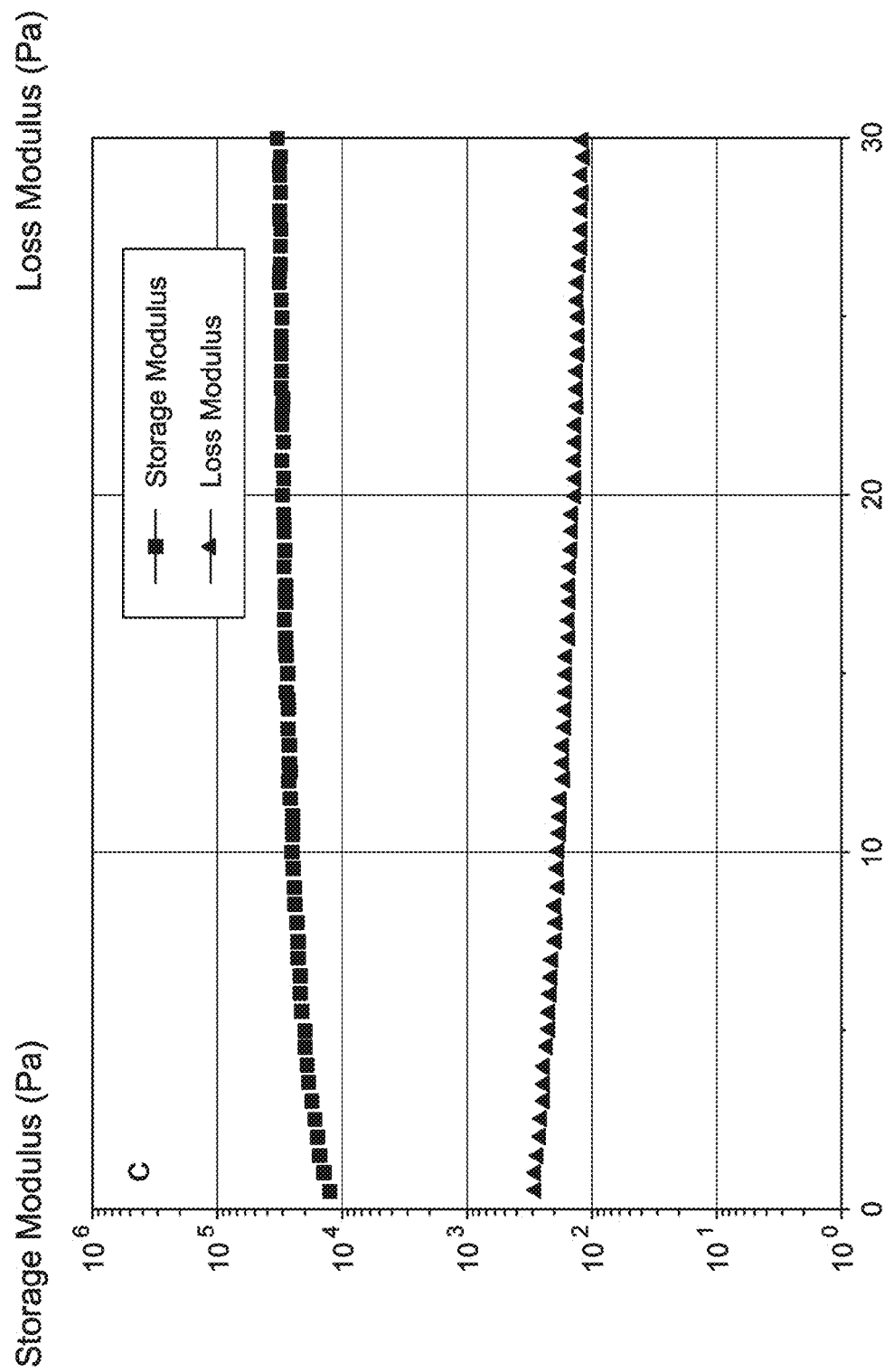
FIG. 25G is a graph showing stabilization of gel rheological properties after temperature stabilization at 25° C. for sample A-3.
Figure 25H:
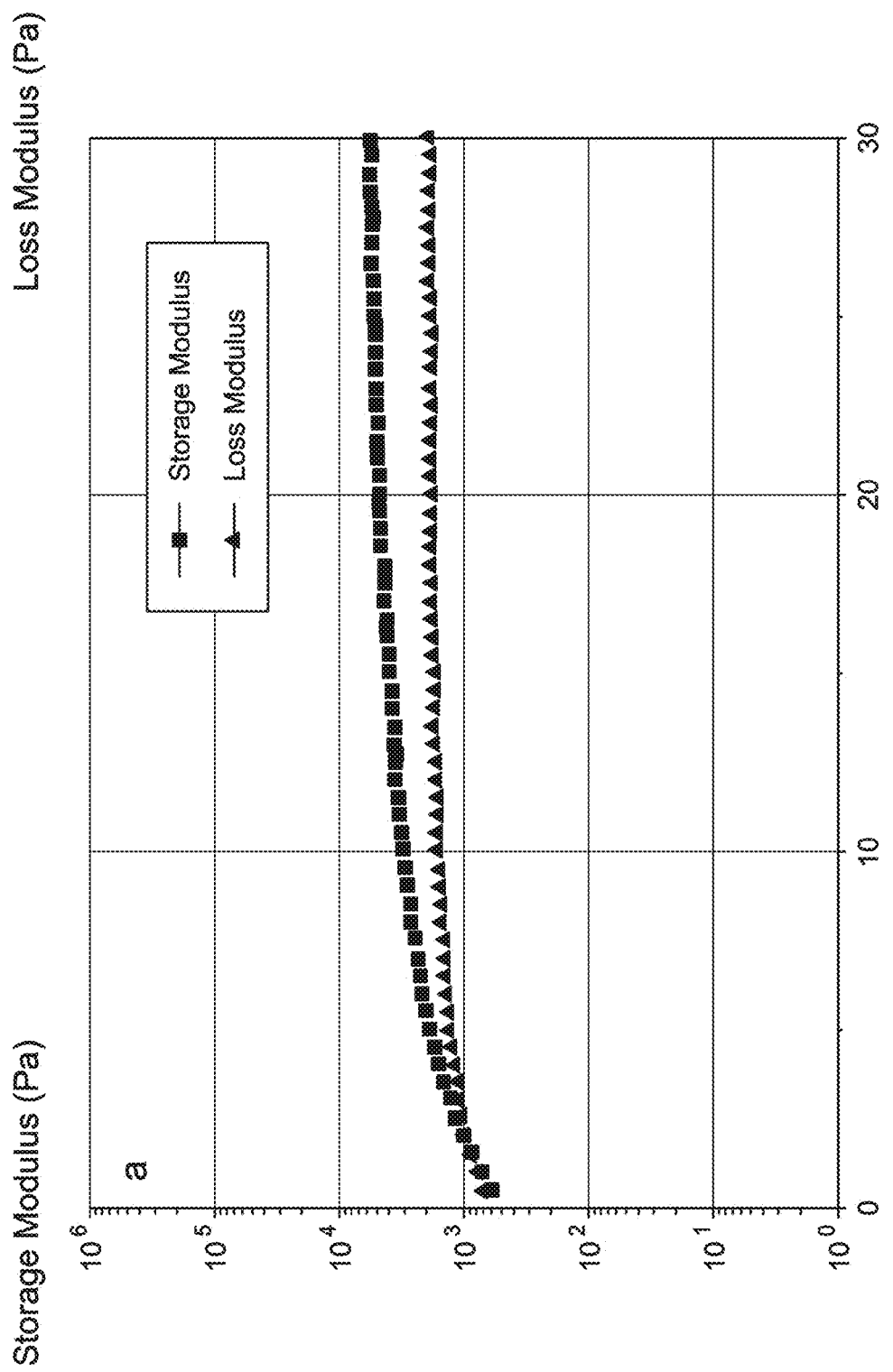
FIG. 25H is a graph showing stabilization of gel rheological properties after temperature stabilization at 25° C. for sample A-4.

Referring now to FIGS. 25A-H, the amplitude sweeps of samples A-1 through A-4 are shown. The rheology of the gels was tracked as shown in FIGS. 25E-H to ensure that the gels were stabilized and showed minimal changes in storage and loss moduli prior to beginning the amplitude sweeps (in FIGS. 25A-D). FIGS. 25E-H show stabilization of gel rheological properties after temperature stabilization at 25° C. for A-1 (FIG. 25E), A-2 (FIG. 25F), A-3 (FIG. 25G), and A-4 (FIG. 25H).

Samples A-1 through A-4 were swept for amplitude, and the results are shown in FIGS. 25A-D. The gels each had a different stiffness and different response to amplitude changes. In particular, sample A-3 in FIG. 25C showed a shorter linear region in the amplitude sweep than the other gels. In sample A-3, the loss modulus increased significantly above a shear strain of about 0.5. The other gels were linear through to at least a shear strain of about 1.0.

Gel samples A-1 and A-4 in FIGS. 25A and 25D, respectively, showed the largest linear region. Of interest is the effect of iron(II) on the sweep amplitude profile of the gels. The addition of ferrous ammonium sulfate has the effect of increasing the strain tolerance for the gels A-1 through A-5. The effect of iron(II) is shown in FIG. 26. FIG. 26A is a graph showing phase shift angle versus shear strain for sample A-5, sample A-5 with 0.2 grams of Mohr's salt, and sample A-5 with 0.8 grams of Mohr's salt. FIG. 26B is a graph showing phase shift angle versus shear strain for sample A-3 and sample A-3 with iron(II), along with amplitude sweep and corresponding phase angle.

Figure 27A:
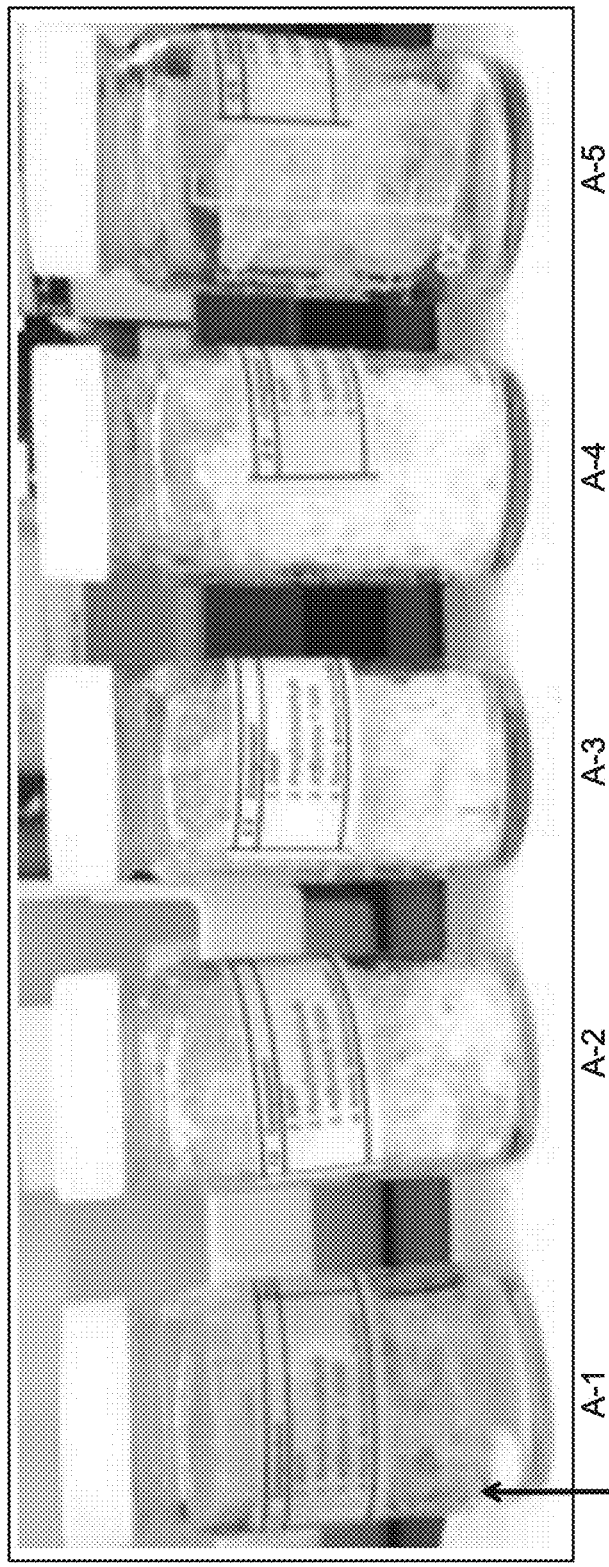
FIG. 27A is a pictorial representation of the addition of a trivalent metal salt, ferric ammonium sulfate, to samples A-1 through A-5.
Figure 27B:
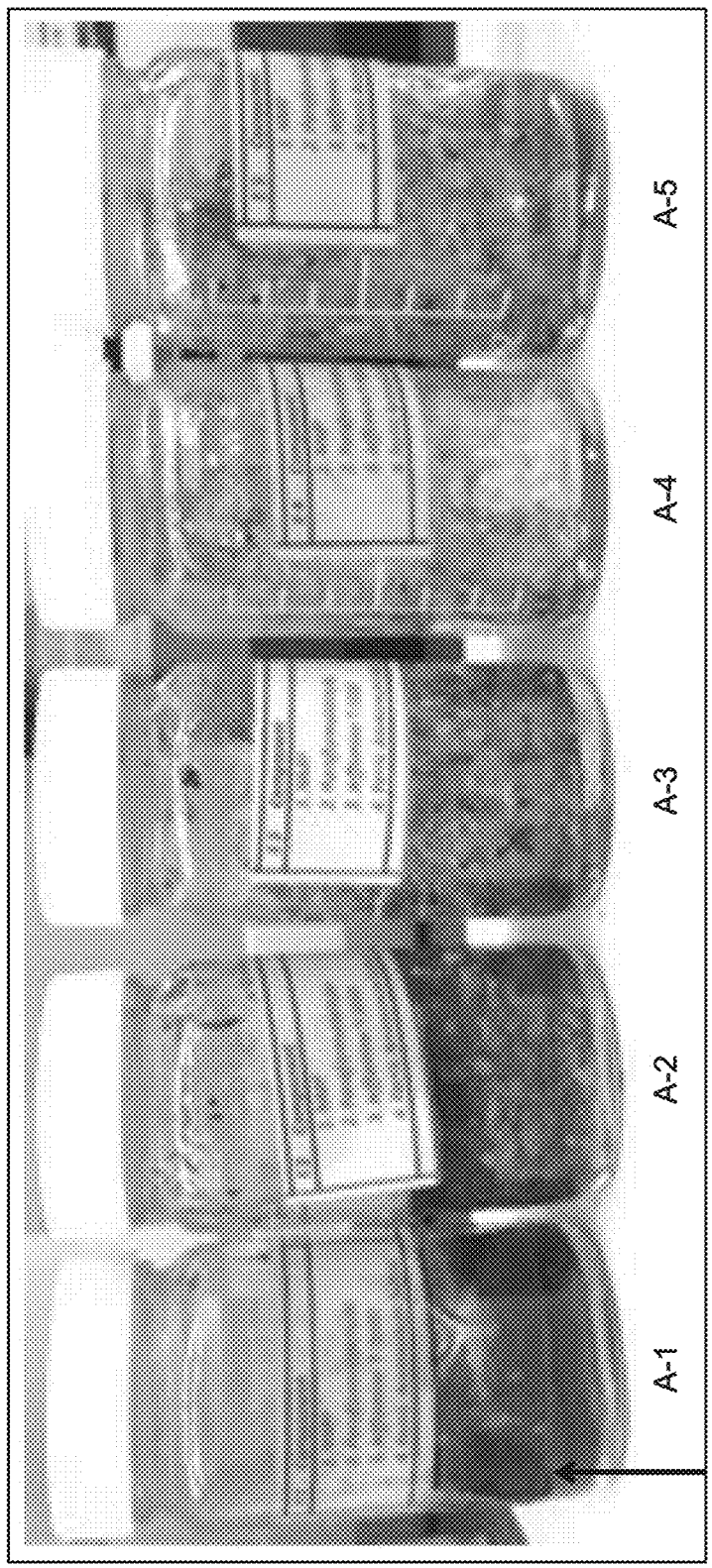
FIG. 27B is a pictorial representation of the addition of a trivalent metal salt, ferric ammonium sulfate, to samples A-1 through A-5.

The case of adding iron(II) is distinct from the case where iron(III) was added to the gels. When a ferric iron(III) salt was added to the gels A-1 through A-5, the gels reverted back to a liquid. FIGS. 27A and 27B show photographs of the gels after the addition of ferric ammonium sulfate. The A-1 gel showed the fastest and most complete conversion to liquid accompanied with a color change to red. FIG. 27A is a pictorial representation of the addition of a trivalent metal salt, ferric ammonium sulfate, to samples A-1 through A-5. FIG. 27B is a pictorial representation of the addition of a trivalent metal salt, ferric ammonium sulfate, to samples A-1 through A-5.

Figures 28A, 28B, 28C:
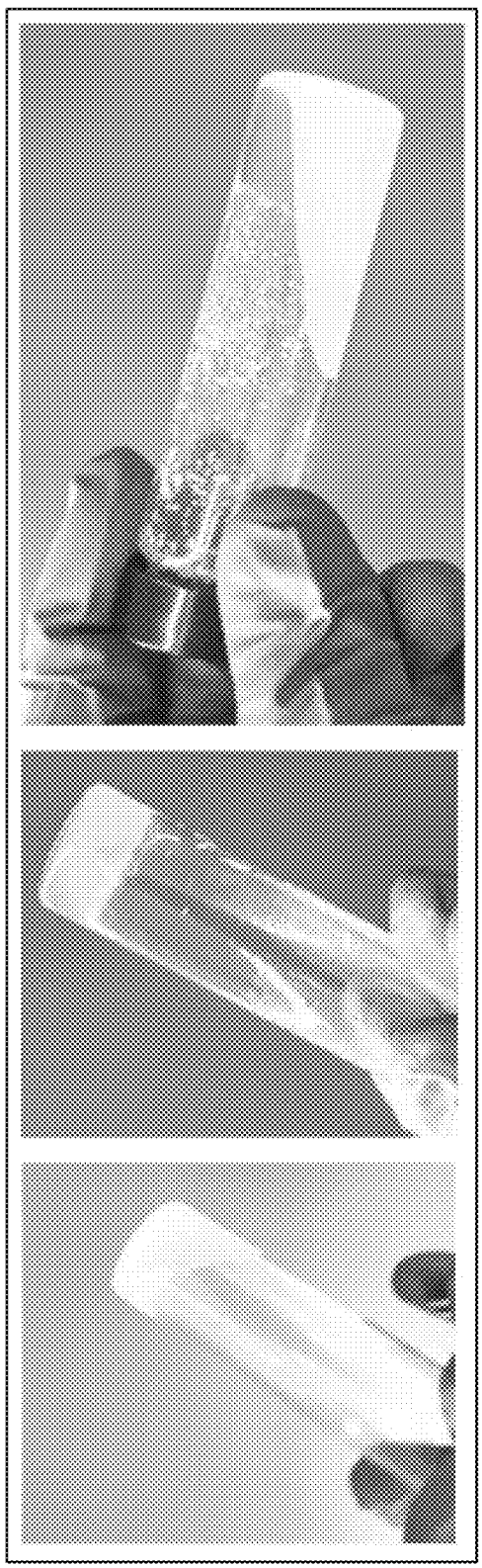
FIG. 28A is a pictorial representation of gel sample A-1 becoming a liquid after reaction with aluminum chloride hexahydrate.
FIG. 28B is a pictorial representation of gel sample A-1 returning to a gel state after being heated to 70° C.
FIG. 28C is a pictorial representation of gel sample A-1 returning to a liquid state after the addition of phosphine in NMP to the gel in FIG. 28B.

Referring now to FIG. 28, when sample A-1 was reacted with aluminum chloride the gel turned to a liquid, as shown in FIG. 28A. When sample A-1 was heated to 70° C., it is transformed back to a gel state, as shown in FIG. 28B. The gel was then broken down back to a liquid through the addition of phosphine in NMP, as shown in FIG. 28C.

Figure 29A:
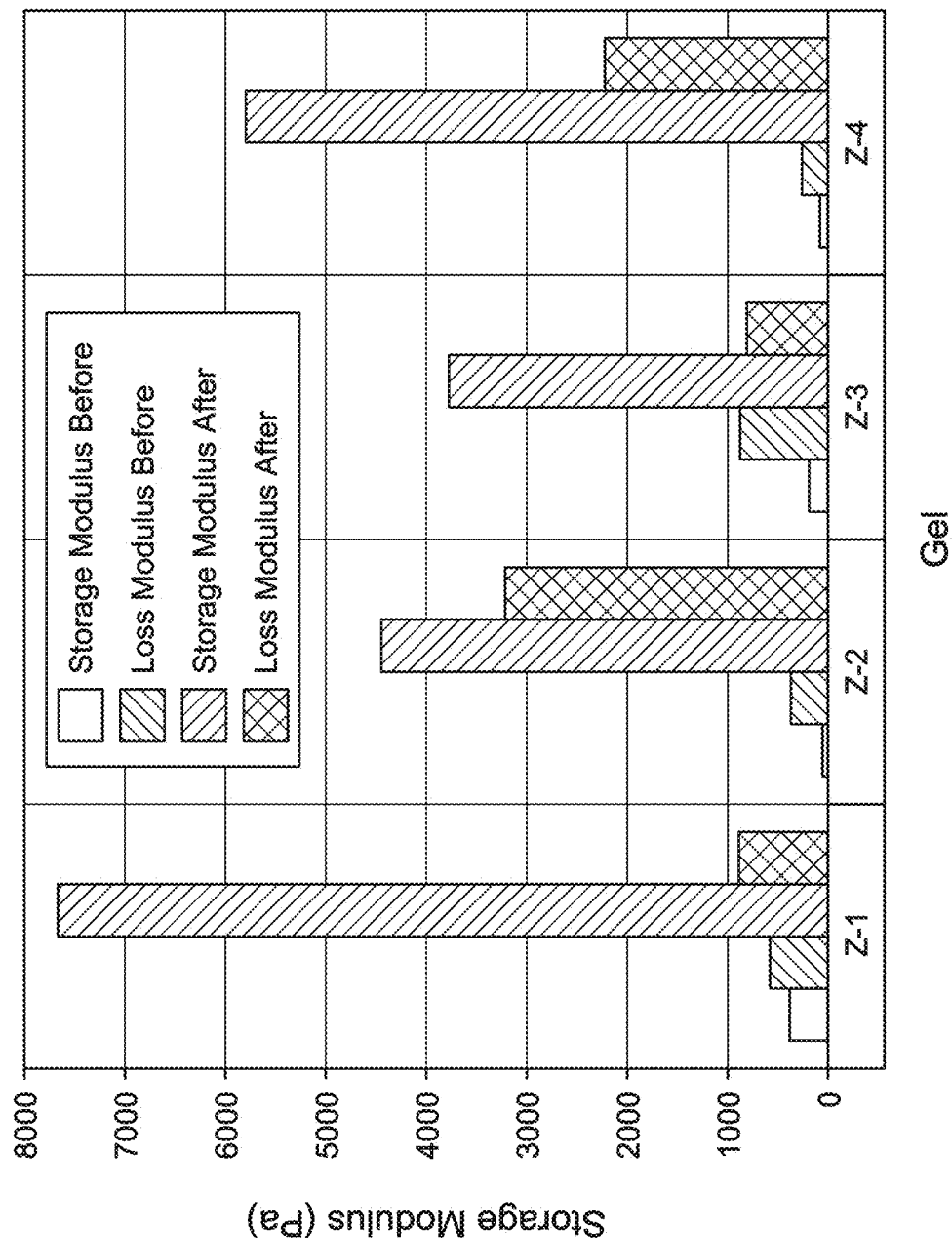
FIG. 29A shows the results of a small amplitude oscillatory rheometry experiment in which different amounts of aluminum chloride were added to the same gel composition.
Figure 29B:
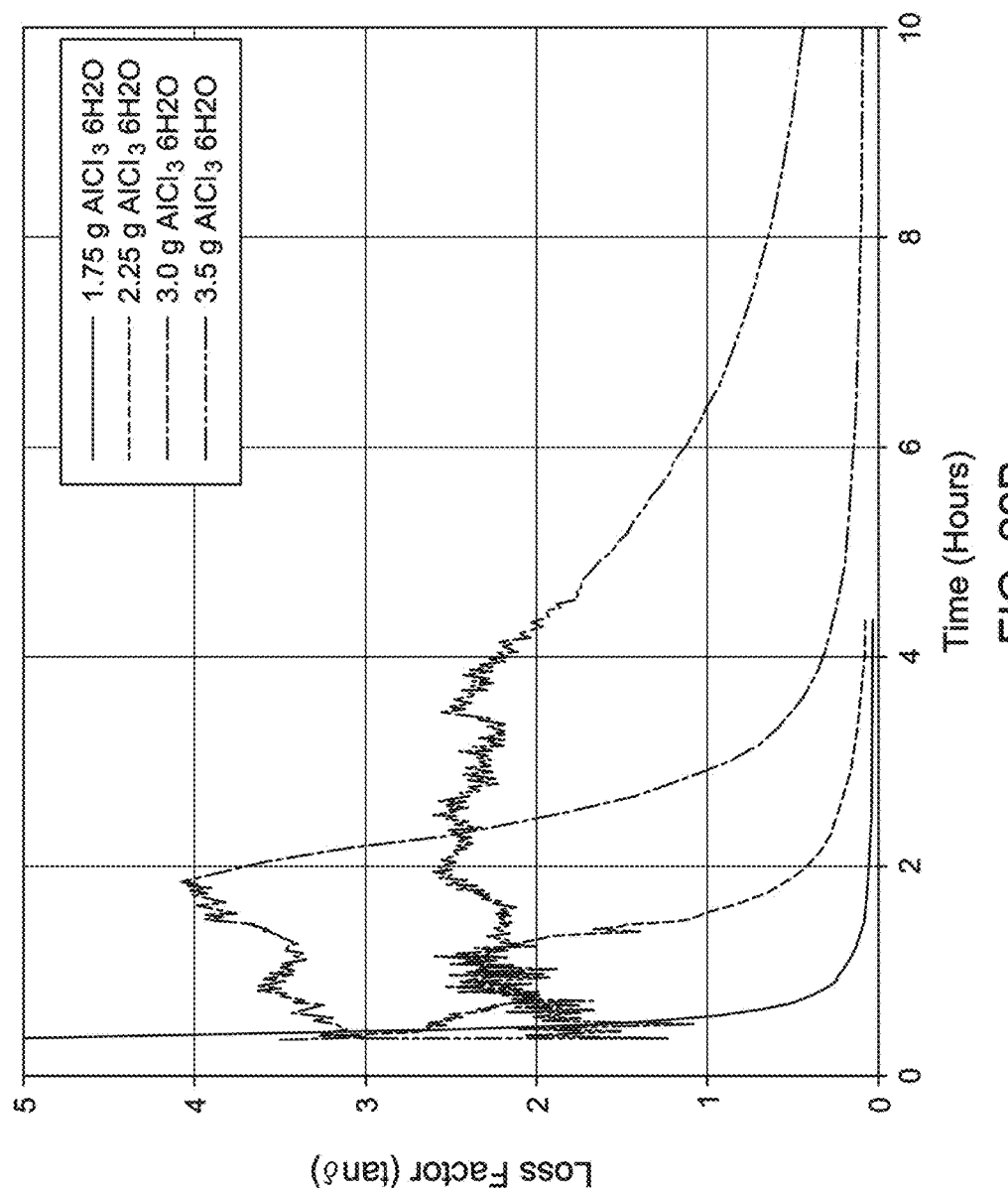
FIG. 29B shows the results of a small amplitude oscillatory rheometry experiment in which different amounts of aluminum chloride were added to the same gel composition, and the resulting gel time for the organometallic liquid at 70° C. was recorded. Increasing amounts of aluminum chloride increase the gel time.

The time of the transformation of the liquid in FIG. 28A to the gel in FIG. 28B depends not only on the temperature, but also the concentration of aluminum in the sample. FIGS. 29A and 29B show the results of a small amplitude oscillatory rheometry experiment in which different amounts of aluminum chloride were added to the same gel composition, and the resulting gel time for the organometallic liquid at 70° C. was recorded (FIG. 29B). Increasing amounts of aluminum chloride increase the gel time.

The singular forms "a," "an," and "the" include plural referents, unless the context clearly dictates otherwise. "Optionally" and its various forms means that the subsequently described event or circumstance may or may not occur. The description includes instances where the event or circumstance occurs and instances where it does not occur. "Operable" and its various forms means fit for its proper functioning and able to be used for its intended use.

In the drawings and specification, there have been disclosed embodiments of compositions, systems, and methods for reversible aminal gels of the present disclosure, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

Where the Specification or the appended Claims provide a range of values, it is understood that the interval encompasses each intervening value between the upper limit and the lower limit as well as the upper limit and the lower limit. The present disclosure encompasses and bounds smaller ranges of the interval subject to any specific exclusion provided. Where the Specification and appended Claims reference a method comprising two or more defined steps, the defined steps can be carried out in any order or simultaneously except where the context excludes that possibility.

What is claimed is:

1. A method for producing a reversible aminal gel composition, the method comprising the steps of:
   preparing a liquid precursor composition, the liquid precursor composition operable to remain in a liquid state at about room temperature, where the liquid precursor composition comprises:
   an organic amine composition;
   an aldehyde composition;
   a polar aprotic organic solvent; and
   a metal salt composition with valence 3, 4, or 5;
   allowing the liquid precursor composition to transition from the liquid state to a gel state responsive to an increase in temperature; and
   returning the gel state to the liquid state by changing a property selected from the group consisting of: pH, an amount of the metal salt composition, and combinations thereof.

2. The method according to claim 1, further comprising the step of adding a gel time accelerating additive comprising sodium sulfite.

3. The method according to claim 1, where the polar aprotic organic solvent comprises N-vinyl pyrrolidone and is operable to be polymerized through a radical initialized reaction.

4. The method according to claim 3, where N-vinyl pyrrolidone is copolymerized with a second polymer thereby modifying hydrophilicity of a gel matrix and altering a release profile of cargo upon time delayed or triggered release.

5. The method according to claim 4, where the second polymer comprises N-butyl acrylate.

6. The method according to claim 3, further comprising the step of polymerizing N-vinyl pyrrolidone as either a homopolymer or a copolymer through radical initiation with potassium persulfate.

7. The method according to claim 3, further comprising the step of polymerizing N-vinyl pyrrolidone as either a homopolymer or a copolymer through radical initiation with UV light.

8. The method according to claim 3, further comprising the step of polymerizing N-vinyl pyrrolidone as either a homopolymer or a copolymer in a photosensitized gel through radical initiation with light of a wavelength greater than 350 nm.

9. The method according to claim 1, further comprising the step of maintaining a stable gel state between about 100° C. and about 250° C.

10. The method according to claim 1, where a molar ratio of the organic amine composition to the aldehyde composition to the polar aprotic organic solvent is between about 1:2:1 and about 1:200:500.

11. The method according to claim 1, further comprising the step of adding delayed release capsules comprising a compound selected from the group consisting of: acidic solution and a metal salt composition with valence 3, 4, or 5.

12. The method according to claim 1, further comprising the step of adjusting a ratio of components in the liquid precursor composition to tune a temperature at which the reversible aminal gel composition reverses to the liquid state.

13. The method according to claim 1, further comprising the step of adjusting a ratio of components in the liquid precursor composition to tune a pH at which the reversible aminal gel composition reverses to the liquid state.

14. The method according to claim 1, further comprising the step of adjusting a ratio of components in the liquid precursor composition to modify the concentration of excess metal salt required to transform the reversible aminal gel composition into the liquid state.

15. The method according to claim 1, further comprising the step of adjusting a ratio of components in the liquid precursor composition to alter the amount of time required for a liquid hemiaminal gel form to transform into a greater melting point gel form.

16. The method according to claim 1, further comprising the step of adjusting a ratio of components in the liquid precursor composition to tune physical properties of the gel state by exchange and reduction in an amount of polar aprotic organic solvent required for producing a homogenous gel.

17. The method according to claim 1, where the organic amine composition comprises a tris primary amine of polypropylene glycol with an approximate molecular weight of between about 280 and about 100,000 Da.

18. The method according to claim 1, where the organic amine composition comprises a bis primary amine of polyethylene glycol with an approximate molecular weight of between about 200 and about 100,000 Da.

19. The method according to claim 1, where the aldehyde composition comprises a compound selected from the group consisting of: formaldehyde, paraformaldehyde, phenol formaldehyde, resorcinol-formaldehyde, phenyl acetate-HMTA, and mixtures thereof.

20. The method according to claim 1, where the polar aprotic organic solvent comprises a compound selected from the group consisting of: N-alkylpyrrolidone, N,N'-dialkylformamide, dialkylsulfoxide, and mixtures thereof.

21. The method according to claim 1, where the metal salt composition comprises a metal selected from the group consisting of: iron(III), aluminum(III), and mixtures thereof.

22. The method according to claim 1, where the gel state comprises triazine-based molecules.

* * * * *